United States Patent
Nosanow et al.

(10) Patent No.: US 12,450,407 B2
(45) Date of Patent: Oct. 21, 2025

(54) QUANTUM MECHANICS INSTRUCTION PRODUCTION SYSTEMS, METHODS, AND APPLICATIONS THEREOF

(71) Applicant: Nosanow & Nutt, LLC, Carlsbad, CA (US)

(72) Inventors: Lewis H. Nosanow, Carlsbad, CA (US); Jesse R. Nutt, Carlsbad, CA (US); William F. Mann, III, Leesburg, FL (US)

(73) Assignee: NOSANOW & NUTT, LLC, Carlsbad, CA (US)

( * ) Notice: Subject to any disclaimer, the term of this patent is extended or adjusted under 35 U.S.C. 154(b) by 833 days.

(21) Appl. No.: 17/525,721

(22) Filed: Nov. 12, 2021

(65) Prior Publication Data

US 2022/0164501 A1     May 26, 2022

Related U.S. Application Data

(60) Provisional application No. 63/116,518, filed on Nov. 20, 2020.

(51) Int. Cl.
*G06F 30/27*     (2020.01)
*G06F 30/28*     (2020.01)
(Continued)

(52) U.S. Cl.
CPC .............. *G06F 30/27* (2020.01); *G06F 30/28* (2020.01); *G06N 10/00* (2019.01); *G06F 2111/20* (2020.01)

(58) Field of Classification Search
CPC ...... G06F 30/27; G06F 30/28; G06F 2111/20; G06N 10/00
(Continued)

(56) References Cited

U.S. PATENT DOCUMENTS 3,281,609 A    10/1966   Rowell
3,676,718 A     7/1972   Anderson et al.
(Continued)

FOREIGN PATENT DOCUMENTS

WO     2019057317 A1     3/2019

OTHER PUBLICATIONS

The Future Now—2035—2075—Launch of the Very Large Hadron Collider [online], Sep. 25, 2020 [retrieved: Feb. 21, 2022]. Retrieved from <https://futurenow.ru/22-bek/2030-e/2035-2075>.
(Continued)

*Primary Examiner* — Austin Hicks
(74) *Attorney, Agent, or Firm* — MH2 Technology Law Group LLP

(57) ABSTRACT

Quantum Mechanics Instruction Production (QMIP) systems, methods, and computer-readable media are described. In some implementations, the QMIP system may comprise an input/output module, a database library module, a tradeoff module, a printer module, a samples analyzer module, and a test bench module. Some implementations can include a Nosanow Fermion and Boson Wave Module (or Nosanow Fermion Wave Module), a Grand Free Energy Module, an artificial intelligence module, a chemical bench module, a simulation module, and a metrology and interferometry module. The QMIP system can be programmed and configured to implement a quantum computer and algorithms that are executed on the quantum computer system, which notably, benefit from improved coherence and stability. In some implementations, the QMIP system may be programmed and configured to design new materials such as superconductors, superfluids, photovoltaics, and new drug therapies to treat disease.

20 Claims, 19 Drawing Sheets

(51) Int. Cl.
   *G06N 10/00* (2022.01)
   *G06F 111/20* (2020.01)
(58) Field of Classification Search
   USPC .......................................................... 706/45
   See application file for complete search history.

(56) References Cited

U.S. PATENT DOCUMENTS

| | | | |
|---|---|---|---|
| 4,344,142 | A | 8/1982 | Diehr et al. |
| 7,362,420 | B2 | 4/2008 | Zaugg |
| 9,115,913 | B1 | 8/2015 | Rossi |
| 9,827,713 | B1* | 11/2017 | Linnell ................. B29C 64/124 |
| 10,049,173 | B2 | 8/2018 | Liu et al. |
| 10,332,023 | B2 | 6/2019 | Mezzacapo et al. |
| 2012/0130690 | A1* | 5/2012 | Srivastava ........ H01M 10/0525 703/2 |
| 2012/0221268 | A1 | 8/2012 | Freedman et al. |
| 2015/0178442 | A1 | 6/2015 | Abel et al. |
| 2015/0317459 | A1 | 11/2015 | Farhi et al. |
| 2020/0143280 | A1 | 5/2020 | Haah et al. |
| 2020/0334602 | A1 | 10/2020 | Anderson |

OTHER PUBLICATIONS

Han-Sen Zhong et al., Experimental Gaussian Boson sampling, Elsevier, Feb. 4, 2019 <DOI: https://doi.org/10.1016/i.scib.2019.04.007>.
Nosanow, L.H., Quantum theorem of corresponding states and spin-polarized quantum system [online]. Jan. 1, 1980 [retrieved: Feb. 21, 2022] Retrieved from: <https://hal.archives-ouvertes.fr/jpa-0020138>.
Nosanow, L.H. et al., Possible "new" quantum systems. II. Properties of the isotopes of spin-aligned hydrogen [online] Jan. 5, 1977 [retrieved: Feb. 21, 2022] Retrieved from <https://journals-aps.org/prb/abstract/10.1103/PhysRevB.15.4376>.
Written Opinion of the International Searching Authority dated Feb. 24, 2022 in PCT/US2021/059226.
PCT International Search Report dated Feb. 24, 2022 in PCT/US2021/059226.
"A Beginner's Guide to Measurement", Good Practice Guide No. 118, National Measurement System, 39 pgs., no date available.
"Evolving Needs for Metrology in Material Property Measurements", Report of the CIPM ad hoc Working Group on Materials Metrology, Part 1: Report and Recommendations, Oct. 2007, 56 pgs.
"HQS Quantum Simulations", towards the Quantum Computer Simulation Solutions for Today and Tomorrow, 14 pgs., no date available.
Atkins/Paula, Chapter 16, "Statistical thermodynamics 1: the concepts", Physical Chemistry, 8th edition, no date available, 53 pgs.
Bardeen, J. et al., "Theory of Superconductivity", Physical Review, vol. 108, No. 5, Dec. 1, 1957, pp. 1175-1204, 30 pages.
Bardeen, J., et al., "Microscopic Theory of Superconductively", Department of Physics, University of Illinois, Feb. 18, 1957, pp. 162-164, 3 pgs.
Benenti, Giuliano et al., "Quantum simulation of the single-particle Schrodinger equation", Nov. 30, 2007, 7 pgs.
Chapter 5: Thermodynamic potentials, pp. 47-62, 16 pgs. No date available.
Chapter 7, "The variational quantum eigensolver", 9 pgs., no date available.
Compiled by the Class for Physics of the Royal Swedish Academy of Sciences, "Topological Phase Transitions and Topological Phases of Matter", Scientific Background on the Nobel Prize in Physics 2016, Oct. 4, 2016, 28 pgs.
Dirac, P.A.M., The Principles of Quantum Mechanics, third edition (The International Series on Physics), Oxford Press, Jan. 1, 1947.
Feature, "Inside a quantum computer" image, 1 pg., no date available.
Flow Chart of CALPAD (example), 1 pg., no date available.
Frank, Juhan, "The Three-Body Problem in Astronomy" special lecture, PHYS 7221, The Three-Body Problem, Oct. 11, 2006, 8 pgs.
Illner, Reinhard et al., "Limitations on the Control of Schrodinger Equations", Jun. 16, 2005, 25 pgs.
Johnson, Matt, "Welcome to Q2B 2019! Boot Camp Day", 4 pgs.
Kondo, Takeshi et al., "Disentangling Cooper-pair formation above the transition temperature from the pseudogap state in the cuprates", Nature Physics, vol. 7, Jan. 2011, pp. 21-25, 5 pgs.
Kresse, Georg et al., "VASP the GUIDE", Vienna, Austria, Oct. 29, 2018, 234 pgs., located at http://cms.mpi.univie.ac.at/vasp.pdf.
Levada, Celso Luis et al., "Review of the Schrodinger Wave Equation", IOSR Journal of Applied Chemistry, vol. 11, Issue 4 Ver.1, Apr. 2018, 7 pgs.
Marthaler, Michael, "Study of Quantum Electrodynamics in Superconducting Devices" dissertation, Jun. 12, 2009, 132 pages.
Nielsen, Michael A. et al., "Quantum Computation and Quantum Information", Quantum Computation Textbook, 2 pgs., no date available.
Norman, M.R., "Materials Design for New Superconductors", Rep. Prog. Phys., 17 pgs, no date available.
Norman, M.R., "Materials Design for New Superconductors", Rep. Prog. Phys., published on Jan. 5, 2016, 7 pgs.
Nosanow, Lewis H., "Metastable States in Strongly Coupled Quantum System With Continuous Spectra", Physica 26, 1960, pp. 1124-1142, 19 pages.
Oct. 2019 Update: Subject Matter Eligibility, published on Jan. 7, 2019, 84 Fed. Reg. 50, 22 pgs.
Oliver, William, "Introduction to Quantum Computing", Q2B2021, Day 1, 21 pgs.
Ortiz, C. et al., "Data mining and accelerated electronic structure theory as a tool in the search for new functional materials", Computational Materials Science 44, available online Sep. 2, 2009, pp. 1042-1049, 8 pgs.
Peacock, Skyler R., "Why Manufacturing Matters:3D Printing, Computer-Aided Designs, and the Rise of End-User Patent Infringement", William & Mary Law Review, vol. 55, Issue 5, May 2014, 29 pgs.
Preskill, John, "Quantum for Business 2018", Q2B, 51 pgs.
U.S. Appl. No. 61/883,158, filed Sep. 26, 2013, "Connecting First-Principles Calculations With Transistor Characterization", part 1, 100 pgs.
U.S. Appl. No. 61/883,158, filed Sep. 26, 2013, "Connecting First-Principles Calculations With Transistor Characterization", part 2, 97 pgs.
U.S. Appl. No. 62/669,651, filed Dec. 22, 2017, "Quantum Simulation of Real Time Evolution of Lattice Hamiltonians" to U.S. Publication No. 20200143280 A1.
Quantum Mechanics: Quantum weirdness—Schrodinger's Equation. 1 pg. No date available.
Quantum Technology in the Short-term and Long term—the search for applications, Video Presentation at Q2B Day 1, Dec. 10, 2018, located at https://q2b2018.qcware.com/videos-presentations.
Schrodinger End-user License Agreement—Command Center, 17 pgs, no date available.
Schrodinger End-User License Agreement, 13 pgs., no date available.
Schrodinger End-User License Agreement, 28 pages, no date available.
Schrodinger End-user License Agreement, 55 pgs., no date available.
Schrodinger.com—David E. Shaw, 3 pgs., no date available.
Shannon, C.E., "A Mathematical Theory of Communication", The Mathematical Theory of Communication, Board of Trustees of the University of Illinois, 1949, 54 pgs.
Superconductivity and BCS Theory, I. Eremin, MPIPKS, 30 pgs, no date available.
The Standard Model of Fundamental Particles and Interactions, located at www.cpepweb.org.2014-fund-chart.pdf.
University of Florida, "BCS Theory and Superconductivity", marked up copy, no date available, pp. 1-5, 5 pgs.

(56) References Cited

OTHER PUBLICATIONS

Webb, Zak, "The computational power of many-body systems", a thesis to the University of Waterloo in fulfillment to the Doctor of Philosophy, Waterloo, Ontario, Canada, 2016, 242 pgs.

White, H. et al., "A discussion on a dynamic vacuum model: Derivation of Helmholtz equation from Schrodinger equation", Physics Open, published by Elsevier, available online Nov. 29, 2019, 8 pgs.

Young, Kitty, "Introduction to Quantum Computing", Hackaday Supercon, Nov. 15, 2019, 64 pgs.

Kintech Workbench webpage, www.kintechlab.com/products/chemical-workbench, retrieved Jun. 23, 2025, via Wayback Machine, https://web.archive.org/web/20211121135251/https://www.kintechlab.com/products/chemical-workbench (archived Nov. 21, 2021).

Thermo-Calc Software History, retrieved Jun. 23, 2025, thermocalc.com/about-US/our-history.

University of Florida, UF Physics Department, "BCS Theory and Superconductivity", retrieved Jun. 23, 2025, 5 pages, www.phys.ufl.edu/courses/phy4523/spring12/Sample%202.pdf.

Shah, S. et al., "Thermodynamic Analysis and Calculators of (Fe—Co) Alloy by Modeling and Simulation using Thermo- Calc Software". Edelweiss Applied Science and Technology, 2018, pp. 120-123, 4 pages, vol. 2, Issue 1.

\* cited by examiner

QUANTUM MECHANICS INSTRUCTION PRODUCTION SYSTEMS, METHODS, AND APPLICATIONS THEREOF

RELATED APPLICATIONS

This application claims the benefit of U.S. Application No. 63/116,518, entitled "System and Method for Quantum Mechanics Instruction Production Platform and Applications Thereof," filed on Nov. 20, 2020, which is incorporated herein by reference in its entirety.

FIELD

Some implementations are generally related to quantum computing, and, in particular, to a Quantum Mechanics Instruction Production (QMIP) system that can be programmed and configured to determine new materials for quantum computing, among other things, provide qubit set up information, and provide qubit coherence control instructions or control signals to help improve coherency duration.

BACKGROUND

Quantum mechanics is a fundamental theory in physics that provides a description of the physical properties of nature at the scale of atoms and subatomic particles. It is the foundation of quantum physics including quantum chemistry, quantum field theory, and quantum technology.

Classical physics, i.e., the description of physics that existed before the theory of relativity and quantum mechanics, describes many aspects of nature at an ordinary (macroscopic) scale, while quantum mechanics explains the aspects of nature at small (atomic and subatomic) scales, for which classical mechanics may be insufficient. Most theories in classical physics can be derived from quantum mechanics as an approximation, which may be valid at a large (macroscopic) scale.

Quantum mechanics differs from classical physics in that energy, momentum, angular momentum, and other quantities of a bound system are restricted to discrete values (quantization), objects have characteristics of both particles and waves (wave-particle duality), and there are limits to how accurately the value of a physical quantity can be predicted prior to its measurement, given a complete set of initial conditions (the so-called uncertainty principle).

Early quantum theory was profoundly re-conceived in the mid-1920s by Niels Bohr, Erwin Schrödinger, Werner Heisenberg, Max Born, and others. The original interpretation of quantum mechanics is the Copenhagen interpretation, developed by Niels Bohr and Werner Heisenberg during the 1920s. The modern theory is formulated in various specially developed mathematical formalisms. In one of them, a mathematical function, the wave function, provides information about the probable amplitude of energy, momentum, and other physical properties of a particle.

In the early 20th century, it was found that subatomic particles and electromagnetic waves are neither simply particle nor wave but have certain properties of both particles and waves. This originated the concept of wave-particle duality. Modern quantum physics provided a useful framework for many features of the modern periodic table of elements and describes the behaviors of atoms during chemical bonding and the flow of electrons in computer semiconductors. And while quantum mechanics was constructed to describe the world of the very small, it is also needed to explain some macroscopic phenomena such as superconductors and superfluids, which are of increasing importance as foundational to numerous 21st century technologies.

"Quantum" refers to a discrete unit assigned to certain physical quantities such as the energy of an atom at rest. The understanding that particles are discrete packets of energy with wave-like properties led to the branch of physics dealing with atomic and subatomic systems, which is quantum mechanics. It underlies the mathematical framework of many fields of physics and chemistry, including solid-state physics, atomic physics, quantum chemistry, and so forth.

Quantum mechanics is essential for understanding the behavior of systems at atomic length scales and smaller. In the formalism of quantum mechanics, the state of a system at a given time is described by a complex wave function, also referred to as state vector in a complex vector space. This abstract mathematical object allows for the calculation of probabilities of outcomes of concrete experiments. For instance, electrons may be considered (to a certain probability) to be located somewhere within a given region of space, but with their exact positions unknown, as reflected by the well-known Heisenberg Uncertainty Principle.

The time evolution of a quantum state is described by the Schrödinger equation, in which the Hamiltonian (the operator corresponding to the total energy of the system) generates the time evolution. The time evolution of wave functions is deterministic in the sense that—given a wave function at an initial time—it makes a definite prediction of what the wave function will be at any later time. Analytic solutions of the Schrödinger equation are known for very few relatively simple model Hamiltonians including the quantum harmonic oscillator, the particle in a box, the dihydrogen cation, and the hydrogen atom. Even the helium atom—which contains just two electrons—has apparently defied attempts at a fully analytic treatment. For the most part, only partial solutions have been determinable for the Schrödinger equation.

Quantum mechanics is often the only theory that can reveal the individual behaviors of the subatomic particles that make up most, if not all, forms of known matter (electrons, protons, neutrons, photons, and others).

In quantum mechanics, the Schrödinger equation is a linear partial differential equation that describes the wave function or state function of a quantum-mechanical system. In classical mechanics, Newton's second law ($F=ma$) is used to make a mathematical prediction as to what path a given physical system will take over time following a set of known initial conditions. Solving this equation gives the position and the momentum of the physical system as a function of the external force on the system. Those two parameters are sufficient to describe its state at each time instant. In quantum mechanics, the analogue of Newton's law is Schrödinger's equation.

The Schrödinger equation predicts that if certain properties of a system are measured, the result may be quantized meaning that only specific discrete values can occur. One example is energy quantization: the energy of an electron in an atom is always one of the quantized energy levels. The challenge with the Schrödinger equation is that it is not deterministic and has been solvable to describe the behavior and characteristics of relatively few scenarios, such as the hydrogen atom. In most other cases, the Schrödinger equation is used in a trial-and-error or ad hoc fashion to approximate the behavior of physical systems and materials.

A need may exist for methods and systems programming and configured to utilize quantum mechanics equations that provide a more accurate approximation, or even an exact or nearly exact deterministic representation, of physical systems and materials compared to conventional quantum mechanics equations. The present disclosure was conceived in light of the above-mentioned needs, problems, or limitations, among other things.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Among other things, the disclosed subject matter involves the development of theories and equations which are solvable, and which can be utilized to create or design a variety of systems, compositions or compounds and other applications to solve technological problems.

Some implementations can include a Quantum Mechanics Instruction Production System (QMIP) system. According to one or more implementations, the QMIP system comprises an input/output module, a database library module, a tradeoff module, a printer module, a samples analyzer module and a test bench module.

Some implementations have core processing modules including one or more of a Nosanow Fermion and Boson Wave Module (or Nosanow Fermion Wave Module), a Grand Free Energy Module, an artificial intelligence module, a chemical bench module, a simulation module, and a metrology and interferometry module.

According to one aspect, the QMIP system is applied to implement a quantum computer and algorithms that are executed on it, which notably, benefit from improved coherence and stability compared to conventional quantum computing systems. According to yet another aspect, the QMIP system can be used to aid in the design of new materials such as superconductors, superfluids, and photovoltaics. According to still another aspect, the QMIP system can be programmed and configured to design new drugs to treat disease.

Some implementations can include a Quantum Mechanics Instruction Production (QMIP) system comprising: a QMIP processing core including one or more processors and one or more QMIP core process modules, an input module coupled to the QMIP processing core, an output module coupled to the QMIP processing core, a database library module coupled to the QMIP processing core, a material printer coupled to the QMIP processing core, a sample analyzer coupled to the QMIP processing core, and a test bench coupled to the QMIP processing core.

In some implementations, the one or more processors can be coupled to a computer-readable medium having stored thereon software instructions that, when executed by the one or more processors, cause the one or more processors to perform operations. The operations can include obtaining input requirements via the input module and searching the database library module for an existing material matching the input requirements. The operations can also include, when an existing material meets the input requirements, outputting existing material information via the output module.

The operations can further include when an existing material does not meet the input requirements, determining one or more new candidate materials using the one or more QMIP core process modules by: performing first Grand Free Energy computations, computing Nosanow Fermion Wave Equation results, performing second Grand Free Energy computations, simulating the one or more new candidate materials based on the Nosanow Fermion Wave Equation, confirming that the one or more new candidate materials based on the Nosanow Fermion Wave Equation meet the input requirements, and outputting information on confirmed ones of the one or more new candidate materials determined by the QMIP processing core via the output module.

In some implementations, the one or more QMIP core process modules can include: a Grand Free Energy module; and a Nosanow Fermion Wave module. In some implementations, wherein the first Grand Free Energy computation and the second Grand Free Energy computation are performed by the Grand Free Energy module, and wherein the Nosanow Fermion Wave Equation computations are performed by the Nosanow Fermion Wave module.

In some implementations, the one or more QMIP core process modules further include: a simulation module, an artificial intelligence module, a chemical bench module; and a metrology and interferometry module. In some implementations, the simulating of the one or more new candidate materials can be performed by one or more of the simulation module and the chemical bench module. In some implementations, the confirming of the one or more new candidate materials can be performed by one or more of the chemical bench module, the metrology and interferometry module, a test bench module, and a sample analyzer module.

In some implementations, QMIP system can further comprise a license and authorization security module, and a tradeoff module. In some implementations, the input requirements include one or more of chemical, electrical, thermal, and electromagnetic properties.

In some implementations, when the one or more new candidate materials includes two or more candidate materials, performing a tradeoff analysis using the tradeoff module and the artificial intelligence module. In some implementations, the input requirements include specification of a transmon or Josephson junction.

In some implementations, performing the first Grand Free Energy computations includes: calculating Grand Free Energy for a candidate new material, determining a Grand Partition Function Trace based on the Grand free Energy calculation, computing Hamiltonians, and applying a variational theorem to determine an energy upper bound for the candidate new material. In some implementations, computing the Nosanow Fermion Wave Equation results includes defining a Nosanow wave system, determining a commutator for free particles, determining a commutator for interaction particles, computing a time independent equation for the Nosanow Fermion Wave Equation, and applying electromagnetic field to the time independent equation for the Nosanow Fermion Wave Equation.

In some implementations, performing the second Grand Free Energy computations includes: determining an Eigenvalue spectrum solution and substituting into the Grand Partition Function Trace, applying the variational theorem to define solutions provided by the Nosanow Fermion Wave Equation, and defining phase transitions from solutions of Nosanow Fermion Wave functions to determine Tc.

In some implementations, the software instructions further include instructions that, when executed by the one or more processors, cause the one or more processors to perform further operations including: determining set-up parameters for configuring a quantum computer having one or more qubits based on a selected one of the candidate new materials, providing the set-up parameters to a quantum computer controller, determining one or more operational control parameters for the quantum computer based on the selected one of the candidate new materials, and providing the operational control parameters to the quantum computer controller.

In some implementations, the quantum computer controller is a classical computing device having one or more processors and the quantum computer controller is integrated with the QMIP system.

In some implementations, the software instructions further include instructions that, when executed by the one or more processors, cause the one or more processors to perform further operations including: sensing one or more of temperature, pressure, and energy applied to the one or more qubits, and adjusting one or more of the temperature, pressure, and energy applied to the one or more qubits to maintain coherency of the one or more qubits below Tc.

In some implementations, the one or more qubits includes a transmon. In some implementations, the one or more qubits includes a Josephson junction.

In some implementations, the energy includes one of microwave energy or laser energy.

In some implementations, the one or more qubits includes two or more qubits, and the software instructions further include instructions that, when executed by the one or more processors, cause the one or more processors to perform further operations. The further operations can include generating Nosanow Fermion Wave Equation functions to couple the two or more qubits and generating control signals for the quantum computer controller to maintain coherency of the coupled two or more qubits.

In some implementations, the one or more qubits include multi-dimensional Nosanow qubits, wherein dimensions of the multi-dimensional Nosanow qubits includes a spin dimension, and wherein determining the one or more operational control parameters for the quantum computer is based on Nosanow Fermion Wave Equation functions and includes utilizing the spin dimension of the multi-dimensional Nosanow qubits to generate control parameters and control signals from the quantum computer controller to maintain coherency of the multi-dimensional Nosanow qubits.

In some implementations, the spin dimension of the multi-dimensional Nosanow qubits is used to generate control signals to keep the selected one of the candidate new materials in a superconductor zone and to extend coherency of the multi-dimensional Nosanow qubits.

Some implementations can include a Quantum Mechanics Instruction Production (QMIP) system comprising: a QMIP processing core including one or more processors and one or more QMIP core process modules, an input module coupled to the QMIP processing core, an output module coupled to the QMIP processing core, a database library module coupled to the QMIP processing core, a material printer coupled to the QMIP processing core, a sample analyzer coupled to the QMIP processing core, and a test bench coupled to the QMIP processing core.

In some implementations, the one or more processors are coupled to a computer-readable medium having stored thereon software instructions that, when executed by the one or more processors, cause the one or more processors to perform operations. The operations can include obtaining input requirements via the input module, searching the database library module for an existing material matching the input requirements. The operations can also include when an existing material meets the input requirements, outputting existing material information via the output module.

The operations can further include, when an existing material does not meet the input requirements, determining one or more new candidate materials using the one or more QMIP core process modules by performing first Grand Free Energy computations, computing Nosanow Fermion Wave Equation results, performing second Grand Free Energy computations, simulating the one or more new candidate materials based on the Nosanow Fermion Wave Equation, confirming that the one or more new candidate materials based on the Nosanow Fermion Wave Equation meet the input requirements, and outputting information on confirmed ones of the one or more new candidate materials determined by the QMIP processing core via the output module.

In some implementations, the one or more QMIP core process modules include a Grand Free Energy module and a Nosanow Fermion Wave module. In some implementations, the first Grand Free Energy computation and the second Grand Free Energy computation can be performed by the Grand Free Energy module. In some implementations, wherein the Nosanow Fermion Wave Equation computations are performed by the Nosanow Fermion Wave module.

In some implementations, the one or more QMIP core process modules further include a simulation module, an artificial intelligence module, a chemical bench module, and a metrology and interferometry module. In some implementations, the simulating of the one or more new candidate materials is performed by one or more of the simulation module and the chemical bench module. In some implementations, wherein the confirming of the one or more new candidate materials is performed by one or more of the chemical bench module, the metrology and interferometry module, a test bench module, and a sample analyzer module.

In some implementations, the software instructions further include instructions that, when executed by the one or more processors, cause the one or more processors to perform further operations. The further operations can include determining set-up parameters for configuring a quantum computer having one or more qubits based on a selected one of the candidate new materials and providing the set-up parameters to a quantum computer controller.

The further operations can also include determining one or more operational control parameters for the quantum computer based on the selected one of the candidate new materials and providing the operational control parameters to the quantum computer controller.

DETAILED DESCRIPTION

Overview

Figure 1:
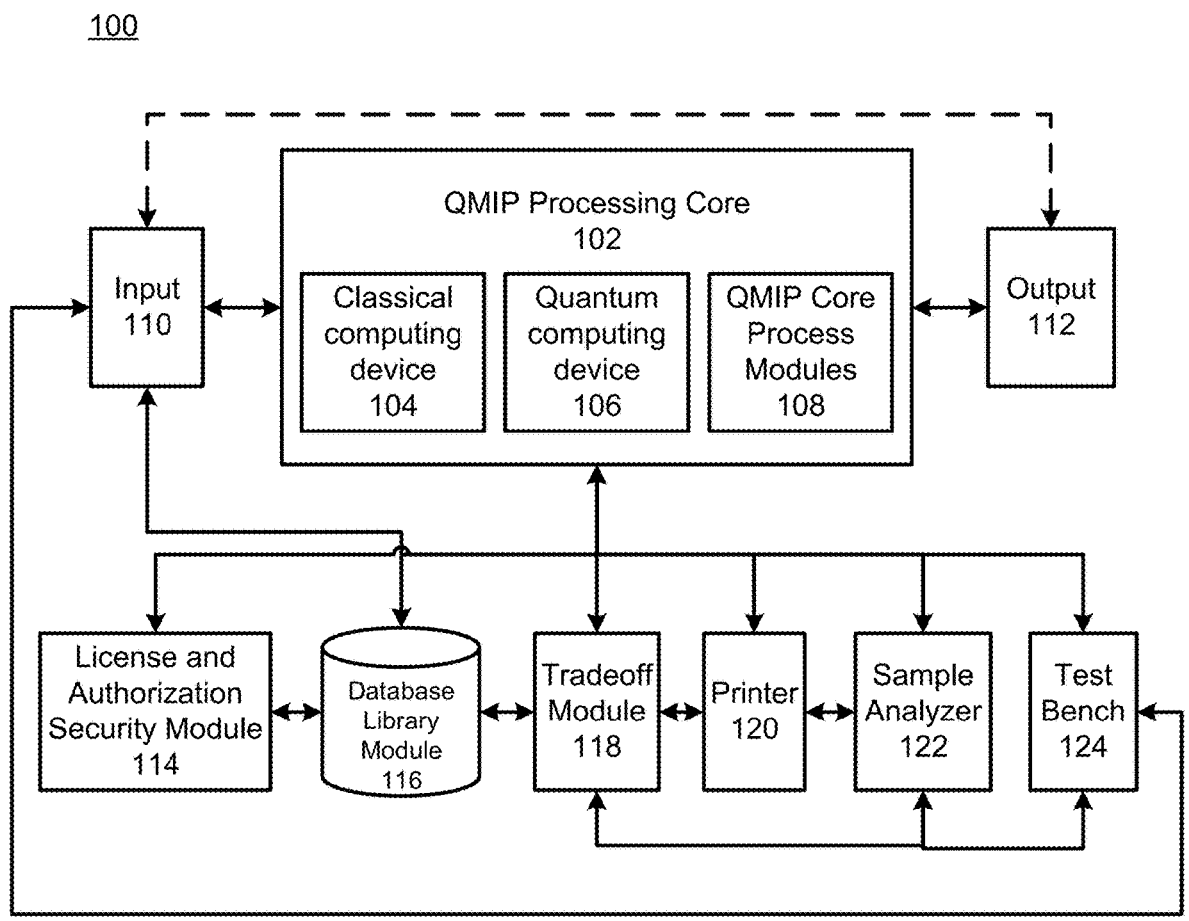
FIG. 1 is a diagram of an example QMIP system and associated environment in accordance with one or more implementations described herein.

Quantum mechanics is basically enshrined in three postulates: 1) the superposition principle, which governs the allowable possible states, 2) the measurement principle, which governs how much information about the state can be accessed, and 3) unitary evolution, which governs how the state of the quantum system evolves. Quantum mechanics describes the physical properties of the order of atoms and subatomic particles, and is the foundation of quantum physics, quantum chemistry, quantum field theory, quantum technology and quantum information science.

Most of classical physics can be described by quantum physics. Quantum mechanics differs from classical physics in that energy, momentum, angular momentum, and other quantities of a bound system are restricted to discrete values (quantization), objects have characteristics of both particles and waves (wave-particle duality), and there are limits to how accurately the value of a physical quantity can be predicted prior to its measurement, given a complete set of initial conditions (the uncertainty principle). Quantum mechanics is modeled mathematically most often using Algebras and applying Hamiltonians. Erwin Schrodinger defined a Wave Equation $H\psi=E\psi$ for quantum mechanics that provides information about the probability amplitude of energy, momentum, and other physical properties of a particle.

The genesis of the disclosed subject matter herein takes into account the commonly assumed idea, which is that properties of Non-Relativistic Quantum Systems are thought to be determined by the Schrodinger Wave Equation $H\psi=E\psi$. It is generally believed this principle has been fully established by experiment. This may not be the case and, among other things, it is this finding upon which our new theories of quantum mechanics and the various implementations of the disclosed subject matter developed from their practical application to real world technological problems are based upon. Prior to the disclosed subject matter, what has been enabled (e.g., technology applications, engineered products, scientific solutions, etc.) by way of quantum mechanics has been limited.

In general, a technical problem exists in that within the broadest range of science, organizations, and businesses there may be a need to understand and apply quantum mechanics to solve complicated challenges. Prior techniques have heavily relied on the Schrodinger Wave Equation, error correction algorithms, density function applications, simulation models, heuristics, and estimations. The prior art is such that each entity has used a process that is either ad-hoc, based on trial-and-error, or has introduced improvised adjustments. These prior solutions have not produced the accuracy, reliability, or stability sought for applications that can address complex technological problems and challenges that reflect social and economic needs.

Recent scientific, business and government sources indicate that typically at least several years of work and research are required before quantum mechanics can be leveraged to provide a solution to a given problem that achieves economic and national benefits. Problematic material and tool design as well as their production, program development and computation procedures plague necessary advances. Fundamentally, the underpinning physics has not progressed quickly enough to achieve essential breakthroughs. The following 11 areas exemplify this situation.

1) Quantum computing—there may exist a need to have longer lasting qubit coherence (and, consequently, an ability to process highly complex programs quickly) that is supported by enhanced quantum mechanics understanding, engineering and materials design.
2) Qubit design and creation—e.g., initiating and tuning (e.g., the qubit frequency)—precisely can be difficult and involves adverse trade-offs and controlling qubits that leverage more than a single two-state quantum system (e.g., clusters of degrees of freedom), which has thus far appeared out of reach for conventional practical applications.
3) Quantum circuits and supporting hardware, superconductors, spintronics, advanced materials and fabrication improvements—such as defining and producing new superconductors that reduce magnetic defects and residual quasiparticles—may be lacking in some conventional solutions. Substantial requirements for temperature and isolation control are critical and have been a limiting factor in making advancement in the quantum computing field. For example, semiconductor advancements are often limited by trial and error.
4) Molecule, advanced material, chemical and drug design and production—the process of defining bond energies and reaction requirements, structures, and the discovery and creation of new compounds with advantaged qualities is subject to expensive and time-consuming guesses and/or trial and error in some conventional approaches.

5) Metrology, interferometry and sensor applications—the existing technology to accurately measure matter and matter system thermophysical, compositional and microstructural, as well as electrochemical and electromagnetic properties may be limited. Conventional solutions often rely on numerous quantum noise dampening strategies that require various approximations, which is a significant disadvantage.

6) Quantum computer programming language and algorithms—these are subject to numerous limitations in conventional techniques. For example, conventional quantum computing languages and algorithms typically: (a) are not independent of circuit design; (b) require extensive code; (c) require significant error correction protocols; and (d) are not intuitive. Programming languages/algorithms are burdened by the challenge to address uncomputation needs related to entanglement. The existing approaches may not readily enable new algorithms to be written for problems that cannot be solved by classical computers alone.

7) Solutions to scientific problems involving quantum mechanics—existing quantum mechanical issues remain in numerous areas such as: general and quantum physics, cosmology, quantum gravity, high-energy and particle physics, astronomy and astrophysics, nuclear physics, atomic-molecular-optical physics, classical mechanics, condensed matter physics, plasma physics, and biophysics.

8) Instructions generation for direct production—an automatic compiler that sends process steps for actual matter or matter system product reactors and/or information production may not be readily available.

9) Multidimensional Micro-Macro Production Printer—a system matter or product reactor that receives instructions to extrude products and information in various forms at a micro and macro multidimensional level may not exist in conventional systems. For example, there may be a need for a system that would operate as an extension of an automated wet chemical bench and/or gas chromatography/mass spectrometry system to produce actual product material and/or information results. Such a production reactor printer system may not exist in conventional equipment.

10) Chemical Bench—an automated integrated wet chemical bench reactor and mass spectrometry system that is guided by a fully integrated Artificial Intelligence (AI) critical process system may not exist within conventional systems.

11) Test Bench—an automated integrated multi-parameter test system for compound or materials (e.g., pressure, torque, tension, electromagnetic); quantum computing (e.g., qubits, quantum chips, quantum dots); product (e.g., power conversion, fuel cell, battery, solar cell, etc.) that is guided by a fully integrated AI and critical process system may not exist in conventional systems.

Some implementations can include a system and method to address the above-mentioned technical problems or needs and that provides a computerized multilateral system built upon a new quantum mechanical calculation process (e.g., the Nosanow Wave Equation described below) given specific property inputs that produce actual product material and/or information. The system, referred to herein as the Quantum Mechanics Instruction Production (QMIP) system determines material candidates using a materials data base library module (discussed further below). Using a computer processing system leveraging an AI Module, candidates are associated with the properties of the inputs. Based on this association, the molecules, compounds, and materials are queued to predict their property qualities in the mechanical, thermal and electromagnetic categories by way of the Nosanow Fermion and Boson Wave Module, discussed in detail later in this specification.

In some implementations, the Nosanow Fermion and Boson Wave Module is used to analyze each candidate and provide inputs to a Grand Free Energy Module. A set of new and original Nosanow Wave Equations provides results which are the inputs into the Grand Free Energy Module. The Grand Free Energy Module then generates properties that are prioritized for best fit by leveraging the system's AI module. The original Nosanow Wave Equations, which constitute at least part of the new Nosanow Fermion and Boson Wave Module provide important information about the properties of both Fermion and Boson particles and systems which cannot be calculated (or would be less accurately calculated) using the Schrodinger Wave Equation. The series of equations in the Nosanow Fermion and Boson Wave Module are discernible and certifiable behavior predictors of quantum particles for Fermion and Boson systems. The equations define and predict both known and unknown non-relativistic information about these new and previously unknown particles and associated systems.

The QMIP system described herein provides a better understanding of particle matter and energy systems, their characteristic properties, how they behave, exist, interact, and are constructively manipulated compared to conventional techniques. The QMIP system can include one or more libraries of data about quantum physics with a new and novel understanding of how matter and energy actually work within the framework of the Nosanow Wave Equations.

More specifically, the QMIP system will take general requirements for properly building quantum computing components, superconductors, chips and computers, and other products and systems, and then will use newly generated insights into quantum mechanics phenomena (such as states, superposition, unitary time evolution, measurement, tunneling, and entanglement) in order to increase qubit coherence, which to date has been a significant limiting factor in the viability and performance of quantum computers and the use of quantum computing to create new products and systems and otherwise solve technological problems.

The QMIP system has the additional capability of providing better design inputs for a specific quantum chip and/or component based on new information for constructing junctions or gates that are derived in part from understanding superconductor discontinuity through the Nosanow Wave Equations.

The QMIP system can store chip or component characteristics, design, and fundamental materials properties—both macro and micro (e.g., mechanical, thermodynamic, electrochemical, electromagnetic)—in a library database.

The QMIP system can also perform extensive comparison analysis (e.g., similarities, contrasts, counteractions, etc.) of the macro and micro properties (e.g., mechanical, thermodynamic, electrochemical, electromagnetic) of the chips, components, material, compounds, matter and other products and systems designed and created using the QMIP system and their performance conditions that establish increases in qubit coherence times. It is well known that qubit coherence times has been a significant problem and limitation to existing quantum computer systems.

The QMIP system can provide tasks, conditions and standard instructions for how to produce the composition of matter materials.

In some implementations, the QMIP system incorporates an automated chemical bench and 3D matter printer that will create the composition and/or information of matter, qubits, chips and/or components for sampling and testing. Results of the QMIP system testing will be fed back into the QMIP system for analysis to evaluate trade-offs and production methods as well as to make suggestions about iterative aspects as needed. An exemplary embodiment of the QMIP system is set forth in FIG. 1.

Advantages and Technical Solutions

Some implementations can include a quantum mechanics calculator that can provide precise predictions of how quantum objects and systems behave and may be controlled as well as how they drive macroscopic matter properties and behavior. Some implementations can include enhancements to DFT (Density-functional Theory), CALPHAD (CALculation of PHAse Diagrams) and VQE (Variational Quantum Eigensolver) based simulations that can produce unmatched accuracy advantages compared to conventional solutions.

A Quantum Mechanics Instruction Production system leverages more complex and efficient simulation algorithms that result in accurate material predictions. Referring to stage 2 of Table 1, a QMIP system describes particle and system quantum mechanical properties more accurately as well as predicts and produces new superfluids and superconductors that can operate at low and high temperature ranges. Also, the QMIP system stores, generates, manages and delivers large amounts of data about material properties and characteristics (in terms of both classical and quantum mechanical physics) that results in expanded repositories and new quantum libraries related to material selection. Further, the QMIP system enables greater & faster computing power that will run complex algorithms by efficiently leveraging quantum, and classical computer principles and capabilities. The QMIP system creates more efficient complex algorithms (applies a greater number of mathematical principles and new solution processes that enhance existing models and simulations as well as creates new ones that are employed to predict the optimal compositions and structures based on select properties).

Referring to stage 3 of Table 1, the QMIP system describes particle and system quantum mechanical properties more accurately, which can lead to the discovery and design of new materials, such as superconductors that can operate on a range from low to high and beyond temperature limits; and that may be used in the material synthesis process. For example, high temperature can be anything above 20 degrees Kelvin and low temperature can be temperatures below 20 degrees Kelvin. Temperatures beyond can include temperatures above the ambient temperature of liquid nitrogen e.g., 77 degrees K. Also, the QMIP system stores, generates, manages and delivers large amounts of data about material properties and characteristics needed for successful fabrication (in terms of both classical and quantum mechanical physics) that result in expanded repositories and new quantum libraries related to material fabrication. Further, the QMIP system provides greater and faster computing power that runs complex algorithms by efficiently leveraging operational processes based on enhanced quantum, and classical computer principles and capabilities. The QMIP system can creates more efficient complex algorithms (applies a greater number of mathematical principles and new solution processes that enhance existing models and product examination as well as creates new ones that are employed as test simulations of the synthesizing of compounds).

Referring to stage 4 of Table 1, the QMIP system describes: particle, atom and system quantum mechanical properties more accurately; that is used to design or identify new superconductors that operate on a range from low to high and beyond temperature limits, which can be used for performance testing. For example, high temperature can be anything above 20 degrees Kelvin and low temperature can be temperatures below 20 degrees Kelvin. Temperatures beyond can include temperatures above the ambient temperature of liquid nitrogen e.g., 77 degrees K. Also, the QMIP system stores, generates, manages and delivers large amounts of data about synthesized material performance characteristics (in terms of both classical and quantum mechanical physics) that results in synthesized compound materials repositories and quantum libraries related to material performance tests. Further, the QMIP system provides greater and faster computing power that runs complex algorithms by efficiently leveraging operational processes based on enhanced quantum, and classical computer principles and capabilities. The QMIP system creates more efficient complex algorithms (applies a greater number of mathematical principles and new solution processes that enhance existing models and product examination processes as well as creates new ones that are employed as test simulations of the actual synthesized material candidate's performance in a simulated actual point of use and under simulated actual use conditions).

In reference to stage 5 of Table 1, the QMIP system describes particle and system quantum mechanical properties more accurately; designs and specifies new superconductors that operate on a range from low to high and beyond temperature limits, and that can be used for industrial synthesis (reactor vessel line construction and operational requirements—material, energy, pressure, temperature, electrical power, automation and time). For example, high temperature can be anything above 20 degrees Kelvin and low temperature can be temperatures below 20 degrees Kelvin. Temperatures beyond can include temperatures above the ambient temperature of liquid nitrogen e.g., 77 degrees K. The QMIP system stores, generates, manages and delivers large amounts of data about industrial synthesis processes (in terms of both classical and quantum mechanical physics) that result in synthesized compound materials repositories and quantum libraries related to material synthesis on an industrial level.

A Quantum Mechanics Instruction Production system provides greater and faster computing power that runs complex algorithms by efficiently leveraging operational processes based on enhanced quantum, and classical computer principles and capabilities.

The QMIP system defines, explains and predicts known non-relativistic particle information about the systems; provides information for quasiparticle systems (non-relativistic); and gives a better understanding of how matter and energy works, behaves, exists, interacts, and how its properties can be manipulated for industrial purposes.

Figure 2:
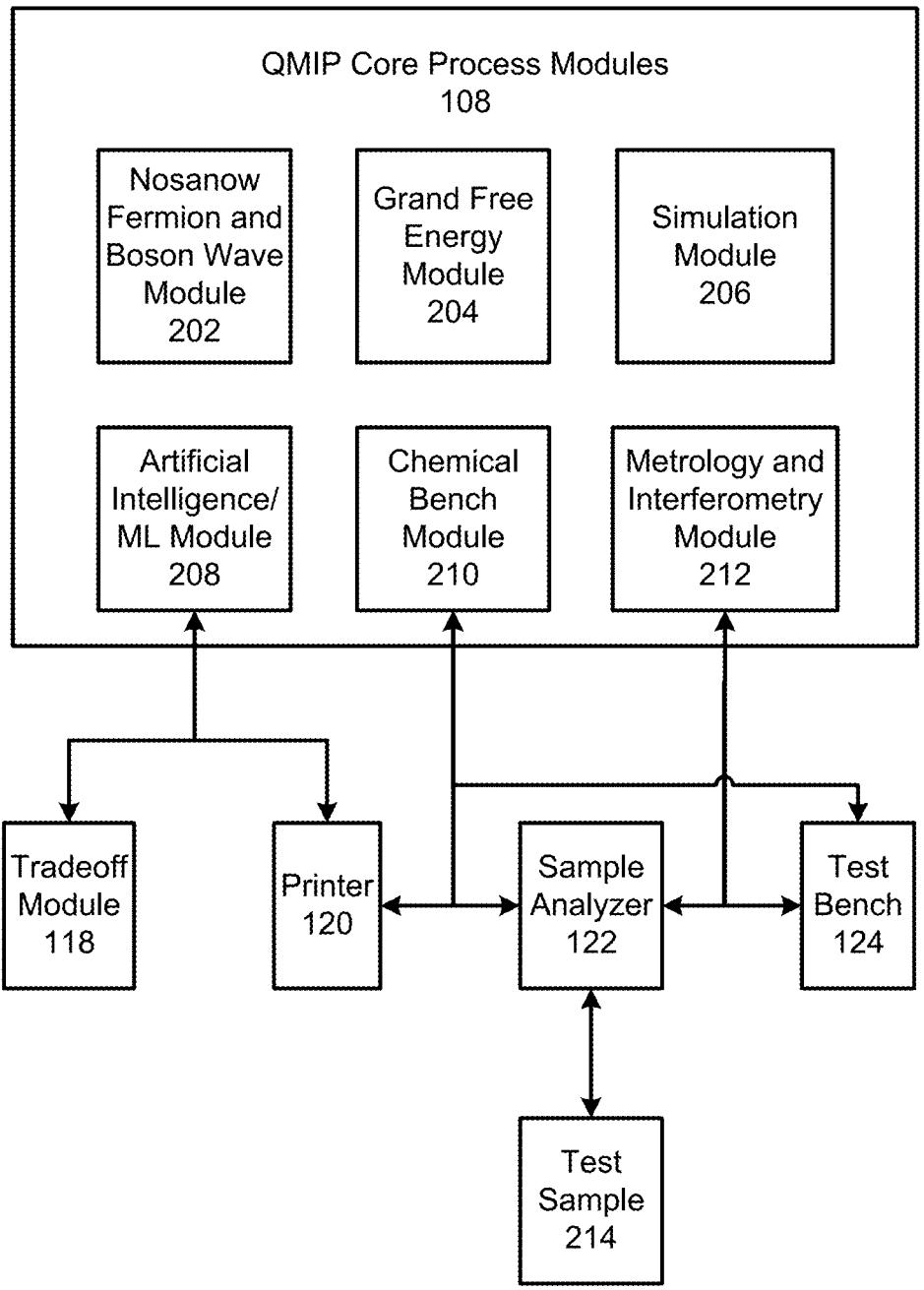
FIG. 2 is a diagram showing details of an example QMIP processing core in accordance with some implementations.

Description of FIGS. 1 and 2

As shown in FIG. 1, the QMIP system 100 includes a QMIP processing core 102 having a classical computing device 104, a quantum computing device 106, and QMIP core process modules 108. The classical computing device 104 and/or the quantum computing device 106 can be integrated with the QMIP or can each be standalone devices.

The QMIP processing core 102 receives input 110 and produces output 112. The dashed line connecting the input 110 and output 112 indicates that the input 110 and output 112 sides can be separate modules or can be integrated into one module including both input and output processing and data for the QMIP system 100.

In addition to the QMIP processing core 102, input 110 and output 112, the QMIP system 100 includes a license and authorization security module 114, a database library module 116, a tradeoff module 118, a printer 120, a sample analyzer 122, and a test bench 124.

In operation, the input/output modules (110, 112) generate and issue instructions that control other modules of the QMIP system 100. These instructions can be written in a format or code that is appropriate to the particular target module so that no further compiling or translation of the instructions is required for the instructions to have their intended control. Just as one example, the input/output modules (110, 112) may issue instructions that control the wet chemical bench (e.g., test bench 124) to automatically mix compounds and do so at specified pressures and temperatures. The input/output modules (110, 112) could then issue instructions to cause the printer module 120, which could be implemented as a lithography machine, and its robotics to create a Josephson junction embedded in a wafer. The input/output modules (110, 112) could then issue instructions to invoke the test bench module 124 in order to test the properties and performance of a candidate product. For example, the test bench module 124 could be controlled so that it places the wafer in a holder and passes electrons through it in order to test voltage response. If the results of the product are satisfactory, the input/output modules (110, 112) could generate a set of instructions that could be given to and used by a third-party manufacturer of chips to fabricate them using its selected lithography machine, such as one made by ASML, Nikon, Canon, etc.

In some implementations, the QMIP system 100 provides an end-to-end system that enables the identification of requirements for a substance or product, the automatic specification of the substance or product (e.g., how to make the substance or product and using what ingredients), the fabrication of the specified substance or product, and the testing of the specified substance or product to determine whether it provides the desired properties or performance. The input/output modules (110, 112) can include a processor for carrying out these operations and a suitable user interface.

In some implementations, the QMIP system 100 includes a number of components, which considered individually and/or as a combination, are unconventional and novel. The QMIP system 100 is a technological solution to a technological problem and provides new functionalities and capabilities to quantum computers and other computing technologies, described herein and in greater detail in the remainder of this specification. The QMIP system 100 itself provides new functionalities and capabilities that previous solutions involving conventional theories of quantum mechanics do not provide. These capabilities and functions are provide, in part by the core processes of the QMIP system.

FIG. 2 is a diagram showing details of example QMIP core processing modules 108 in accordance with some implementations. The core processing modules 108 include a Nosanow Fermion and Boson Wave Module 202, a Grand Free Energy Module 204, a simulation module 206, an artificial intelligence (or machine learning) module 208, a chemical bench module, a metrology and interferometry module 212.

Some implementations can include artificial intelligence (AI) functionality (e.g., provided by the AI module 208) including algorithms that parse newly discovered data from the modules (in particular the Nosanow Fermion and Boson Wave Module 202), learn from the data, and then apply the resulting learned information to make decisions (e.g., generate instructions) for the entire system to perform.

Unique machine interface instructions that automatically guide the chemical bench module 210, test bench 124, sample analyzer 122 and printer modules 120 through coherent requirements.

An automated full wet bench operation with integrated automated gas analytic chromatography and mass spectrometry that combines features of each system to identify substances within a test sample (e.g., 214).

In some implementations, the QMIP system 100 includes a multi-dimensional matter printer (e.g., 120) capable of extruding micro-macro compounds and composites.

QMIP Material Design

Table 1 illustrates an exemplary general material design workflow according to one embodiment of the disclosed subject matter. As illustrated in Table 1, the second row (challenges) reflects deficiencies and drawbacks of known approaches to material design as compared to the third row (advantages), which reflects at least some of the benefits and improvements brought by the disclosed subject matter:

The QMIP system 100 and associated methods described herein provide numerous benefits and applications. For example, the QMIP system 100 describes particle and system quantum mechanical properties more accurately, discovers new superconductors which operate at a range from low to high and beyond temperature limits and that can be used to define new and existing material properties. For example, high temperature can be anything above 20 degrees Kelvin and low temperature can be temperatures below 20 degrees Kelvin. Temperatures beyond can include temperatures above the ambient temperature of liquid nitrogen e.g., 77 degrees K.

Some implementations can include a QMIP system that stores, generates, manages and delivers data about material properties and characteristics (in terms of both classical and quantum mechanical physics) resulting in repositories and libraries of material micro and macro properties and their use. For example, material properties and characteristics data can be stored in the database library module 116. In some implementations, the QMIP system 100 can provide computing techniques to run complex algorithms to be efficiently leveraging innovative quantum, and classical computer principles and capabilities.

In some implementations, the QMIP system 100 can provide more efficient complex algorithms and apply a greater number of mathematical principles and new solution processes that enhance existing models and industrial reactor material synthesis procedures and processes that are optimized for material adoption and use.

For example, with conventional techniques, an engineer designing a new wing box, a superconductor for a special environment, a photovoltaic panel, a battery, or a windmill blade would, as her first step, retrieve electronic version of dozens or more volumes of material design. She may have the previous successful projects as examples to start. The choices may be many, and determining the "best" material for a problem may depend on requirements, costs, practicability, time, toxicity, stability, starting conditions, steady state conditions, overload conditions, lift, drag, magnetic properties, etc. From previous successes, she could try different variations to get better performance. The conventional process often involves research with an incomplete understanding of how matter and energy works, trials of new combinations of material, and lots of errors as well as rejections.

One technical problem in new material development includes choosing the best material for a project involves what worked before, disparate hard and soft copy volumes of material science based on incomplete data and approximations of how matter and energy actually work in situ. The engineer choosing the "best" material is limited by imperfect underlying matter and energy theory, disparate libraries of knowledge, and candidate materials trial and error results.

In some implementations, the QMIP system 100 can explain and predict behavior of quantum particles through the mathematically proven Nosanow Wave Equations for Fermion and Boson particles and systems. The QMIP system 100 can translate behaviors from the quantum micro-level to the macro-level in the categories of electromagnetic and chemical properties, just to name a few.

The QMIP system according to an embodiment of the present disclosure incorporates one or more database libraries (e.g., 116) of material science with a new and novel understanding of how matter and energy actually work. The QMIP system 100 takes the requirements of a project, prepares initial solutions, tradeoffs, and definitions of best criteria. The system can then provide a feasible solution for composites, alloys or compounds beginning with energy interactions leading to molecular structures that address the requirements, tradeoffs, and/or optimization criteria.

The QMIP system 100 has the additional capability of leading to better matter and energy description and characteristics of specific chemical compounds, drugs, isotopes, elements, ions, nuclides and/or compositions of matter.

QMIP stores characteristics of the compound or matter (such as free and interactive energies) in the one or more libraries (e.g., 116). QMIP can compare and contrast compounds matter and energy functions and their characteristics. QMIP can start with a set of initial solutions and find solutions that fit the requirements, tradeoffs and best criteria as compared to the original solutions. QMIP can also find solutions that are not as "good" as the initial solutions, but still satisfy the requirements.

QMIP incorporates a wet chemical bench system 210 and a 3-D matter printer 120 that produce the candidates for sample testing (e.g., using 122) and form fit testing. Results from testing will be fed back through the QMIP system 100 to evaluate implications and make candidate improvement suggestions as needed.

QMIP artificial intelligence 208 can guide an engineer to discover the right tradeoffs for her problem. QMIP will be able to test the candidate samples (e.g., using test bench 124) and provide feedback to the Artificial Intelligence to enable advancements in process improvement programing.

The QMIP system can predict chemical properties and creates new compounds; predict compounds to meet requirements; and predict chemical properties of new compounds. QMIP analyzes a sample and predicts new compounds with similar or enhanced chemical properties that require less matter and create less byproducts. QMIP predicts new superconductors to work in specific temperature and pressure ranges.

QMIP predicts and creates new superconductors based on the instructions for production.

How does an engineer (quantum investigator) create a new compound, based on their requirements, using the Quantum Mechanics Instruction Production (QMIP) system and platform?

First, the engineer needs to choose a problem from the possibilities that the equations can address. The following partial list sets forth some non-limiting examples:

Superconductor theory and new superconductors,
Superfluid theory and new superfluids,
Quantum computers and Quantum Computer components,
Creating qubits having more than two states and decreasing the decoherence in the Quantum Computer system,
Improved Josephson Junctions used in quantum computers,
Solid state electronics and improved semiconductors, to include:
Photovoltaic,
Thermo Generator,
Light Emitting Diode (LED)
Organic light Emitting Diode (OLED)
Semiconductor lasers,
Charged Coupled Device (CCD)
Electric storage devices or improved batteries
Chemical agents such as catalyst, inhibitors and emulsifiers
A catalyst's improvement of the Haber-Bosch process for fertilizer production such as understanding the quantum mechanics involved and optimizing the tradeoffs among yield, by-products and energy used,
Improve understanding of Low Energy Nuclear Reaction (LENR) reactions,
Other Chemical reactions and chemical insights,
Improved nuclear shell model theory,
Ability to trace the quantum particle theory through the electromagnetic process, to the macro world of a systems thermodynamic properties,
Nuclear Reactions to include fusion and plasma processes,
Understanding the existence of isotopes,
Heat Generation such as Low Energy Nuclear Reaction (LENR),
Advanced Quantum Simulations,
Better material designs,
Improvements in the periodic table based on the Nosanow Wave equations,
Creation of a chemical bench to make the new substances,
Creation of a 3D matter and energy printer to create the correct form factor for testing the substance in the practical application of the component, circuit, system, quantum computer, or medical application,
Ability to test the newly created compounds to ensure the chemical bench correctly built the compound and that the compound works as predicted,
Ability to test that the new form factor or circuit works, and
How matter and energy work and how to isolate and make special, desired properties appear.

As examples, the engineer needs to determine why a superconductor is electron frictionless or why sunlight is turned into electricity. With a starting solution, what works now or before, the QMIP uses the starting solutions' known solution $(Xx_nYy_m)$ and uses the artificial intelligence module 208, Nosanow Fermion Wave Module 202, and Grand Free Energy Module 204 to obtain the Grand Free Energy.

The Grand Free Energy is key to determining the bonds, frequency, chemical properties, and thermodynamic variations that make the initial solution unique.

DESCRIPTION OF FIGS. 3-7

Figure 3:
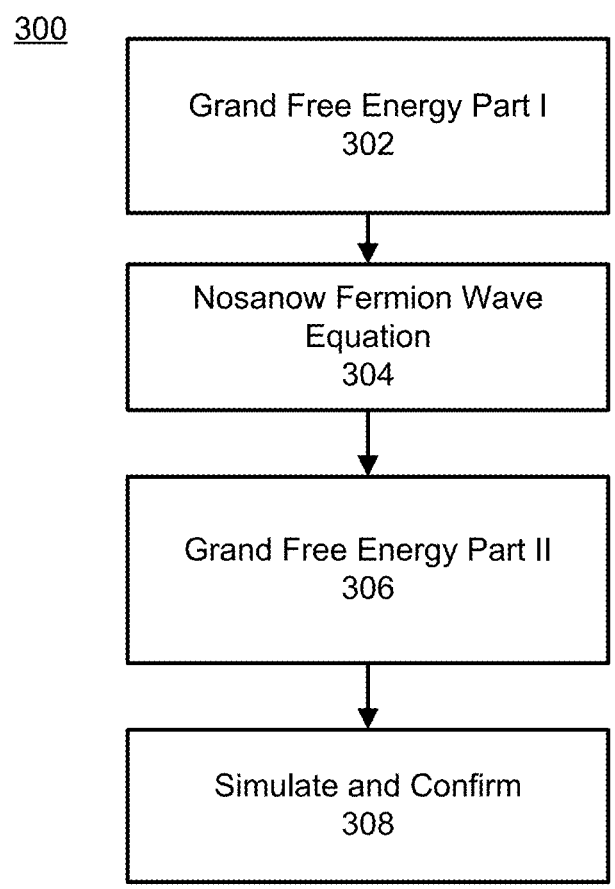
FIG. 3 is a diagram showing an example QMIP process in accordance with some implementations.

FIG. 3 shows a flowchart for an example process 300 of discovering and/or creating a new material such as a superconductor or superfluid, or other product using the QMIP system (e.g., 100) in accordance with some implementations. Processing begins at 302, where a first portion of a Grand Free Energy equation is calculated. The Grand Free Energy can be calculated using the Grand Free Energy module 204. Processing continues to 304.

At 304, Nosanow Fermion Wave Equation functions are computed using, for example, the Nosanow Fermion and Boson Wave Module 202. Processing continues to 306.

At 306, a second portion of the Grand Free Energy is calculated using, for example, the Grand Free Energy module 204. Processing continues to 308.

At 308, one or more candidate new materials is simulated and confirmed.

The details of each of steps 302-308 are described below in conjunction with FIGS. 4-7, respectively. This is example shows how an implementation of the disclosed subject matter can be used find superconductors or superfluids by identifying phase discontinuities using modules such as the simulation module and the AI module described herein.

Figure 4:
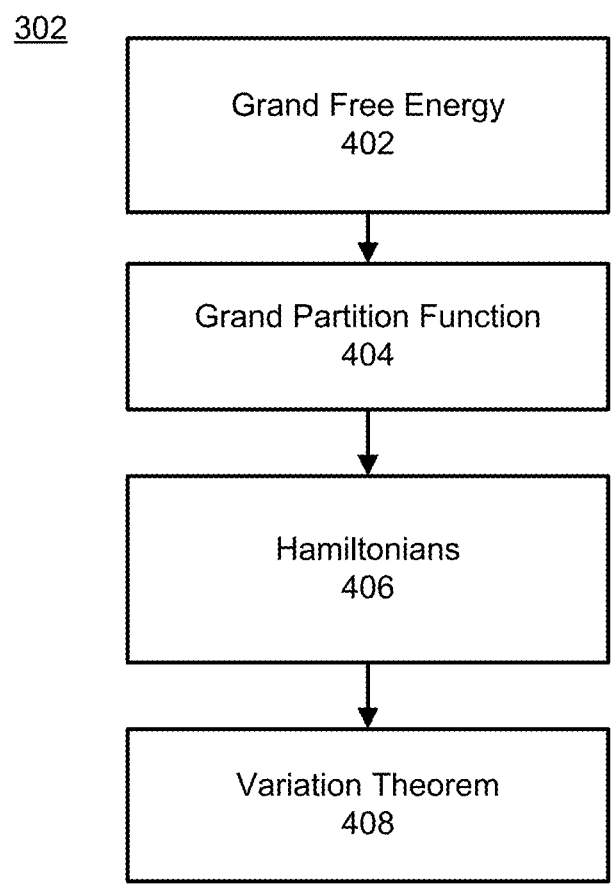
FIG. 4 is a flowchart showing details of an example Grand Free Energy process in accordance with some implementations.

FIG. 4 is a diagram showing details of the first Grand Free Energy calculations 302 in accordance with some implementations. Processing begins at 402, where the QMIP processing begins with the Grand Ensemble from which one determines the Grand Free Energy that may be necessary. The aim is to determine where $T_c$ must exist.

$$\text{Grand Free Energy } \Gamma(T, V, \mu) \equiv -T \ln Z (T, V, \mu); \qquad (1)$$

the Grand Ensemble is used to calc the Grand Free Energy, processing continues to 404.

At 404, the Partition Function is used to calculate the Grand Free Energy in which a Hamiltonian and wave functions are to be recognized. Here temperature (T) is represented as energy.

$$\text{Grand Partition Function } Z(T, V, \mu) \equiv Tr[e^{-\beta H(\mu)}], \qquad (2)$$

$$\beta \equiv \frac{1}{T}; \text{ temperature is written in energy units}$$

Processing Continues to 406.

At 406, the general Hamiltonian (note: the classical Hamilton is defined by potential and kinetical energy) can now be worked by the Nosanow Hamiltonian, $\hat{H}_{CF}$. One now can describe the system more accurately and use this Hamiltonian in ways to solve for the Wave functions. One can now use the Variational Theorem for establishing an approximation.

$$\text{Hamiltonians } \hat{H}(\mu) \equiv \hat{H}_{CF} - \mu \hat{N}; \hat{H}_{CF} \cong [\hat{H}_F + \hat{H}_{GP}] + [\hat{H}_\alpha] \qquad (3)$$

$\hat{H}_{CF}$ is a Nosanow Hamiltonian designated here as the Cooper Fermion Hamiltonian. This is turn refines the BCS theory making it more complete, accurate, comprehensive and expansive.

$\mu$ is the chemical potential.
$\hat{N}$ is number of particles.
$\hat{H}_F$ is the free particle Hamiltonian.
$\hat{H}_{GP}$ is the Grand Pairing Hamiltonian.
$\hat{H}_\alpha$ is the Interaction Hamiltonian. Processing continues to 408.

At 408, the Variational Theorem is used to get the best fit estimate of $H_F$ and $H_{GP}$. Note: the parabola representation is just an example to illustrate a starting point to establish the energy upper bound.

$$\text{Variation Theorem (Hamiltonian) } v = v_0 + (\tfrac{1}{2})(x-x_0)^2; \\ \text{one ex. used to determine energy upper bound} \qquad (4)$$

Figure 6:
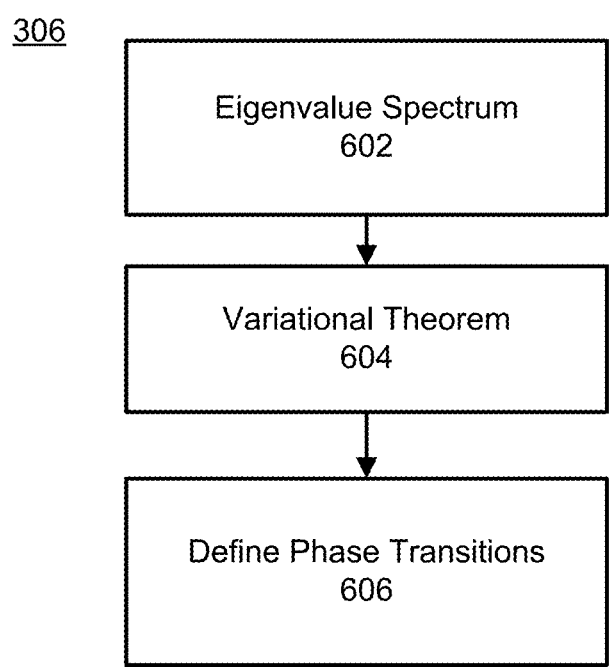
FIG. 6 is a flowchart showing details of an example Grand Free Energy process in accordance with some implementations.

Referring to FIG. 6, the engineer will input the problem in the Input/output modules (110, 112). The investigator needs to enter the requirements, starting solutions, library initial conditions, desired chemical properties, and tradeoff properties. Good requirements are helpful for any problem-solving exercise. Incorrect requirements can lead to solving the wrong problem. The requirements should be feasible, verifiable, traceable, understandable and complete. It is envisioned that the requirements component drives the investigation. The engineer may have several starting solutions that are known to have some of the desired characteristics, such as a superconductor that works at a higher temperature or a photovoltaic material that works with XX % conversion efficiency. The database library 116 are consulted to check for additional starting solutions or feasible solutions that may already exist. In a later exemplary case, the engineer can take a sample of the original material and use the analysis of the original sample(s) to be the starting solution. The desired output's chemical properties could include the ability for electrons to flow without friction, solar and heat thermals to cause the flow of electrons, ability to give off heat, ability to bind or repel, increase or decrease magnetism, ability to be a catalyst and create a chemical reaction with minimal byproducts, etc. The above requirements are akin to functional requirements, which are the properties the user desires. Non-functional requirements are the technical requirements dealing with performance issues. These non-functional requirements are often tradeoff properties, such as cost, manufacturability, stability, toxicity, and other special properties. Creating a room-temperature superconductor that can be unstable at normal atmospheric pressure but toxic might be of little value. The same would be the case for a photovoltaic material with a high sun light to electricity conversion rate but at a high cost.

The input module 110 is an intensive and initially time-consuming module into which the correct context of the request must be established. Once done, the input module 110 will save a tremendous amount of effort and help focus the investigator's search.

According to an embodiment, and referring to FIG. 1, the database library 116 will contain data from the modified periodic table (recalculated based on the QMIP's newly acquired knowledge and insights) and will progress as the QMIP assists the investigators with more searches and the creation of new materials, products and so forth. The knowledge of material science will be entered into the database library 116 and in some cases corrected or updated or flagged where conflicts exist. In some cases, an engineer's search will start and end with the database library 116 as the solution may already exist as a result of previous searches or QMIP process runs. The Artificial intelligence module 208 (FIG. 1) will data mine the database library module 116 to determine what answers and/or near answers may exist.

Access to the database library module 116 (and to the QMIP system in general) can be controlled by a license and authorization security module 114. This security module 114 can help prevent unauthorized users, searches, retrieval of information and input into the database library 116 without previous authorization, permissions, or license. It is foreseen that an engineer's search and discoveries may be kept secret/confidential within the QMIP system 100 and the database library 116 and kept confidential for an appropriate period of time. In one embodiment, restrictive warnings could be issued due to the creation or identification of a material or product having a high toxicity or low stability that in turn could trigger required special oversight. Preferably, prevention of false data being entered into the database library 116 would be flagged and denied storage. A specific company's research and development work would be kept on secure nodes or Kubernetes to prevent competitors from benefiting from the company's efforts. The license and authorization security module 114 could also have company/organization/country specific restrictions for specific subjects such as nuclear weapons research or other research involving nuclear reactions.

In some implementations, the QMIP process could begin with an initial solution and leverage the Nosanow Wave Equations in combination with procedures such as that set forth herein.

Figure 5:
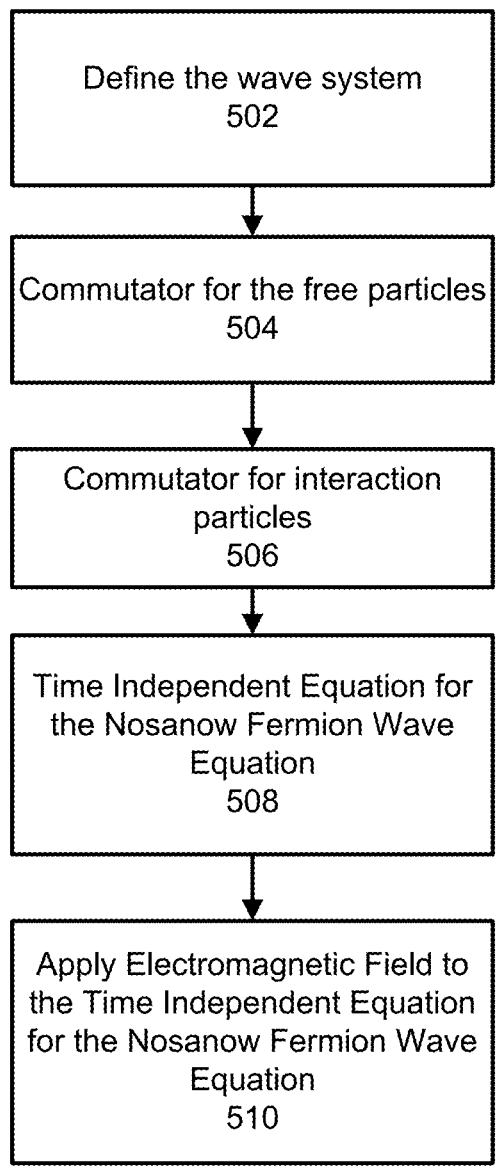
FIG. 5 is a flowchart showing details of an example Nosanow Fermion Wave Equation process in accordance with some implementations.

FIG. 5 is a flowchart showing details of an example Nosanow Fermion Wave equation process 304 in accordance with some implementations. Processing begins at 502, where the wave function is defined with the Heisenberg Equation of Motion, a wave description of the particle. For example:

Define the wave system $i\hbar \hat{\psi}(\vec{r}, \vec{S}) = [$ (5)

$$[\hat{\psi}(\vec{r}, \vec{S}), \hat{H}_{CF}] \equiv [\hat{\psi}(\vec{r}, \vec{S}), \pm \hat{H}_{Free} + \hat{H}_{\pi}]$$

Heisenberg Eq. of Motion, used to eventually calc the Tr(Trace)

QMIP applies the quantization rules to Fermions and Bosons (in relationship to the process of the canonical field quantization). Processing continues to 504.

At 504 and 506, the Wave Equation is solved for using commutators for free particles and commutators for the interaction particles.

Commutator for the free particles $[\hat{\psi}(\vec{r}, \vec{S}), \pm \hat{H}_{Free}] = \pm (\vec{r}, \vec{S}) \hat{\psi}(\vec{r}, \vec{S})$; (6)

Quantization rules for Fermi particles

Commutator for the interaction particles $[\hat{\psi}(\vec{r}, \vec{S}), \hat{H}_{\pi}] =$ (7)

$$\frac{1}{V} \sum_{\eta_1} \sum_{\eta_2} \sum_{\eta_4} \int_V d\vec{r}_2 \langle \eta_1, \eta_2 | V_{\pi}(\vec{r}_1, \vec{r}_2) | \eta_4, \eta_3 \rangle \times$$

$$\psi^{\dagger}(\vec{r}_2, \eta_2) \psi(\vec{r}_2, \eta_4) \hat{\psi}(\vec{r}, \vec{S})$$

Quantization rules for Fermi particles

Eigenvale Spectrum (soln.) of $E\psi(\vec{r}, \eta)$; (10)

substitute into Grand Partition Function Trace

Processing Continues to 508.

At 508, the QMIP system combines the free and interaction Hamiltonians to create the new Nosanow Fermion Wave Equation.

The Time IndependentEquation (8)

for the NosanowFermion Wave Equation:

$$\left\{ \pm D(\vec{r}, \vec{S}) + \frac{1}{V} \sum_{\eta_1} \sum_{\eta_2} \sum_{\eta_4} \int_V d\vec{r}_2 \langle \eta_1, \eta_2 | V_{\pi}(\vec{r}_1, \vec{r}_2) | \eta_4, \eta_3 \rangle \times \right.$$

$$\left. \psi^{\dagger}(\vec{r}_2, \eta_2) \psi(\vec{r}_2, \eta_2) \right\} \psi(\vec{r}, \eta) = 0$$

Processing Continues to 510.

At 510, the QMIP generalizes the Nosanow Fermion Wave Equation to the Electromagnetic Field.

Apply Electromagnetic Field to the Time (9)

IndependentEquation for the NosanowFermion

Wave Equation: $\left\{ \pm D(\vec{r}, \vec{S}) + \frac{1}{V} \Sigma_{\eta_1} \Sigma_{\eta_2} \Sigma_{\eta_4} \int_V d\vec{r}_2 \right.$ $$\left. \langle \eta_1, \eta_2 | V_{\pi}(\vec{r}_1, \vec{r}_2) | \eta_4, \eta_3 \rangle \times \psi^{\dagger}(\vec{r}_2, \eta_2) \psi(\vec{r}_2, \eta_2) \right\} \psi(\vec{r}, \eta) = 0$$

FIG. 6 is a flowchart showing details of an example second portion of a Grand Free Energy process 306 in accordance with some implementations.

One actually solves for the wave eigenfunctions and eigenvalues. Processing begins at 602, where the QMIP system determines the wave eigenfunctions and eigenvalues Eigenvalue Spectrum (soln.) of $E\psi(\vec{r}, \eta)$; (10)

substitute into Grand Partition Function Trace

Processing Continues to 604.

At 604, the QMIP system uses the Variational Theorem again to help define solutions of the wave functions, which in turn helps define the properties of potential superconductors.

Variational Theorem helps define $\psi(\vec{r}, \eta)$ and the (11)

meaning of the solutions given by the wave functions

Processing Continues to 606.

At 606, QMIP determines phase transitions such as the critical temperature for the potential superconductor and/or superfluid.

Define the Phase Transition from the solutions (12)

$(T, V, \mu)$ of the wave functions to determine $T_c$

An important insight is that the Nosanow Wave Equation greatly improves the Density Function Theories with a more exact solvable wave equation as well as improves the electron cloud estimate.

Improved Density Function Theories (DFT) will simulate the chemical bonds, compounds, and chemical properties (i.e., superfluids and/or superconductors). CALPHAD stands for CALculation of PHAse Diagrams. The Nosanow Fermion Wave Module 202 will actually address phase discontinuities which CALPHAD cannot do today. VQE stands for Variational Quantum Eigensolver which will be improved with a better ansatz state provided by the Nosanow Fermion Wave Module 202 to find the ground state the molecules, as shown below in conjunction with FIG. 7.

Figure 7:
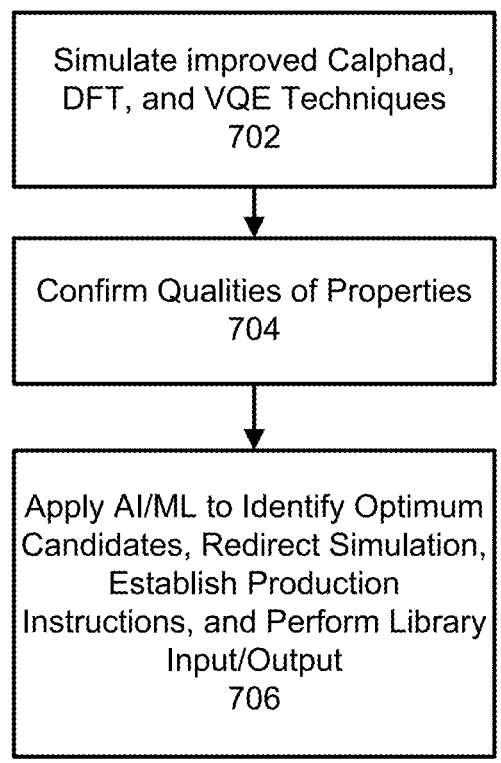
FIG. 7 is a flowchart showing details of an example QMIP simulate and confirm process in accordance with some implementations.

FIG. 7 is a flowchart showing details of an example QMIP simulate and confirm process 308 in accordance with some implementations.

Processing begins at 702, where a simulation is performed using improved Calphad, DFT, and VQE techniques as discussed above. (13) Processing continues to 704.

At 704, the engineer or designer conducts experiments to confirm the tradeoff requirements are satisfactory for the specific application. For example, the qualities of properties are confirmed given measurement standards of the requirements. (14) Processing continues to 706.

At 706, the Artificial Intelligence module 208 establishes or recognizes the necessary QMIP process and then helps evaluate from the millions and billions of candidates for the requirements best fit. This process could be even further enhanced by Quantum Computers. For example, apply artificial intelligence to identify optimum candidates, redirect simulation, establish production instructions, and perform library input/output. (15)

The engineer uses the Database Library of chemical potentials and bonds to find the correct and ideal combinations of matter. Given that the QMIP has selected candidates for the requirement properties, one can now complete the tradeoffs of a superconductor, for a malleable metal to use in a Tokamak, for example. A Tokamak (Russian: Токама́к) is a device which uses a powerful magnetic field to confine a hot plasma in the shape of a torus. The Tokamak is one of several types of magnetic confinement devices being developed to produce controlled thermonuclear fusion power.

Throughout the process, the artificial intelligence module 208 guides the selection of candidates and how the candidates are balanced with tradeoffs and the requirements using, for example, trained model as discussed below. The AI Module 208 helps guide all Benchwork via the instructions for production. For example, the AI Module 208, given the Nosanow Fermion Wave Module's 202 results, can provide the process steps for how the compound is to be created. In some implementations, the AI module 208 can be configured to model the compound (or system) using the Nosanow wave equations, which describe how the system behaves. (e.g., bonds, valence cloud, etc.). The AI module 208 can inform which compound is "best" based on the modeled candidate compounds and their respective properties. The tasks, conditions and standards are provided to the automated benches and the printer extruder for the wire shielding of the Tokamak. These steps can be repeated as the process may have several estimates that demand refinement.

Depending upon circumstances many variations of the step process briefly outlined above can occur. The numbering is not meant to be a strict sequence that must be followed but merely a symbolic outlining of a general process.

Most of the steps outlined above are broken down between the Nosanow Fermion Wave module 202 and the Grand Free Energy 204 Modules. The Grand Free Energy Module 204 solves for quantities such as the thermodynamic properties, phase transitions, and electromagnetic characteristics.

The Nosanow Fermion and Boson Wave Module 202 solves the wave equation (eigenvalues and eigenfunctions) in terms of energy. According to one embodiment, the Nosanow Fermion Wave Module is designed around several core steps shown in FIG. 5 and discussed above.

With reference to FIG. 1, the QMIP takes the Inputs (110, 112), and provides the inputs to the artificial intelligence module 208 to search the database library 116, check the license and authorization security access module 114, and uses the QMIP Process Modules shown in FIGS. 1 and 2 to implement the steps that create the outputs. Preferably, the QMIP Outputs Module (110, 112) presents the candidates' composition of matter, for example, which have been derived from applications of unique Hamiltonians, Grand Free Energy valuations, predicted chemical properties, structural molecular formulations to include the chemical bonds in a 2D or 3D structure, stages of reaction and byproducts, frequency controls and sensitivities as well as particle interactions and their thermodynamic properties. Just as important, candidates have specific instructions for their composition and production. These detailed instructions of production are based on the insights from the AI 208 and the Nosanow Fermion Wave Equation 202 Modules and inform the engineer, who may be part theoretical physicist and part chemist, how the chemical bench module 210 and the envisioned 3D matter and energy printer module 120 are to construct the composition.

The QMIP uses Artificial Intelligence 208 and the Simulation module 206 Modules to assist evaluating the potentially millions of different combinations to come up with likely candidates to meet the requirements. Artificial Intelligence (AI), also called machine learning, is computer intelligence to solve problems through intensive and repetitive learning of the perceived environment to make decisions to optimize the stated goals. The Artificial Intelligence learns from the potentially millions and even billions of possibilities to help the engineer to narrow the set of possibilities to a more manageable set.

Form and fit can have a large influence upon design and on finding new materials. A problem in finding new matter or material for composites that fit the requirements may be due to exceptional needs. For instance, a new photovoltaic material might have to fit within a certain solar cell shape that will be on a satellite and have specific weight and durability requirements. Another example is a new superconductor would need to fit within a specific Tokomak for a plasma generator. Another superconductor could have different requirements for use by a Josephson Junction used within Quantum Computers. In these examples, a computer aided design (CAD) blueprint or the equivalent exists, and the new materials will enhance performance of the current circuit design which it describes.

The CAD blueprint is part of the requirements and should be taken into account in the chemical bench 210 and the 3D printer module 120 Modules. The CAD blueprint (or equivalent) is of a circuit, chip, component, wire, junction, connector, plate, sub-system or system of which that the new material must be compatible. Wanting a solid wire and getting a gel is an example of a mismatch with CAD design.

The candidate composition of matter (and energy), $(Xx_aYy_b)$, are scored on how well the Candidates meet the Requirements as measured within the Tradeoff module 118. The QMIP may have one Candidate or millions of Candidates for the engineer to examine. The Requirements Scorer and the Tradeoff Scaler allow the engineer to do tradeoffs and "what ifs" with the candidates. For example, the engineer might want to have a superconductor that can perform across a large temperature range, and the QMIP has identified several candidates that work in the lower range and several candidates that will work in the upper range. So, having multiple candidates that fulfill the requirement might be acceptable. The Tradeoff Scaler allows the weighing of the Candidates from a performance viewpoint (non-functional requirements) as the ease of manufacturing and cost might be a tie breaker for several candidates. The results of the Tradeoffs and Candidates are fed back to the database library 116 to increase the body of knowledge. Each Candidate has detailed Instructions of Production for its composition. The Nosanow Fermion Wave Module 202 coupled with the AI Module's insight of how bonds, matter and energy work as an integrated whole makes these Instructions for Production possible and unique. It is envisioned that the Instruction for Production also include the molecules' structural formulation that incorporates the chemical bonds. For the bonds, the instructions include the types of bonds needed, such as ionic bonds, covalent bonds, polar bonds and hydrogen bonds, etc.

The tradeoff module 118 interacts with the chemical bench module 210, simulation module 206 and matter and energy printer 120 modules. The virtual simulation module 206 runs the candidates' Instruction for Production through a variety of sampling and tests to verify QMIP candidate results. Known problems or discontinuities are handled and the results are fed back into the tradeoff 118 and database library 116 Modules. The tradeoff module 118 could then also initiate a cycle through the chemical bench module 210 and the Printer Module 120 resulting in new candidates to test. This is assisted by the artificial intelligence module 208 that learns how to improve the entire system.

The chemical bench 210 and printer module 120 Modules are envisioned as an Engineer's advanced physics and chemist workbench. QMIP thus enables engineers' fuller understanding of how matter and energy work, predict new compounds and based on the knowledge and predictions can now be able to build, create, manufacture, or synthesize new composition of matter knowing their respective kinetic and potential energy characteristics. These issues are captured in the Instructions for Production. The engineer is able to have access now to a replicator that not only creates known compositions of matter but also creates new compositions of matter. The new compositions are created and then tested with results being fed back into the tradeoff module 118 to make adjustments and the AI 208 module to guide further evaluations. The feedback is also entered into the database library module 116 to continue to build the body of knowledge. Further, in some implementations of the disclosed subject matter, the compositions are built first in a virtual environment. The Instructions of Production are used to run through a simulation module 206 of being produced. The AI Module 208 checks that the steps are feasible and practical. It is envisioned that there may be several similar steps that could be used to progress in the creation of the composition of matter and the AI Module 208 would learn which steps are the most practical. The simulated compositions would be run through simulated test procedures to estimate it's assessment. The feedback would be cycled into the tradeoff 118 and the AI 208 Modules to evaluate the entire process. The simulated candidate may be good enough for improvements in a well understood material. However, an implementation of the disclosed subject matter can also predict the ability to actually take the instructions of production that are modified by the tradeoff 118 and AI 208 Modules with the simulation module 206 runs and actually produce the new composition of matter with Printer Module 120.

The chemical bench 210 is a chemical reactor system set up to create the new compounds. One would set up the chemical reactor to be able to add the constituents as needed for the new compound along with the temperature, pressure and volume necessary to encourage the correct bonding of the elements to create the desired new matter composition, compound and structure. The chemical bench 210 is envisioned to not only be a completely automated wet bench but also have the additional capabilities of centrifuge, mixing, adding a current, heating, cooling, volume and pressure adjustments, and additional chemist tools to coax the elements to form into the desired chemical compounds. The methodology of creation is laid out in the Instructions of Production from the QMIP critical processes specifically compiled by the AI Module 208.

The 3D Matter printer module 120 will take the chemical bench 210 material and then create the chip, circuits, wire, plate, sub-system, system, encapsulate or medical package format as needed. The chemical bench 210 will create the new materials such as the superconductor, semiconductor, photovoltaics, thermo generator material or drug/medical substance. The material is created and now needs to be put into the proper configuration to be tested.

In an example of the new photovoltaic cells, the chemical bench 210 creates the new raw material, which is then formatted by the printer module 120 into solar cells to be tested. The material is layered onto a test circuit board created by the 3D printer 120 which incorporates the computer aided design (CAD) blueprint. Both the raw material and finished product can then be tested. The newly created raw material can be tested by a metrology and interferometry module 212 and other chemical analysis devices within the sample analyzer module 122) to check that the newly created compounds fit the Instructions of Productions, and that the matter/material behaves as envisioned. Success or failure of the created matter/material from the 3D printer module 120 are fed back to the tradeoff 118, the database library 116, simulation module 206 and artificial intelligence 208 modules.

In the case of an improved Quantum Computer's Josephson Junction, a computer aided design lays out the circuit design. The QMIP takes the requirements from Input/output modules (110, 112) and finds several likely candidates. The simulation module 206 verifies the candidates and design. The QMIP provides the Instructions for Production and the artificial intelligence 208 module with the tradeoff module 118 determine the best candidates. The chemical bench 210 makes the matter samples in enough quantities to perform the testing of the chemical properties in the sample analyzer module 122 that in turn will result in a sample circuit. The printer module 120 takes the candidate material and builds the test Josephson Junction circuit. The test bench module 124 will test the Josephson Junction's functionality.

An additional example is a superconductor for a Tokamak plasma reactor. The requirement (110, 112) is for a superconductor that can be used as a wire. The chemical bench module 210 makes various candidates and the material is used by the printer module 120 to: extrude the superconductor as a wire, a wire that is coated with the superconductor material, or as the core filler with a wire sleeve printed around the material.

The sample analyzer module 122 is envisioned to test the candidates' structure, chemical properties and candidates' ability to be created in the correct form factor. The chemical composition of the samples is verified. A metrology and interferometry module 212 or similar device can be used to check the candidate's composition of matter was properly made. There are additional chemical tests that can be used to measure and test the material.

In another embodiment of the disclosed subject matter, the engineer is looking to find a new superconductor to meet certain requirements (110, 112). Despite materials like magnesium diboride with a critical temperature ($T_c$) of 40 Kelvin, conventional superconductors tend to be limited by retardation effects. The true high temperature superconductors, at ambient pressure, could be cuprates and iron pnictide. However, these superconductors are not supported or explained by a quantitative theory of their composition, properties and behavior. Many theorists believe that the attraction interactions that lead to the formation of Cooper Pairs is similar to a magnetic correlation. One could develop descriptors of these superconductors and use them to predict new superconductors. The Nosanow Wave Equations can now account for the interactions and is the key to develop descriptors to predict new superconductors. The Nosanow Wave Equations within the Nosanow Fermion Wave Module 202 can advance the understanding of Cooper Pairs.

FIG. 7 is a flowchart showing details of an example QMIP simulate and confirm process in accordance with some implementations.

Figure 10:
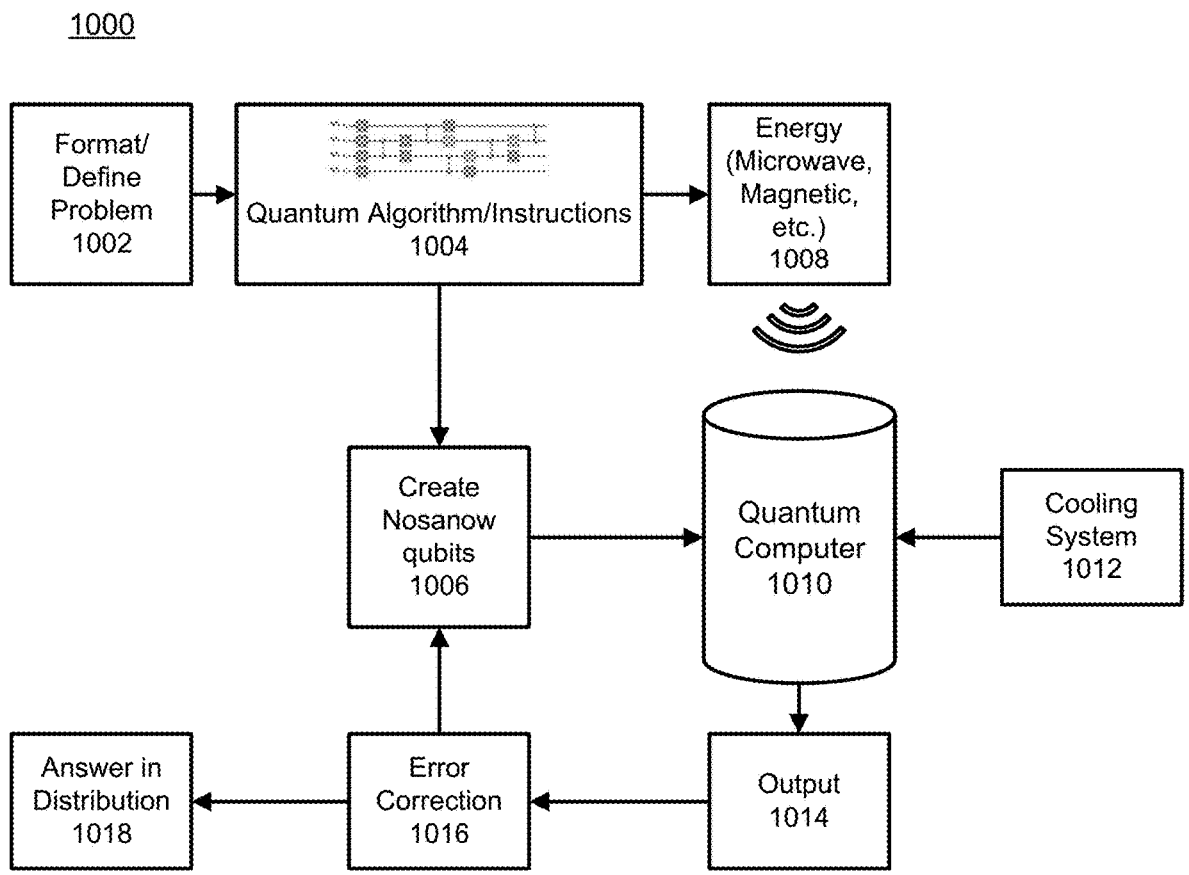
FIG. 10 is a diagram showing a quantum computer including a Nosanow qubit and set up and coherency control components in accordance with some implementations.

The last steps set forth below in FIG. 10 are to simulate, confirm properties and use artificial intelligence to improve outputs and the entire system process.

In this example, the engineer is looking for a new superconductor that will operate at the critical temperature ($T_c$) greater than 70 degrees Kelvin, result in a magnetic field of greater than 10 Teslas, is malleable and able to be made into an electrical wire used in an electronic coil for the Tokomak.

Superconducting Material Design Example

In general, the steps for identifying and creating a new superconductor or superfluid can include understanding the range of the desired $T_c$ and other desired qualities. Solving for Hamiltonians for the Nosanow equations. Taking derivatives. Completing transformations. Establishing and solving matrices. Determining pressure, volume and energy in terms of temperature to find $T_c$. Constructing test material in light of given input parameters and test properties.

For the candidates, some of the requirements include the below categories, sub-categories and quantities, according to the embodiment of FIG. 12.

According to an embodiment of the disclosed subject matter, using the QMIP system, the engineer follows the below steps for investigating potential superconductors.

The engineer starts with the determination of the critical temperature ($T_c$) as a key variable of several variables. According to one approach, the engineer is concentrating on the above requirements at near normal atmospheric pressure and looking for the highest $T_c$. (Often one can achieve a higher $T_c$ if you are using an oxygen atom to bond with a metal.) By using the Nosanow Fermion and Boson Wave Module which utilize procedures that are more precise and complete a $T_c$ can be predicted.

In the Requirements phase (110, 112), the engineer needs a metallic superconductor from a set of candidates to get not only the highest $T_c$ but a result such that it can be used to generate a B-Field greater than 10 Teslas for a Tokamak containment vessel.

Step 5 defines the wave function with the Heisenberg Equation of Motion, a wave description of the particle.

QMIP Quantum Computing Example

Superconducting quantum computers are the leading candidates to realize computing capability beyond the reach of today's classical computers. These types of quantum computers thus far hold the greatest promise for the NISQ, noisy intermediate scale quantum era (non-error corrected qubits) as well as the fault tolerant, error corrected quantum computers. Therefore, this use case emphasizes how the QMIP system enables the development of superconducting qubit modality implementations and algorithms throughout the four-phase diagram indicated in Table 2 in accordance with some implementations.

In some implementations, the QMIP system 100 can enhance the accuracy of the current classical molecular modeling techniques that use density function theories. This advances near term quantum computer algorithm simulations (uses AI 208, Nosanow Fermion Wave 202, Simulation module 206 Modules, as described in FIG. 1). In some implementations, the QMIP system 100 can improve the accuracy of the Variational Quantum Eigensolver (VQE) estimates used to help establish a wave function of molecule and predict its ground state energy simulations (uses AI 208, Nosanow Fermion Wave 202, Simulation module 206 Modules, as described in FIG. 1).

QMIP enables quantum data compression of complex QMIP qubits as well as multi-qubit states into one-qubit state thus advancing the use of quantum auto-encoders (uses AI 208, Nosanow Fermion Wave 202, Simulation module 206 Modules, as described in FIG. 1). QMIP provides a library of online information that is easily accessed and consumed which stimulates markets to develop that are supported by quantum computing (uses AI 208 and database library 116 Modules, as described in FIG. 1).

In stage 3 of Table 2, the QMIP system can be programmed and configured to reduce errors as it facilitates improved hardware designs at a more rapid pace (uses AI 208, Nosanow Fermion and Boson Wave 202, Grand Free Energy 204, Simulation module 206, Metrology & Interferometry 212, chemical bench 210, test bench 124 modules, as shown in FIGS. 1 and 2). The QMIP system can reduce the need for the high ratio of physical qubits compared to logic qubits, extends coherence time thus enables more complex algorithms to run because it provides more exact wave behavior, as well as a more complex qubit capability with greater predictability (uses AI 208, Nosanow Fermion and Boson Wave 202, Simulation module 206, chemical bench 210 and Metrology Modules 212, as shown in FIGS. 1 and 2). The QMIP system can permit functional quantum algorithms to be developed and implemented faster because of its hardware and qubit advances (uses AI 208, Nosanow Fermion and Boson Wave 202, Simulation module 206, Chemical Bench 210 modules, as shown in FIGS. 1 and 2).

In stage 4 of Table 2, the QMIP system is configured and programmed to more accurately predict quantum phase estimations and quantum parameters which leads to dynamic functional simulations of unknown chemical relationships for molecules, solids and highly sensitive materials such as ambient temperature super conductors (AI 208, Nosanow Fermion and Boson Wave 202, Grand Free Energy 204, Simulation Modules 206, as shown in FIGS. 1 and 2). The QMIP system essentially accelerates significantly the development of quantum computers and algorithms in terms of time and capability. (Uses database library 116, AI, Nosanow Fermion and Boson Wave 202, Grand Free Energy 204, Simulations 206, and Chemical Bench 210 modules, as shown in FIGS. 1 and 2) In some implementations, the QMIP system can support engineering and material design breakthroughs that lead to portable and distributed quantum computing.

Today's superconductor Quantum Computers essentially follow a general process cycle as outlined in FIG. 8 and described below. The NISQ (Noisy Intermediate Scale Quantum era) which currently defines most commercially accessed quantum computers do not include generalized quantum error correction procedures such as decomposing error corrections into qubits and gates.

Figure 8:
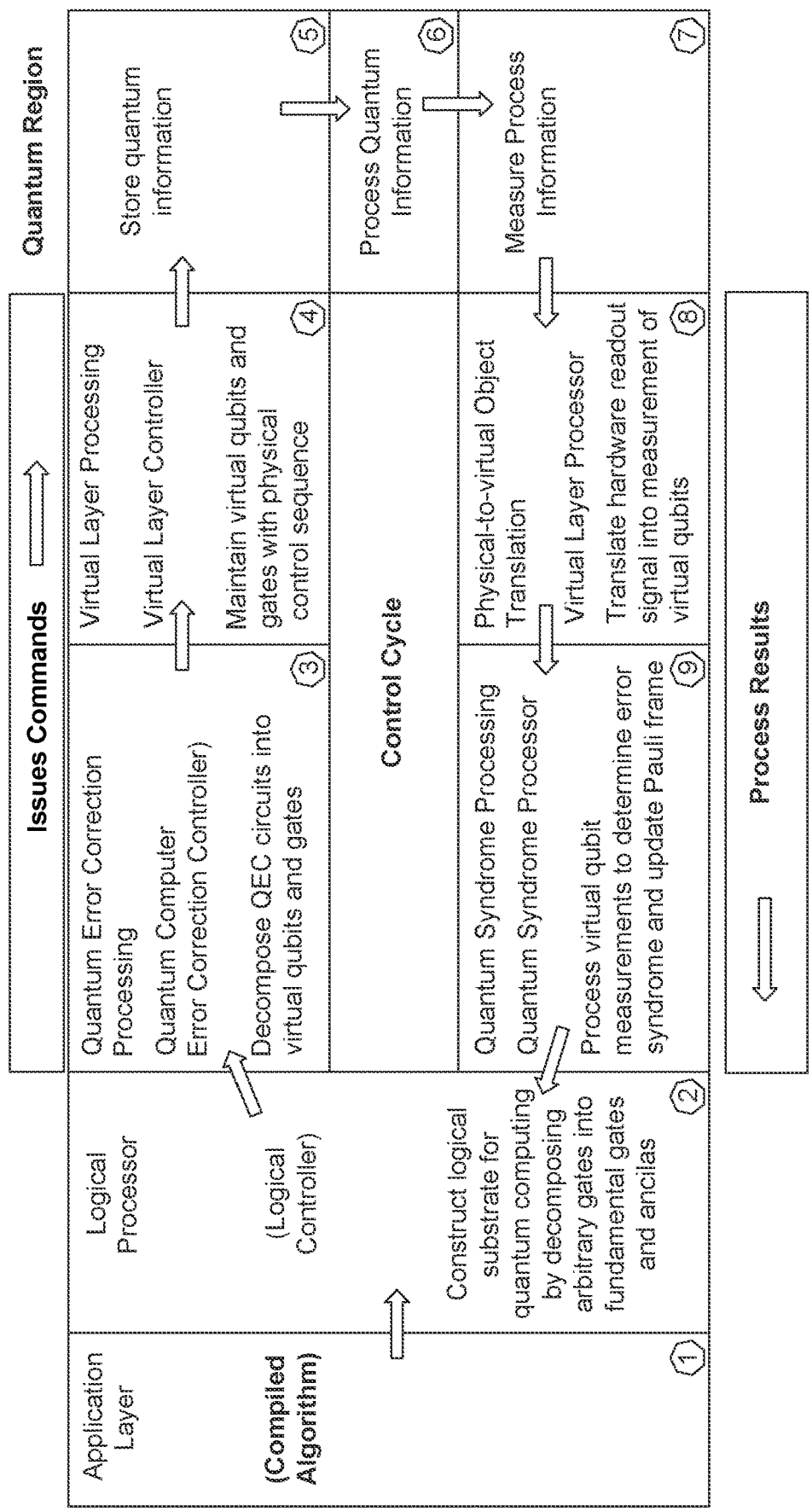
FIG. 8 is a diagram showing an example quantum computing control cycle in accordance with some implementations.

FIG. 8 is a diagram showing an example quantum computing control cycle in accordance with some implementations. The five layers of a superconductor quantum computer include:

The Application layer—where a quantum algorithm is implemented (the process of translating a mathematical algorithm into instructions that are ultimately executed by the hardware), where results are ultimately provided to the user.

The Logic layer—uses the instructions specified by the application layer to prompt the logic gates and ancillas to perform the desired operations with the least number of gates.

The Error correction Layer—introduces error correction procedures such as virtual gates that reverse the qubit states; determines error syndrome using multi qubit measurements, an error basis, and Pauli gates to determine where and what type of error occurred.

The Virtual Layer—defines and provides the physical control instructions; translates hardware readouts and provides results to the Error correction layer.

The Quantum Layer—this includes the actual physical operation of the hardware circuitry components based upon the virtual layer physical control instructions, and stores quantum computation information and measures results to be translated.

There are several key objects, components and principles that underpin the major elements of a quantum computer, such as:

Qubits—conventionally thought of as two state quantum objects used for information storage and processing in a quantum computer.

Qubit spin—the total angular momentum, or intrinsic angular momentum, of a quantum object.

Qubit measurements—comprise only two possible outcomes (quantum states) for the measurement of a qubit, usually taken to have the value "0" and "1", like a bit or binary digit. However, the state of a bit can only be either 0 or 1, the general state of a qubit according to quantum mechanics can be a coherent superposition of both.

Quantum computational states—a|0>; b|1> or a|0>+b|1>.

Qubit superposition—represents a quantum computation state that has coefficients that sum to 1. A pure qubit state is in a coherent superposition of the basis states. This means that $|\psi\rangle=a|0\rangle+b|1\rangle$ where $|\psi\rangle$ represents a qubit and where a and b are probability amplitudes that can in general both be complex numbers.

Qubit coherence—length of time a qubit remains in a superposition.

Quantum entanglement—a physical phenomenon that occurs when a pair or group of particles are generated, interact, or share spatial proximity in a way such that the quantum state of each particle of the pair or group cannot be described independently of the state of the others, including when the particles are separated by a large distance.

Quantum parallelism—where each bit string can be computed at once in a quantum computer versus a classical computer that does the same computation one bit string at a time, where the coefficients "a" and "b" that form the quantum computation states for the bit strings have infinite possibilities $\alpha_i = A_i e^{i\theta_i}$, which allows problems to be solved exponentially faster than a classical computer.

Quantum algorithms—step-by-step procedures to perform a calculation, or a sequence of instructions to solve a problem, where each step can be performed on a quantum circuit which is a model for quantum computation, and where the steps to solve the problem are quantum gates performed on one or more qubits.

Quantum gates—rudimentary quantum circuits operating on a small number of qubits. They are the analogues for quantum computers to classical logic gates for conventional digital computers. Quantum logic gates are reversible, unlike many classical logic gates. Some universal classical logic gates, such as the Toffoli gate, provide reversibility and can be directly mapped onto quantum logic gates. Quantum logic gates are represented by unitary matrices.

Quantum circuits—models for quantum computation in which a computation is a sequence of quantum gates, that are reversible transformations.

Quantum chip—qubits and quantum circuits often embedded in silicon or metallic materials.

Quantum read outs—qubit state distributions throughout the course of probing the output signal from resonators paired and induced by each qubit.

Josephson Junctions—a device that sandwiches an ultrathin non-superconducting material between two superconductors; electrons tunnel through the non-superconducting barrier material resulting in a critical current which if exceeded reduces the critical current results in an AC current. When this occurs an oscillation that is anharmonic can be established which defines electron nonuniform energy states that ultimately allows for a qubit to be interpreted in terms of 1's or 0's.

Transmon—transmission line shunted plasma oscillation qubit; one which consists of a Cooper-pair box where the two superconductors are also capacitatively shunted in order to decrease the sensitivity to charge noise, while maintaining a sufficient anharmonicity for selective qubit control.

SQUID—a superconducting quantum interference device constructed from two Josephson Junctions in a circuit loop that detects very tiny magnetic fields.

Quantum computers perform calculations based on the probability of a quantum object's computation state before it is measured. This provides an ability to process exponentially more data compared to classical computers. In quantum computing, the quantum object's state is used to produce what is known as a qubit. These computation states are the undefined properties of a qubit before they have been measured, such as the spin of an electron. Rather than having a clear position, unmeasured quantum states occur in a superposition. These superpositions can be entangled with those of other quantum objects (qubits), meaning their final outcomes will be mathematically related.

The complex mathematics behind these unsettled quantum computation states of entangled qubits can be programmed into special quantum algorithms that in turn direct a circuitry of quantum gates (single and double) to be established for the qubits to be operated upon. This involves combinations of Josephson Junctions, Transmons, possibly SQUIDs, and single as well as two qubit gates in a superconductor quantum computer.

Probabilistic readouts based on the phases of electromagnetic waves emanating from resonators coupled to the qubits are recorded and assessed for error correction. These readouts driven by the quantum algorithm ultimately provide the quantum computer answer. Such algorithms can be useful in solving complex mathematical optimization problems, producing hard-to-break security codes, or running simulations predicting multiple particle interactions in chemical reactions.

Quantum Computing Technical Problems

Building a functional quantum computer requires holding a qubit in a superposition state long enough to carry out various processes defined by the quantum algorithm error free. Essentially, a qubits' coherence time needs to be long enough to execute an algorithm thoroughly to reduce errors and provide answers with both accuracy as well as precision. Today the multi-qubit arrays necessary for quantum computing have insufficient coherent times and are grounded in a restrictive understanding of quantum mechanics.

Some problems plaguing current implementations of quantum computers include quantum computers are error prone at qubit formation; quantum algorithms require large numbers of single and or double gates to process complex problems resulting in longer run times; quantum gates and circuits have quantum material flaws. Further, Josephson Junctions, Transmons and SQUIDs cause noise and anharmonicity trade off issues resulting in counterproductive impediments.

Ultimately the applied physics of the prior art is not complete to explain the needed quantum mechanics requirements necessary to advance quantum computing. Essentially, there are difficulties due primarily to incomplete physics for creating, controlling, connecting, entangling, and processing qubits as well as validating their readouts given the associated algorithms. The process of setting up the problem, writing the program, isolating and cooling the quantum computer to create qubits, running the quantum algorithm, collecting the output, correcting the errors, and interpreting the results are built upon the Schrödinger Wave Equation which does not fully explain the quantum object or system behavior.

Quantum Computing Technical Solutions

The QMIP system fundamentally incorporates the correct kinetic and complete potential energy with spin. The QMIP system calculates the optimum anharmonic wave equation to establish more stable initialized qubits.

The QMIP system provides a computed frequency to rotate qubits into initial basis states and as required by an algorithm's defined gates.

The QMIP system defines new superconductors and materials to construct Josephson Junctions, Transmons, SQUIDs, inductors, capacitors, resonators and readout probes that reduce surface material noise. The QMIP system defines new designs of Josephson Junctions, Transmons and SQUIDs that optimize anharmonic wave increases and electromagnetic noise reductions. The QMIP system defines new circuitry configurations and reduces gate requirements to mitigate errors as well as enable complex problems to now be addressed. The QMIP system consequently accelerates the development of quantum computers and their algorithms to solve problems that cannot be done by classical computers today.

Figure 9:
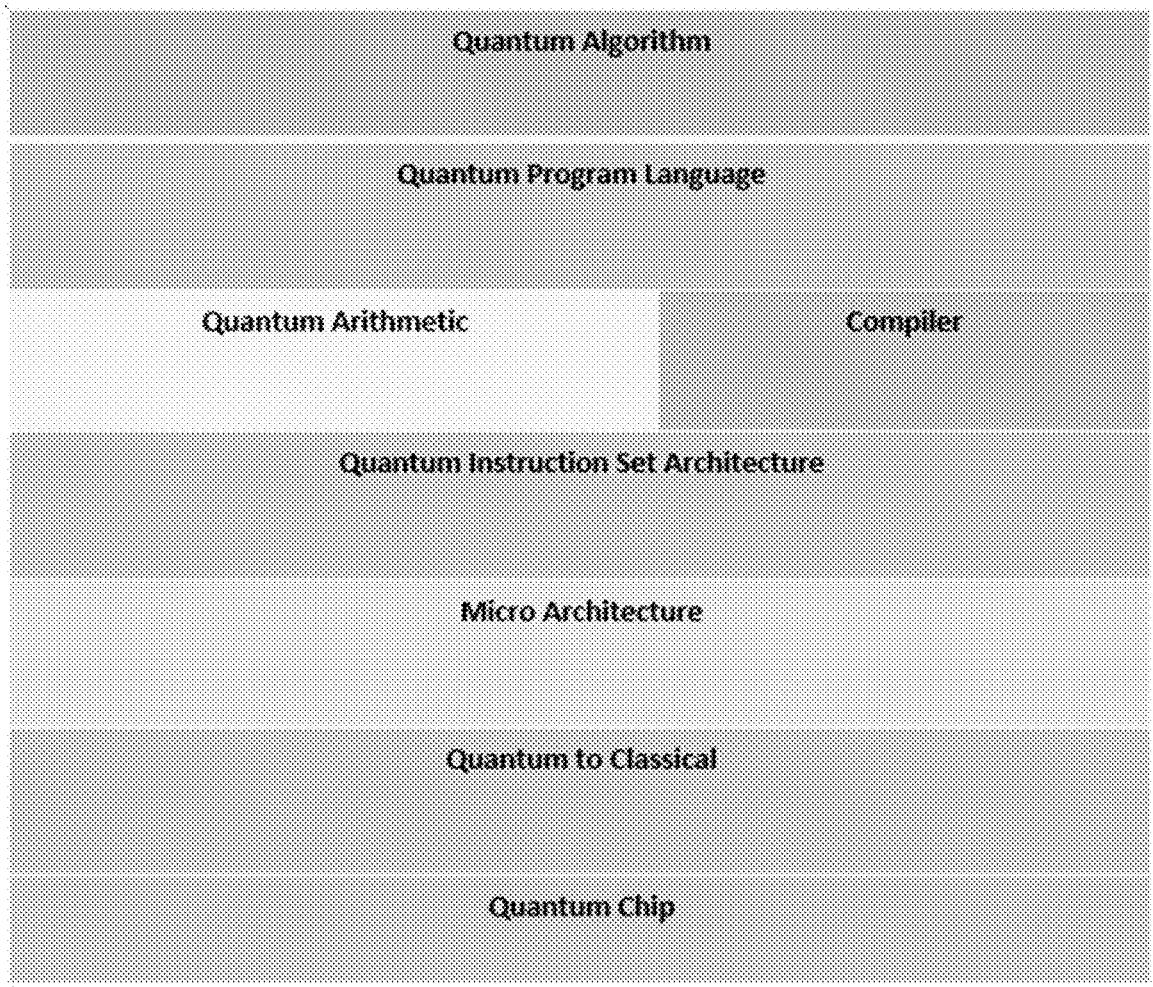
FIG. 9 is a diagram showing an example quantum computing stack in accordance with some implementations.

FIG. 9 is a diagram showing an example quantum computing stack in accordance with some implementations. According to one embodiment, the quantum computer would be implemented in accordance with the following quantum computer general stack, including the algorithm layer, quantum program language, quantum arithmetic and compiler, quantum instruction set architecture, micro architecture, quantum to classical conversion, and the quantum chip.

Present efforts in quantum computing often focus on three interdependent issues (decoherence, complexity, and errors). These issues in turn drive today's approaches in the physics, materials, engineering and techniques that underpin the currently constrained quantum computer hardware and algorithm advancements. The QMIP system uses innovative methodologies within its integrated and novel modules to provide breakthroughs in each of these approaches.

The Nosanow Fermion and Boson Wave 202 and Grand Free Energy 204 modules provide a more comprehensive, accurate and predictive behavior representation of quantum objects versus what currently exists. Unlike the Schrodinger Wave Equation, the Nosanow Wave Module includes a fourth dimension of spin, accounts for complete kinetic and potential energy descriptions, as well as employs Hamiltonians that can help forecast ultimately new superfluids and superconductors.

The Nosanow Fermion Wave 202, Grand Free Energy 204 and the AI 208 modules predictively define optimum anharmonic waves that will enable qubits to achieve greater stability and reduce errors associated with state initialization.

The Nosanow Fermion and Boson Wave 202, Grand Free Energy 204 and the AI 208 modules predictively define qubit controllers (microwave and or radio wave frequencies) with exceptional accuracy and precision. This will reduce residual photon surface noise while helping to maintain gate fidelity. As a result, coherence time starts to become greater, the propensity for errors lessens and the ability to manage complexity becomes more feasible.

The Nosanow Fermion Wave 202, Grand Free Energy 204, AI 208, Simulation 206, and database library 116 modules provide more accurate density cloud estimates and Density Functional Theories simulations that in turn help programmers learn how to develop better quantum simulation algorithms. These QMIP system modules can also improve Variational Quantum Eigensolver (VQE) simulations by rendering a more accurate wave function ansatz of a molecule and estimations of its electronic Hamiltonian while finding its ground state energy. Once again this will help programmers learn how to create applicable algorithms for both NISQ (Near Intermediate Scale Quantum) and full-scale fault tolerant quantum computers.

The Nosanow Fermion and Boson Wave 202, Grand Free Energy 204, AI 208, simulation 206, chemical bench 210, database library 208, sample analyzer 122 and test bench module 124 modules will provide new superconductors (descriptions and material) to be used in improved designs of Josephson Junctions, Transmons, SQUIDs, inductors, capacitors, resonators and readout probes. This is the result of the QMIP system modules' ability to define thoroughly and then productively exploit the phase discontinuity of Fermion systems. This leads to superior circuitry with less susceptibility to decoherence due to material and device (charge and magnetic field) created noise.

The QMIP system and other methods and techniques described herein provide for, among other things, the following new and improved technologies: new quantum computing topologies such as Fermion Boson Quantum Computers that couple the arrays of Fermion and Boson systems of qubits, and portable and distributed use of quantum computers.

Nosanow Qubits

New Dense Nosanow Qubits with new quantum numbers that are exploited for processing. These new dense qubits will incorporate the use of an entirely new particle, which can be described as a non-relativistic positron. One non-relativistic particle exists for Fermion. Another exits for Bosons.

Dense computing code that goes beyond present use of Boolean logic, including executable error correction and stabilization strategies within or coupled to the qubits and gates, and junctions designed to exploit the non-relativistic positron and or new dense qubit. Newly discovered superfluids and superconductors whose properties overcome the current quantum computing hardware challenges.

New qubits with greater than 2 states for greater computing power. The QMIP system is able to create quantum computer qubits and increase their coherence time.

Qubits are often defined as two state quantum objects used for information storage and processing in a quantum computer. The Qubit spin (the quantum number s) is the total angular momentum, or intrinsic angular momentum, of a quantum object. Quantum objects can include Fermions (e.g., electrons), Bosons (e.g., Helium-4) and Quasi-particles (e.g., Anyons).

The Non-Relativistic Quantum Numbers are n—describes the energy level, l—describes the orbital type, m—specific orbital, and s—spin. Qubit measurements comprise only two possible outcomes (quantum states) for the measurement of a qubit, usually taken to have the value "0" and "1", like a bit or binary digit. However, the state of a bit can only be either 0 or 1, the general state of a qubit according to quantum mechanics can be a coherent superposition of both. Quantum computational states can be defined as such: $a|>$; $b|1>$ or $a|0>+b|>$.

Qubit superposition represents a quantum computation state that has coefficients that sum to 1. A pure qubit state is in a coherent superposition of the basis states. This means that $|\psi>=a|0>+b|1>$ where $|\psi>$ represents a qubit and where $\alpha$ and b are probability amplitudes that can in general both be complex numbers. The Qubit coherence is the length of time a qubit remains in a superposition.

The Nosanow Wave Equation represents a 4-dimensional system of equations (4 equations) which include S (spin). The Schrodinger Wave Equation represents a 3-dimensional system (only one equation) and thus does not have a $4^{th}$-dimension that includes S (spin). This principle alone enables the Nosanow Wave Equation to describe quantum particles in a more informative and detailed manner. Consequently, the QMIP system is able to construct at least 5 new whole classes of Qubits and quantum numbers in different dimensions.

The following illustrates a redesign of the core element of quantum computing. Unitary transformations can be implemented in a controlled fashion. State changes, readings and writings can be done. Materials, ways to apply control structures and methods to stabilize the Nosanow Qubits listed below can be realized.

A Nosanow 4-Dimensional and Beyond Qubit is a qubit that can perform requirements of a quantum bit with greater stability gained from a more informed understanding of its quantum properties and the means of their manipulation. Several of these Qubits could be managed as a Fermion System array essentially acting as a single complex qubit.

A Nosanow Fermion Positron Qubit is a qubit that can be entangled with an electron qubit by means of a new Josephson Junction designed by the QMIP system. The Nosanow Fermion Positron Qubit can also entangle with other Positron Qubits. It exhibits greater stability and less associated error within a quantum computer. Again, several of these Qubits could be managed as a Fermion System array essentially acting as a single complex qubit.

A Nosanow Positron Boson Qubit is a qubit that can evolve as an asynchronous anharmonic oscillator from which binary computations would be derived. The QMIP system would use the Nosanow Fermion Positron Qubits and the Nosanow Boson Wave Equation to initially simulate the oscillator that would then be specified to a Nosanow Positron Boson Qubit or a Boson particle/system.

A Nosanow Fermion Quason 1 Qubit is a type of quasi-particle that can be established in a solid superconductor. The superconductor and or crystal in conjunction with a strong magnetic field create the phase of matter. The Nosanow Fermion Wave Equations describe the controlled way to perform this function. This Qubit provides significantly improved coherence time.

A Nosanow Boson Quason 2 Qubit is a type of quasi-particle that can be established in a superconductor and or crystal or glass etc. in conjunction with a strong magnetic field to create the phase of matter. The Nosanow Boson Wave Equations describe the controlled way to perform this work. This Qubit provides significantly improved coherence time.

FIG. 10 is a system diagram showing an environment 1000 including a Nosanow qubit and associated components for setting up and maintaining coherency for the qubit. In particular, a problem to be computed is defined at 1002. The problem 1002 is then encoded as a quantum algorithm and corresponding instructions 1004.

Materials in a Nosanow quantum computer 1010 are cooled using a cooling system 1012. Other parameters or environmental factors of the quantum computer can be controlled as well (e.g., pressure and isolation or shielding of the system) to place the Nosanow quantum computer 1010 in an operational state (e.g., superconducting state). Based on the problem 1002 and/or quantum algorithm 1004, one or more Nosanow qubits 1006 are set up in the Nosanow quantum computer 1010. The quantum algorithm and corresponding instructions based are used to control an energy source such as microwave energy source 1008 and/or a magnetic field according to the model of the Nosanow qubits, which includes positive electrons, provided by the Nosanow Wave Equation and/or Hamiltonian.

The quantum computing processing is carried out according to the quantum algorithm 1004 using the microwave energy 1008. Output 1014 of the quantum computer 1010 is detected (e.g., via one or more resonators) and error corrected 1016 and output (e.g., as a distribution 1018). By using the Nosanow Wave Equation that provide improved Nosanow qubit modeling (e.g., including Josephson junction, modeling of the qubit, and a possibility of having a more efficient quantum computing program due to an increased number of gates that can be included in the circuitry of a Nosanow quantum computer), coherency can be maintained longer as described herein and a need for error correction may be reduced by providing superconducting materials determined using the QMIP system that are less prone to noise and errors due to interference (e.g., materials that can be in the superconducting region at higher temperatures, etc.).

Qubit Setup

With a material selected by the QMIP system as described above, the material properties are known. This essentially enables the selection of higher temperature superconducting qubits to be realized in a quantum circuit. The QMIP system provides the capability to readily determine the ground states of different types of superconductors which constitutes the qubit initialization or set-up. In conjunction with determining ground states, the QMIP system is capable of determining all other associated quantum properties. These properties lead to other dimensional qubit initialization possibilities. QMIP greatly enhances quantum cryogenic circuitry by addressing the balance of control and coherence time.

Figure 16:
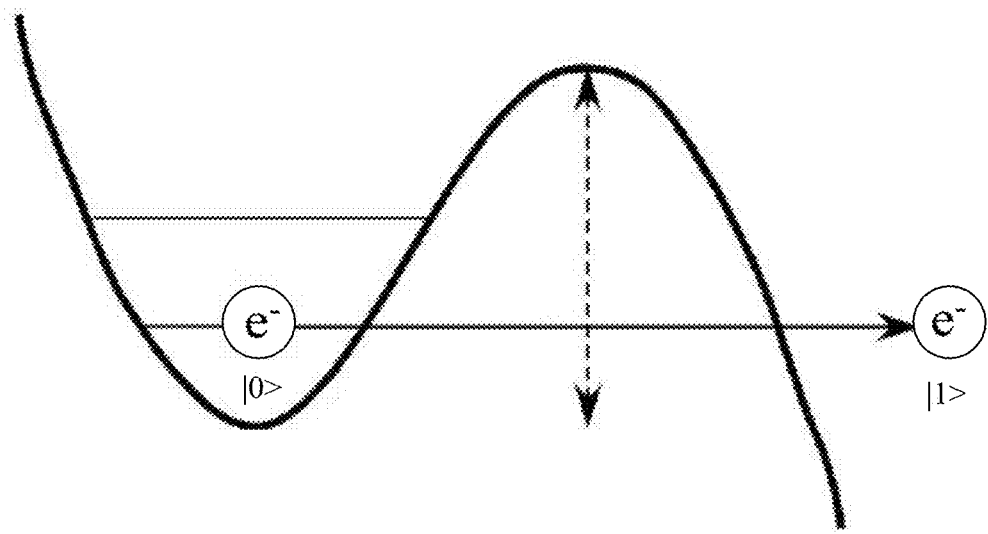
FIG. 16 is a diagram showing an example Nosanow qubit set up and electron tunneling in a Josephson junction in accordance with some implementations.

FIG. 16 shows set up of a Nosanow qubit through a Josephson junction utilizing electron tunneling. In particular, an electromagnetic driver can be controlled to cause an electron to tunnel through the Josephson Junction resulting in a ket 1 "|1>" state, an electron that does not pass through is in a ket 0 "|0>" state, thus the qubit is initialized.

Regarding qubit set up and control, there are at least three aspects 1) Nosanow qubit set up, 2) control through gates, and 3) control for coherency. The superconducting material identification, simulation and evaluation described above is related to the set up and control aspects. For example, the Nosanow Hamiltonian and Nosanow Wave Equation can be used to find a new material for a superconductor that can function in a better way (e.g., through less impurities) as a superconductor compared to some conventional superconducting materials. A reduction of imperfections in the material may help reduce noise due to imperfections, which may be a cause of decoherence.

In the Josephson junction, aluminum is typically used because the barrier has been refined and is more understood. However, other materials can be used. By using the QMIP to identify and model a new material that provides a Nosanow qubit capable of being initialized and moved through gates with greater accuracy (e.g., reducing the probability of a Nosanow qubit transitioning to an undesired energy state), there is a potential for better control and more stability. When a system takes into account how the positive electrons affect the coherency of the qubit, it becomes possible to maintain coherency better (e.g., longer) because the whole system—including positive electrons—is taken into account with the Nosanow Wave Equation. The Nosanow equations take into account more of the quantum mechanical properties and thus provide a better understanding of how to initialize and control a system including one or more Nosanow qubits.

When a Nosanow qubit goes through a gate it causes the spin to change. Spin can be thought of as a vector in the center of a sphere (see, e.g., FIG. 18). When the qubit goes through the gate, gets hit by energy, and the spin changes, decoherence aspects creep in because the qubit is being manipulated. There is uncomputation associated with that for correction. For example, the code is changing spin of qubits through dual gates (e.g., from 0 to 1, etc.). Uncomputation is causing a qubit to go backwards. If positive electrons, as defined in the Nosanow equation models, are used as part of the uncomputation, then a lower error rate can be achieved because the Nosanow qubit model, as defined by the Nosanow Wave Equations and Hamiltonian, is working with a more complete model of the qubit vs an incomplete qubit modeled with conventional wave equations.

Coherency Control

The QMIP system can be programmed and configured to monitor the temperature (t), pressure (p), and energy (e) as the quantum computer performs the necessary qubit calculations. The QMIP system can sense and adjust time, pressure, and energy to keep the candidate material of the transmon/Josephson Junction in the required superconductor zone, thereby extending coherence. The QMIP system can provide the appropriate wave equation to couple multiple qubits (e.g., entangled qubits) that are evolved in time, which allow for coherence to be maintained in order to establish high probability readouts with minimized error correction needs.

As described herein, the QMIP system describes particle and system quantum mechanical properties more accurately, discovers new superconductors which operate at a range of temperatures, and that can be used to define new and existing material properties.

Some implementations of the QMIP system can be based on the phase change in Tc. The Nosanow Wave Equation explains the properties of the Fermion system across the phase changes and discontinuity. Some implementations can include a process to search for new superconductor materials and leverage the properties of new material enhance coherence performance by providing a material with a higher probability of coherent operation within a circuit or system.

Figure 17:
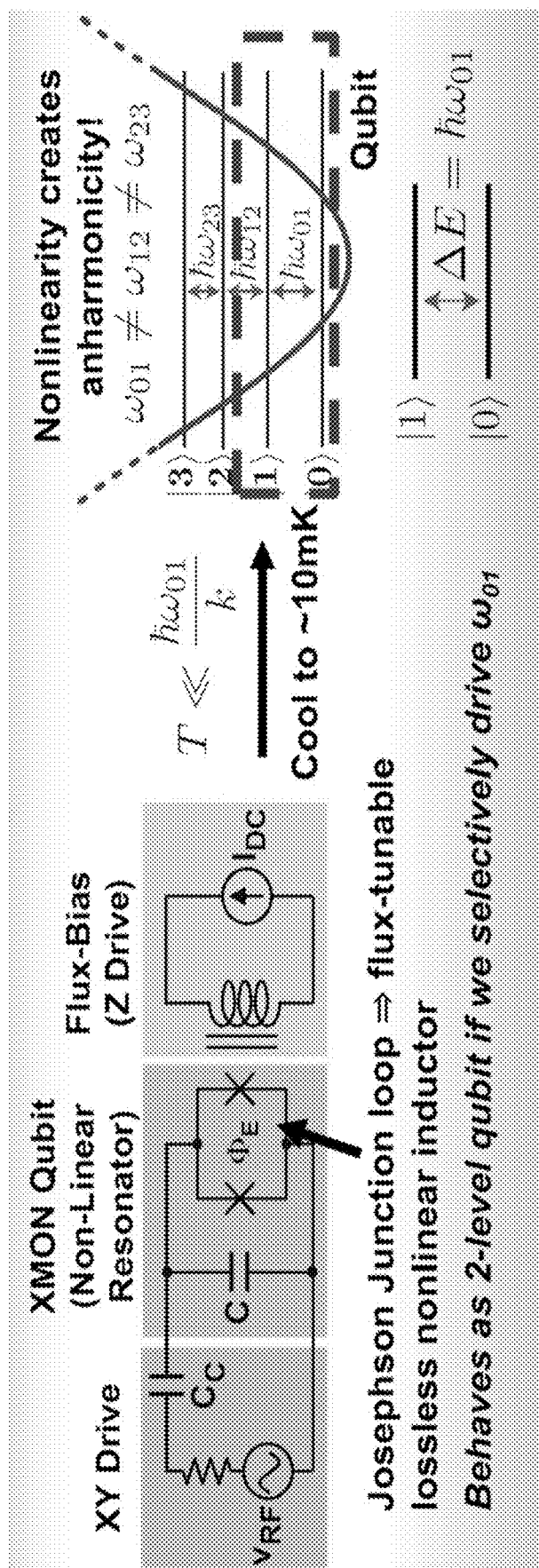
FIG. 17 is a diagram showing an example Nosanow qubit and associated drive and resonator components in accordance with some implementations.

FIG. 17 is a diagram showing a diagram showing an example Nosanow qubit and associated drive and resonator components. In operation, the XY drive drives gate operations, as visualized on the Bloch Sphere (see FIG. 18) as the amount of rotation and the axis of rotation. A Nosanow qubit oscillates between the ground and first energy level states (as shown in the dashed line in the energy level diagram).

Flux-bias drives the Nosanow qubit between the two energy states (see dashed rectangle in the energy level diagram ) and helps maintain coherence. The energy level diagram 1708 defines the change in the energy levels as a bit (in this case as a Nosanow qubit).

Figure 18:
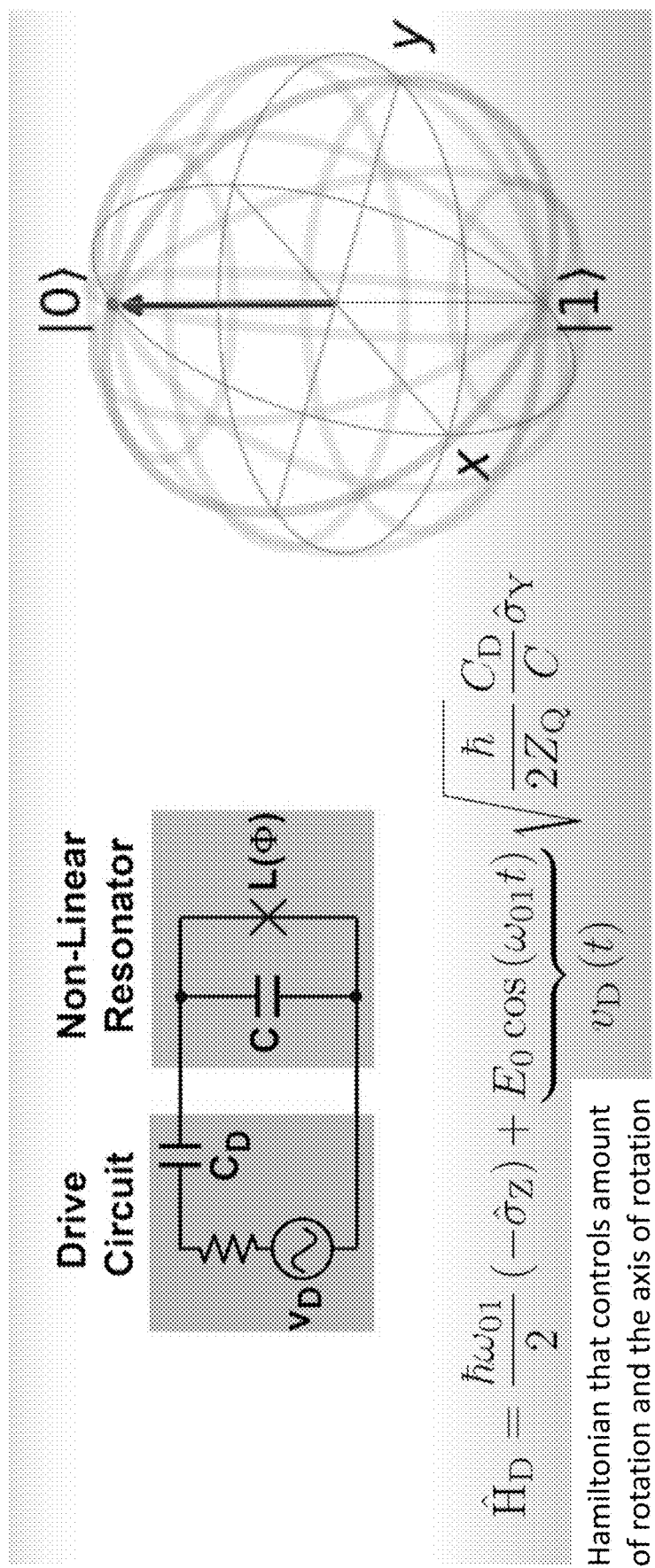
FIG. 18 is a diagram showing an example Qubit Control using an electromatic wave pulse defined by the Hamiltonian in accordance with some implementations.

FIG. 18 is a diagram of a drive and Nosanow qubit and shows qubit control using an electromatic wave pulse defined by the Hamiltonian. For example, the Nosanow Hamiltonian can be used as an operator in conjunction with the Nosanow Wave Equation to predict how the qubit will react (e.g., amount of rotation and axis of rotation) to a given energy frequency.

Figure 19:
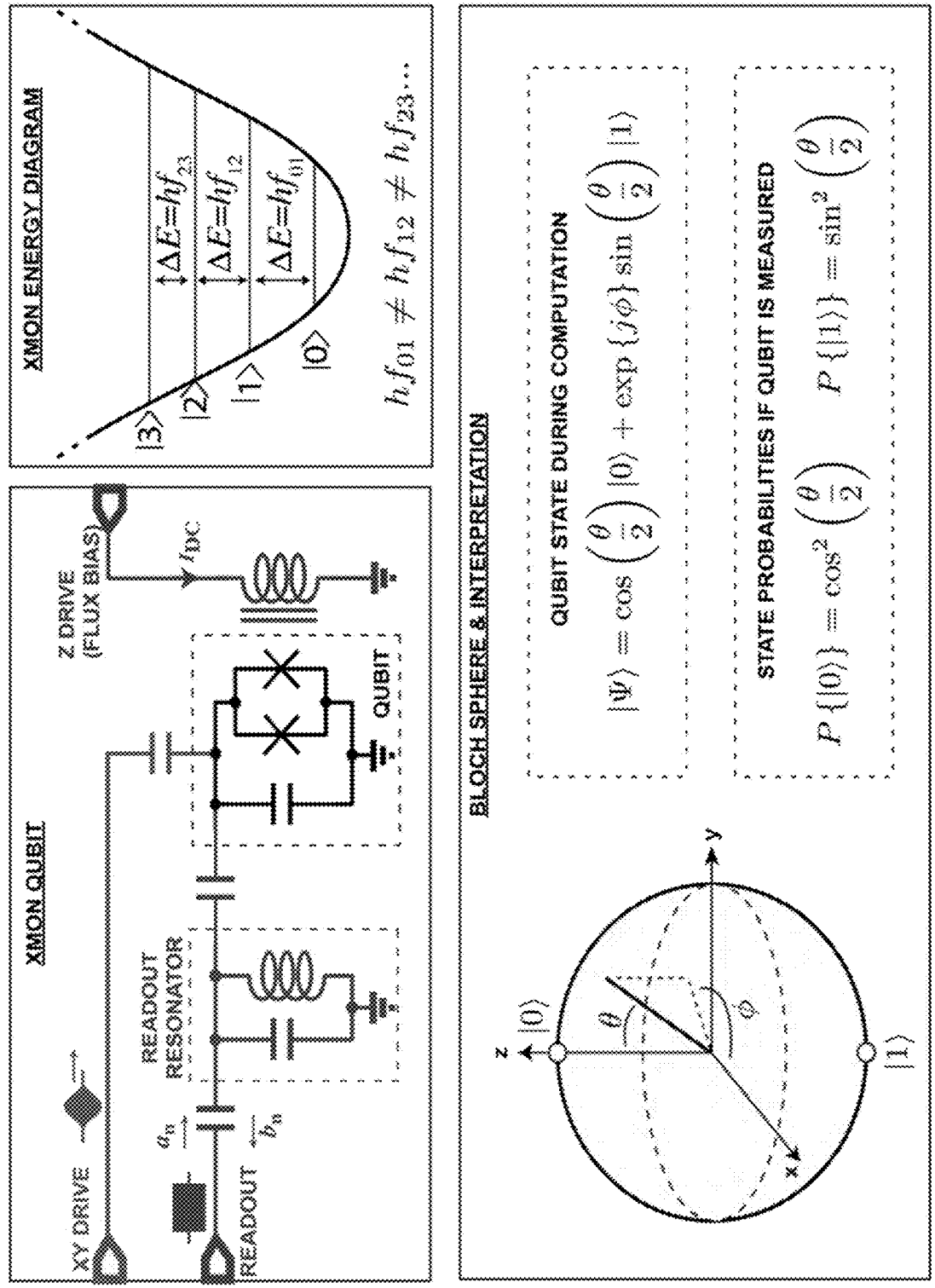
FIG. 19 is a diagram showing an example Nosanow qubit and associated drive component in accordance with some implementations.

FIG. 19 is a diagram showing an example of a Nosanow paired qubit and associated drive component in accordance with some implementations. In particular, FIG. 19 includes a schematic of an XY drive circuit and Z drive for a qubit along with a readout resonator. General qubit state and state probabilities equations are also shown in FIG. 19.

Figure 11:
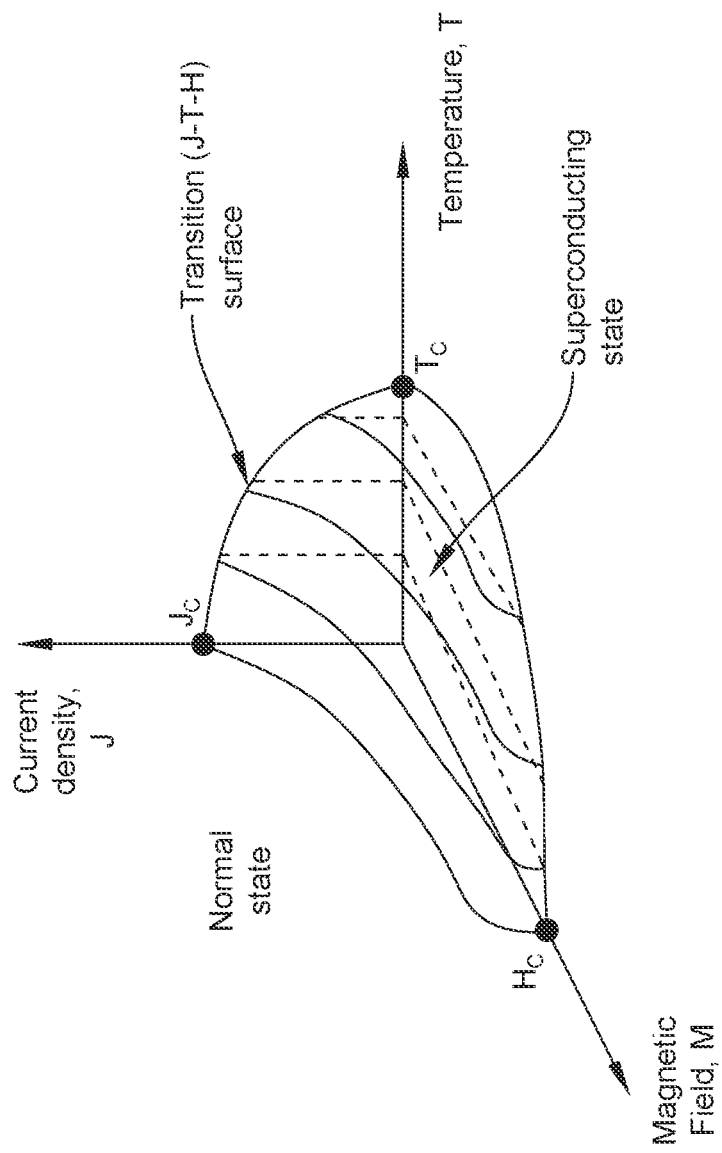
FIG. 11 is a diagram showing an example superconductor relationship between temperature, current density, and magnetic field in accordance with some implementations.

Moving back to FIG. 11, FIG. 11 is a diagram showing an example superconductor relationship between temperature, current density, and magnetic field in accordance with some implementations. FIG. 11 shows a region where the superconductor is active. In some implementations, the QMIP system can optimize or control the three variables to establish conditions for a superconductor.

Figure 12:
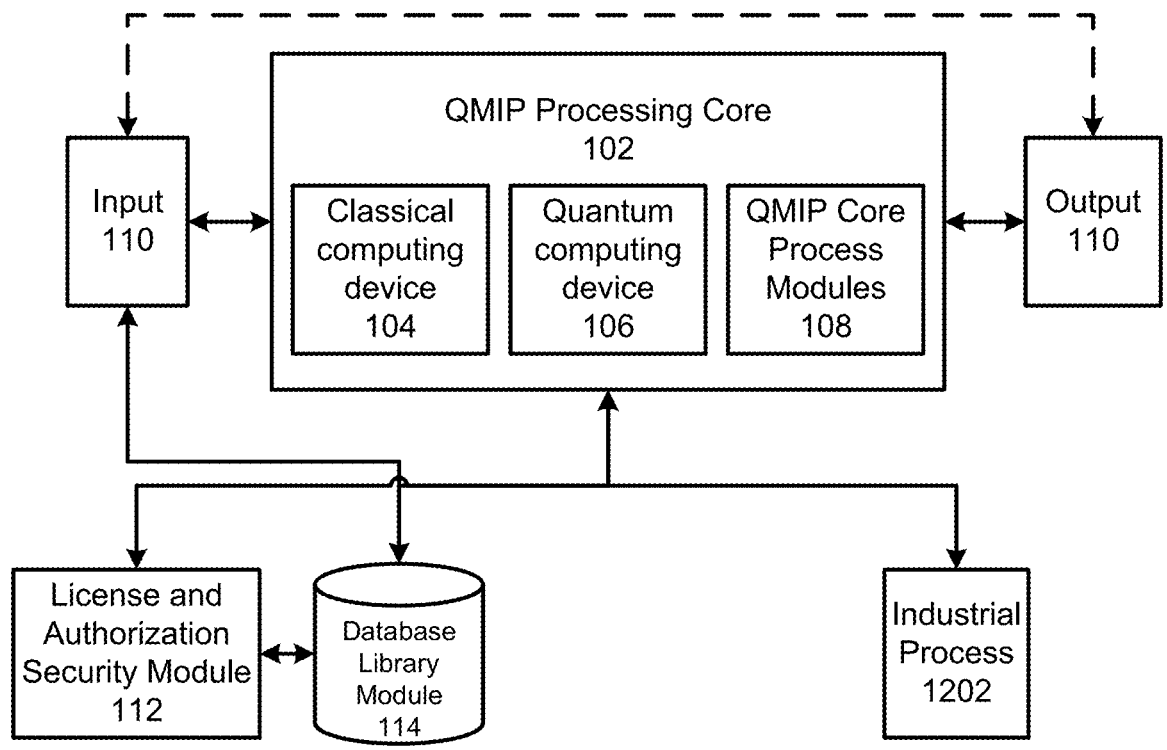
FIG. 12 is a diagram of an example QMIP system configured for industrial process control and optimization and an associated environment in accordance with one or more implementations described herein.

FIG. 12 is a diagram of an example QMIP system configured for industrial process control and optimization and an associated environment in accordance with one or more implementations described herein. In operation, the QMIP system is programmed and configured to control and optimize the industrial process based on monitoring one or more parameters of the industrial process.

Other QMIP Example Applications
Thermoelectric Generator

Improve the material for thermoelectric generators. Thermoelectric generators create electricity due to the Seebeck effect and the difference between a heat source and a cold sink. When there is a diesel generator, the generator creates waste heat. Thermoelectric generators convert the waste heat into electricity, making the generators more efficient. Thermoelectric generators have been used in generators, automobiles and space probes.

According to Wikipedia:

"An automotive thermoelectric generator (ATEG) is a device that converts some of the waste heat of an internal combustion engine (IC) into electricity using the Seebeck Effect. A typical ATEG consists of four main elements: A hot-side heat exchanger, a cold-side heat exchanger, thermoelectric materials, and a compression assembly system. ATEGs can convert waste heat from an engine's coolant or exhaust into electricity. By reclaiming this otherwise lost energy, ATEGs decrease fuel consumed by the electric generator load on the engine. However, the cost of the unit and the extra fuel consumed due to its weight must be also considered."

Wikipedia also states the following regarding efficiency of ATEGs:

Currently, ATEGs are about 5% efficient. However, advancements in thin-film and quantum well technologies could increase efficiency up to 15% in the future.[5]

The efficiency of an ATEG is governed by the thermoelectric conversion efficiency of the materials and the thermal efficiency of the two heat exchangers. The ATEG efficiency can be expressed as:

$$\zeta_{OV} = \zeta_{CONV} \times \zeta_{HX} \times \rho$$

Where:
$\zeta_{OV}$: The overall efficiency of the ATEG
$\zeta_{CONV}$: Conversion efficiency of thermoelectric materials
$\zeta_{HX}$: Efficiency of the heat exchangers
$\rho$ The ratio between the heat passed through thermoelectric materials to that passed from the hot side to the cold side Wikipedia goes on to state the problems and challenges facing ATEGs?

"The greatest challenge to the scaling of ATEGs from prototyping to production has been the cost of the underlying thermoelectric materials. Since the early 2000s, many research agencies and institutions poured large sums of money into advancing the efficiency of thermoelectric materials. While efficiency improvements were made in materials such as the half heuslers and skutterudites, like their predecessors bismuth telluride and lead telluride, the cost of these materials has proven prohibitive for large-scale manufacturing. Recent advances by some researchers and companies in low-cost thermoelectric materials have resulted in significant commercial promise for ATEGs, most notably the low-cost production of tetrahedrite by Michigan State University] and its commercialization by US-based Alphabet Energy with General Motors."

The QMIP platform can address the challenges of ATEGs to provide workable solutions. The QMIP can be used to study the Seebeck effect and extend it to additional uses with more efficient materials. As long as one has a heat difference, the Seebeck effect can be used to create electricity.

Solid-State Electronics

Solid-state electronics is an additional area for the QMIP to be used. Advancements in better semi-conductors can lead to longer lasting chips, components and systems.

For example, Wikipedia states:

"Semiconductor materials are nominally small band gap insulators. The defining property of a semiconductor material is that it can be doped with impurities that alter its electronic properties in a controllable way. Because of their application in the computer and photovoltaic industry—in devices such as transistors, lasers, and solar cells—the search for new semiconductor materials and the improvement of existing materials is an important field of study in materials science.

Most con only used semiconductor materials are crystalline inorganic solids. These materials are classified according to the periodic table groups of their constituent atoms.

Different semiconductor materials differ in their properties. Thus, in comparison with silicon, compound semiconductors have both advantages and disadvantages. For example, gallium arsenide (GaAs) has six times higher electron mobility than silicon, which allows faster operation; wider band gap, which allows operation of power devices at higher temperatures, and gives lower thermal noise to low power devices at room temperature; its direct band gap gives it more favorable optoelectronic properties than the indirect band gap of silicon; it can be alloyed to ternary and quaternary compositions, with adjustable band gap width, allowing light emission at chosen wavelengths, which makes possible matching to the wavelengths most efficiently transmitted through optical fibers. GaAs can be also grown in a semi-insulating form, which is suitable as a lattice-matching insulating substrate for GaAs devices, Conversely, silicon is robust, cheap, and easy to process, whereas GaAs is brittle and expensive, and insulation layers cannot be created by just growing an oxide layer; GaAs is therefore used only where silicon is not sufficient.[2]

By alloying multiple compounds, some semiconductor materials are tunable, e.g., in band gap or lattice constant. The result is ternary, quaternary, or even quinary compositions. Ternary compositions allow adjusting the band gap within the range of the involved binary compounds; however, in case of combination of direct and indirect hand gap materials there is a ratio where indirect band gap prevails, limiting the range usable for optoelectronics; e.g., AlGaAs LEDs are limited to 660 am by this. Lattice constants of the compounds also tend to be different, and the lattice mismatch against the substrate, dependent on the mixing ratio, causes defects in amounts dependent on the mismatch magnitude; this influences the ratio of achievable radiative/nonradiative recombinations and determines the luminous efficiency of the device. Quaternary and higher compositions allow adjusting simultaneously the band gap and the lattice constant, allowing increasing radiant efficiency at wider range of wavelengths; for example, AlGaInP is used for LEDs. Materials transparent to the generated wavelength of light are advantageous, as this allows more efficient extraction of photons from the bulk of the material. That is, in such transparent materials, light production is not limited to just the surface. Index of refraction is also composition-dependent and influences the extraction efficiency of photons from the material."

Photovoltaic Example

Solar energy has always been a green solution that has promise but which has no widespread success because it is hampered by low efficiency. Sunlight is a fickle source that only produces less than half the potential electrical energy during daylight. Greater efficiency, cheaper costs and greater longevity of the solar cells will lead to greater acceptance. However, one also needs a greater storage capability, that is, a better battery, to store the electrical potential. Along with better photovoltaics, the QMIP system can be used to find better storage alternatives for the created electricity. Photovoltaics are multilayer cells exhibiting an efficiency in the range of roughly 30%-45%. In some implementations, the QMIP platform according to FIGS. 1 and 2 can be programmed and configured to identify and develop improved photovoltaic materials and systems.

Quantum Chemical Design Example

The design workflow for the design of quantum chemicals is set forth in Table 3 and in the steps and activities described further below. At stages 1 and 2 of Table 3, the QMIP system can be programmed and configured to manage large amounts of data about small molecules, polymers, solids like composites, semiconductors, magnetic materials etc. (uses database library 116 and AI 208 modules). QMIP enhances current DFT, CALPHAD and VQE (Variational-Quantum-Eigensolver) calculations and can provide more accurate predictions of molecular properties (uses AI 208, Nosanow Fermion Wave 202, and simulation 206 modules)

In some implementations, a QMIP system is configured to provide more accurate predictions of new solid-state materials and their properties such as magnets, superconductors, semi-conductors and battery materials (uses AI 208, Nosanow Fermion Wave 202, Grand Free Energy 204, Simulation module 206, chemical bench 210, Metrology & Interferometry 212, Printer 120 modules).

The QMIP system can manage large amounts of data about small molecules, polymers, solids like composites, semiconductors, magnetic materials etc. (uses database library 116, AI Modules 208). QMIP enhances current DFT, CALPHAD and VQE (Variational-Quantum-Eigensolver) calculations and can provide more accurate predictions of molecular properties (uses AI 208, Nosanow Fermion Wave 202, Simulation module 206 Modules)

QMIP is able to provide more accurate predictions of new solid-state materials and their properties such as magnets, superconductors, semi-conductors and battery materials (uses AI 208, Nosanow Fermion Wave 202, Grand Free Energy 204, Simulation module 206, chemical bench 210, Metrology & Interferometry 212, Printer 120 modules).

In stages 3 and 4 shown in Table 3, the QMIP system is programmed and configured to provide insights involving complex processes and use optimization for formulation development of mixtures (such as materials for charge transport in OLEDs) (uses AI 208, Nosanow Fermion Wave 202, Grand Free Energy 204, Simulation module 206 Modules). The QMIP system is also able to test mixtures (such as detergents and pesticides) integrating in-silico with automated physical measurement procedures (AI 208, Metrology & Interferometry 212, chemical bench 210, and test bench module 124 modules). QMIP is able to test complex assemblies (such as composites, OLED stacks and quantum dots (uses AI 208, Metrology & Interferometry 212, printer module 120, and test bench 124 modules).

In stages 5 through 7 of Table 3, the QMIP system is able to predict and simulate new molecular catalyst designs that reduce reactor temperature and or pressure requirements (such as new non-iron based catalysts) (uses database library 116, AI 208, Nosanow Fermion Wave 202, Grand Free Energy 204, Simulations 206, and chemical bench 210 Modules). QMIP improves and optimizes reactor set-ups (uses AI 208, Simulation module 206, Nosanow Fermion Wave 202, and Grand Free Energy 204 Modules). QMIP is able to identify non-intuitive data correlations to fine tune process conditions that reduce by-products but increase yields. (AI 208, Simulation module 206, tradeoff 118, database library 116 Modules)

A chemical engineer has in many cases several challenges when given a new project. He uses an inexact science to solve his problem. Many projects take substantial trial and error, experimentation and time that involves different lots with significant variability. Time intensive research is often expensive often depends on the experience of the chemical engineer who typically is just lucky to formulate the right chemical combinations to solve a problem or improve a product.

There may not exist an integrated quantum mechanics instruction production system and platform that uses quantum mechanics to predict, develop, improve, or understand chemical properties and compounds to solve chemical engineering problems.

In operation, an implementation of the QMIP system can be programmed and configured to perform operations including: take the inputs for the functional requirements (110, 112) for the desired chemical properties solution(s) and non-functional requirements for the manufacturability and performance criteria, uses the license and authorization security module 114 to check the user's access, clears the search, establishes search and usage limits, and protects the user's discoveries as needed, uses Artificial Intelligence 208 to assist the processes and learn how to make the processes more effective, searches the Database 116 for existing and starting solutions, applies the QMIP system core process modules: Grand Free Energy 204, Nosanow Fermion Wave Equation 202, and Artificial Intelligence 208 Modules, to develop candidates, uses the Trade-Off module 118 to rank the candidates to the Requirements of the Input/Output Modules (110, 112), uses the Simulation module 206 to check creation of the candidates and the needed chemical properties, uses the Chemical bench module 210 to create candidate compounds, uses the Printer Module 120 to put the candidate compounds in the correct form, uses the sample analyzer module 122 to test the compounds to ensure the correct molecules are made, uses the Test Bench Module 124 to ensure the candidates can fit in the needed form factor, uses the Metrology and Interferometry Module 212 to measure the candidate's properties in conjunction with the sample analyzer module 122 and/or the Test bench module 124 Modules, uses the Tradeoff module 118 to evaluate the candidates results, routes candidates' properties into the Database 116, updates the Artificial intelligence module 208 with a new instruction, uses the License and Authorization Security Module 114 to log the user's access, uses the License and Authorization Security Module 114 to partition and safeguard user's findings/discoveries as needed, the Input/output modules (110, 112) receives the results to include the candidates' instructions for production, structural formulation to include bonds, test results, Hamiltonians, Requirements Scorer, Tradeoff Scaler, the appropriate frequency, and what is needed to control the creation, composition, and further manipulation of the compound and the interaction, and creates the candidate samples using the chemical bench 210 and printer module 120 Modules.

In some implementations, a chemical engineer has an integrated QMIP system to assist with his/her projects. In this example, the chemical engineer will be improving an organic light emitting diode (OLED) for a new screen to put into a new mobile phone release. OLEDs have advantages over crystal LEDs as OLEDs do not need backlighting, which reduces power requirements. However, the cost of OLEDs are high and production yields are low. This is a textbook case of using QMIP to improve a known starting point.

The chemical engineer gains access to the QMIP and has an account through the License and Authorization Security Module 114. He enters the Requirements into the Input/output modules (110, 112). His requirements include both functional (i.e., color, brightness, responsiveness, slimness, flexibility) and non-functional requirements (i.e., yield and manufacturability). The Artificial Intelligence Module 208 assists by first searching the database library module 116 for already existing solutions. These starting solutions are then checked to see if they satisfy the problem using the Tradeoff module 118.

If the Database Library Module 116 search has solutions that satisfy the Tradeoff 118 requirements, then the Input/output modules (110, 112) signals that samples are to be printed (e.g., using 120), adjusted for form factor and then tested.

If the chemical engineer believes or the Artificial Intelligence indicates the Database Library does not have the appropriate solution, then the Artificial intelligence module 208 involves the Nosanow Fermion Wave 202 and the Grand Free Energy 204 Modules to find "organic chemical" and/or "non-organic" compounds that satisfy the input requirements. The Artificial Intelligence can learn and supervise thousands, millions and billions of different alternative compounds for the better alternatives. The better candidates are stored in the Library Database Module 116, the tradeoff module 118 evaluates the candidates versus the Requirements 110. The better candidates are virtually constructed in the Simulation Module 206 to check that the candidates are able to be actually produced and performed as expected. The Artificial Intelligence 208 directs the Simulation module 206 module and instructs from past failures. These failures could include possible chemical compounds that are theoretically possible but have proven to lack stability. The Simulation Module 206 informs the instructions for production now developed by the AI Module 208 to be the blueprint for the creation of the compound. Again, actual compound information/properties with context are provided as input into the Tradeoff module 118 to be evaluated and supported by the AI Module 208. The analysis could be stopped at this time with the solutions being adequate for the requirements.

The chemical engineer employing the, AI 208 and/or the tradeoff module 118 could begin the chemical bench 210 process to actually create the candidate compounds. According to one embodiment, the chemical bench has appropriate components such as one or more automated chemical reactors, raw materials (i.e., elements and basic compounds), stirrers, temperature adjusters, pressure and volume adjusters, centrifuges, and assaying capabilities, etc. to create the candidate compounds. The candidates are created and tested by the sample analyzer module 122 to ensure the proper compounds are made. The created samples are used by the Printer Module 120 to put the chemical samples in the correct form factor to be tested by the Test Bench Module 124. In this example, the OLED candidates are built into the sample OLEDs mobile phone displays and the Test Bench Module 124 tests the mobile phone displays. Both the Sample analyzer module 122 and the Test bench module 124 Modules are connected to the Metrology and Interferometry Module 212.

The Chemical bench module 210 is envisioned to be an auto wet bench, used to distribute, and dispense chemicals and mix and blend the substances for reaction. The Chemical Bench can perform drying, cleaning surfaces, stripping material surface, texturing, etching semiconductors and electroplating. It could also include quantum chemistry calculations that would tie into AI 208, Simulation module 206 and sample analyzer module 122 Modules.

The Metrology & Interferometry (M&I) Module 212 is envisioned to use not just light waves, but also matter wave interference patterns, to measure small displacements, indexes of refraction, and surface irregularities. Examples are optic fiber quality and matter surface impurities. The M&I Module 212 could also be used to support spectroscopy that determines different substances. The Metrology & Interferometry Module 212 links into the AI 208, sample analyzer module 122 and chemical bench 210 Modules.

The chemical bench 210 and Sample analyzer module 122 Module is envisioned to include an automated Gas Analytic Chromatography and Mass Spectrometry system that combines features of each system to identify substances within a test sample (e.g., 214). The Chromatography sub-system takes small amounts of material and then establishes the presence and proportion of components. The Mass Spectrometry sub-system determines element and isotope signatures. The sample analyzer module 122 links into the AI 208, Chemical Bench 210, and Metrology & Interferometry module 212.

The Artificial Intelligence 208, Sample analyzer module 122, Test bench module 124 and the Metrology and interferometry module 212 Modules report-in their results for each candidates' attributes to the Trade-off Module 118. The tradeoff 118 and AI 208 Modules continue to evaluate the candidates for the best fit of functional and non-functional requirements. The Tradeoff module 118 can be envisioned working in several different ways. One method is to find the optimal solution that best fits the requirements. Another method is to find all the candidate solutions that work and identify all the candidates that did not work and the reasons for the failures. Sometimes, the most important insights involved are identifying the candidates that do not work and learning the reasons why. The results of the Tradeoff module 118 are passed along to the Input/output modules (110, 112) to be displayed to the chemical engineer and stored in the database library module 116. The chemical engineer can check the results and decide if he has found an acceptable answer or if there are multiple acceptable solutions, if there are no acceptable responses or if changes are needed such as narrowing/broadening of the search.

It is envisioned that the chemical engineer will have the capability to do sequential iterations of searches. For the first part of the quantum mechanics search, the chemical engineer may want to see if the QMIP system can achievably produce better candidate compounds than the starting solutions. The QMIP system would essentially take a new novel identify candidate solution and then use the Simulation Module 206 to check if and under what conditions it could be produced. This interaction run of QMIP would find candidate compounds for the functional requirements without consideration for the non-functional requirements and without producing chemical samples or printing the samples in the correct form factor.

The chemical engineer's first attempts are to define the solution's space. In this example case, there were several hundred possible candidates discovered. A next set of iterations for the QMIP system involves the chemical engineer adding in non-functional requirements such as manufacturing and performance factors. The QMIP system takes the previous identified candidates and then evaluates both the functional and non-functional requirements. The Simulation module 206, tradeoff 118 and AI 208 Modules are actively engaged as the candidates are checked against the full set of requirements. The results are displayed to the chemical engineer, who decides if additional changes in the requirements are needed.

Continuing with the OLED case, the engineer has found 10 worthy candidates that can proceed into the Chemical bench module 210. The instructions for production and the raw materials are provided to the chemical bench and the compounds are created. Through the use of the Sample analyzer module 122 and the metrology and interferometry module 212 modules, the candidates are tested to ensure the correct chemical compounds were created. As stated in the materials design case example, there are a variety of spectrometry and other chemist tools deployed to test the candidates. The AI module 208 advances in its capabilities from mistakes such as when candidate samples are not created as expected once analyzed. The candidate samples that are made correctly and have the chemical properties as expected are then passed to the 3D printer module 120.

The 3D printer module 120 will take the candidate material and form the OLED material to be used in the test display. In this example, the chemical engineer is using the present OLED as the champion candidate and the new candidates as challengers. The chemical engineer has the QMIP create and then print the samples. The Samples Analyzer tests the samples for their formulation in accordance with the instructions for production. He then compares the different samples using the test bench module 124 and the tradeoff module 118 employing the champion versus challenger strategy. The tradeoff module 120 rank orders the candidates and the results are passed to the input/output (110, 112) and the database library 116 modules. At this time, the chemical engineer has found several candidates that provide better brightness, durability, plus provides better cost and manufacturability then the present champion screen OLED.

The QMIP displays the results in the Input/output modules (110, 112) for the chemical engineer to make notes and prepare the output into the proper format he desires. The chemical engineer stores the results in the database library module 116 to be able to call up the results when he writes up his analysis, constructs his management presentation, writes a technical paper for publication and/or files a patent application for one or more of the candidates.

According to one embodiment, the QMIP will not just create instructions for the small batch sizes for analysis, 3D printing and test. QMIP will also create instructions for production for large scale fabrication of the composition of matter in a streamlined and optimized method. The instructions for production can be modified according to the facility and cost of the raw materials, energy consumption, and limitations of the facility. For instance, the cost of energy may be prohibitively expensive, so a different formulation would be recommended enabled by a different catalyst to lower energy costs with acceptable tradeoffs. FIG. 18 illustrates the application of the QMIP system and process to the large-scale production of materials.

In a different example, the chemical engineer is given material to conduct an analysis. In the following diagram, he can use the QMIP to do an analysis and determine the composition of the sample. The significance is QMIP can analyze the sample, determine the quantum components, and then reproduce additional amounts of the sample. The additional amounts can be used by the 3D Printer Module 120 to fit new circuits or in form factors. The performance of the material from the Sample analyzer module 122 and the Test bench module 124 Modules is assessed and fed into the Input/output modules (110, 112) to become the Requirements. This feature of the QMIP system analyzes the sample, creates additional matter, prints the matter into the test circuit, leverages the Sample analyzer module 122, Test bench module 124 and the Metrology and interferometry module 212 Modules to essentially validate the Requirements. The AI Module 208 can improve on the original sample by checking the database library module 116 and/or performing iterations using the QMIP Critical Processes.

The process of conducting the analysis on the champion or original sample first is a novel way of getting the starting solution's quantum technical requirements without the chemical engineer's having to guess on requirements in areas that are unknown or beyond his current knowledge.

As the database library 116 Module grows, the chemical engineer will be able to start his analysis with the desired champion sample already in the database library 116 Module. The chemical engineer could start the analysis process and discover the champion sample is already in the database library 116 Module.

The chemical engineer example above could also describe other "use cases" such as the material design, solar cell example or the medical researcher's case that follows further in this document. Nothing in this patent application should be restrictive to one type of use case. Given the quantum mechanics resources of the QMIP system, the confluence of material design, chemical engineering, medical design, quantum computing and financial optimization scenarios represented in this provisional application is intentional and speaks of the larger concept of quantum convergence and quantum emergence. Emergence of the methodical self-organization of complex (systems, products, technologies) having properties unlike any of its constituents. QMIP will expand the understanding of how to apply quantum mechanics in our everyday lives (materials, compounds, composites, technologies, etc.).

For example, in some implementations, a QMIP system can take requirements and forecast compounds that best match the requirements. The QMIP Tradeoff module 118 balances functional and non-functional requirements in the generation of alternative compounds for a champion material. The QMIP Tradeoff module 118 balances functional and non-functional requirements in the generation of alternative compounds for a specific purpose. The QMIP forecasts new compound's chemical and electromagnetic properties.

In some implementations, the QMIP can take functional and non-functional requirements as inputs and forecast new compounds whose chemical and electromagnetic properties fit the requirements. The QMIP system is also able to conduct a tradeoff analysis on the candidate compounds given a set of requirements.

The QMIP system can be configured to analyze samples, determine composition and create more of samples. The QMIP system can analyze samples and create requirements. The QMIP system can use a sample's record from the database library module 116 to begin the requirements and tradeoff processes.

In some implementations, the QMIP system can take a sample, determine the quantum composition of the sample, and create instructions for production. The QMIP system can create instructions for production for both small batches and/or for large industrial constructions. The QMIP system can be configured to monitor industrial processes and make changes to optimize the cost or yield of the process.

In some implementations, a QMIP system can be used to iteratively find candidates (e.g., materials, superconductors, etc.) that fit the functional requirements as well as the sub-set of candidates that fit both the functional and non-functional requirements.

Low Energy Nuclear Reaction Example

In Andre Rossi's patent, U.S. Pat. No. 9,115,913 entitled "Fluid Heater", he disclosed the catalyst and fuel used to achieve his Low Energy Nuclear Reactor (LENR) that runs his E-Cats. Rossi claims that once his fuel is heated, then the system produces enough heat to run steam turbines. Unfortunately, the alleged solution of Rossi is embroiled in controversy, doubts, claims of fraud and legal problems. Does that system work? Why does it work? One can believe that Rossi does not have the chemistry to show why that system works and that inventor's secretive and combative nature makes his alleged discovery almost impossible to be taken seriously.

In an example application, a QMIP system can show if Rossi's system is plausible or not and if possible, then the QMIP system can find better materials to run the process and create heat to run steam turbines. On a smaller level, LENR could create hot water for heating swimming pools, commercial laundry operations, and buildings or homes.

Rossi's patent (U.S. Pat. No. 9,115,913), describes: "The entire set of layers is welded together on all sides 15 to form a sealed unit. The size of the wafer 32 is not important to its function. However, the wafer 32 is easier to handle if it is on the order of 3-inches-thick and 12 inches on each side. The steel layers 50, 52 are typically 1 mm thick, and the mica layers 40, 48, which are covered by a protective polymer coating, are on the order of 0.1 mm thick. However, other thicknesses can also be used.

In operation, a Voltage is applied by the Voltage source 33 to heat the resistor 42. Heat from the resistor 42 is then transferred by conduction to the fuel layers 54, where it initiates a sequence of reactions, the last of which is reversible. These reactions, which are catalyzed by the presence of the nickel powder, are:

$$3LiAlH_4 \rightarrow Li_3AlH_6 + 2Al + 3H_2$$

$$2Li_3AlH_6 \rightarrow 6LiH + 2Al + 3H_2$$

$$2LiH + 2Al \rightarrow 2LiAl + H_2$$

Once the reaction sequence is initiated, the Voltage source 33 can be turned off, as the reaction sequence is self-sustaining. However, the reaction rate may not be constant. Hence, it may be desirable to turn on the voltage source 33 at certain times to reinvigorate the reaction. To determine whether or not the voltage source 33 should be turned on, the temperature sensor 37 provides a signal to the controller 35, which then determines whether or not to apply a Voltage in response to the temperature signal. It has been found that after the reaction has generated approximately 6 kilowatt hours of energy, it is desirable to apply approximately 1 kilowatt hour of electrical energy to reinvigorate the reaction sequence. Eventually, the efficiency of the wafer 32 will decrease . . . ."

Pharmaceutical Design Example

Table 4 illustrates the steps and workflow for drug design using the QMIP platform and methods.

As shown in stage 1 of Table 4 a QMIP system manages large amounts of data about cell signaling and disease drivers. The QMIP system provides greater and faster computing power to run complex algorithms efficiently. The QMIP system creates more efficient complex algorithms that identify unique signaling and associated disease drivers.

At stage 2 of Table 4, the QMIP system manages large amounts of data about the human system. The QMIP system provides greater and faster computing power that run complex algorithms efficiently. The QMIP system creates more efficient complex algorithms that reflect the human system more completely.

At stage 3 of Table 4, the QMIP system manages large amounts of data from virtual libraries. The QMIP system provides greater and faster computing power that run complex algorithms efficiently. The QMIP system creates more efficient complex screening algorithms that discover unique information and knowledge for test development.

At stage 4 of Table 4, the QMIP system manages large amounts of data from virtual libraries. The QMIP system provides greater and faster computing power that run complex algorithms efficiently. The QMIP system creates in-depth complex screening algorithms that identify top potential chemical compounds.

At stage 5 of Table 4, the QMIP system manages large amounts of data about the properties of valued chemical compounds. The QMIP system provides greater and faster computing power that run complex algorithms efficiently. The QMIP system creates complex algorithms that optimize chemical compounds as designs for candidate drugs.

At stage 6 of Table 4, the QMIP system manages large amounts of data about chemical compounds and human cell metabolism and organ toxicology etc. The QMIP system provides greater and faster computing power that run complex algorithms efficiently. The QMIP system creates complex algorithms that predict the human system in terms of drug actions such as absorption, distribution, metabolism, elimination and resulting toxicities.

At stage 7 of Table 4, the QMIP manages large amounts of data specific to drug testing. The QMIP system provides greater and faster computing power that run complex algorithms efficiently. The QMIP system creates complex algorithms that simulate drug patient interactions that define possible efficacy-safety balance and biological system profile.

At stage 8 of Table 4, the QMIP system manages large amounts of data specific to drug testing. The QMIP system provides greater and faster computing power that run complex algorithms efficiently. The QMIP system creates complex algorithms that analyze results and defines efficacy-safety balance, therapeutic index scores and biological system profiles.

A conventional process for pharmaceutical design can include:
  Identifying the disease drivers
  Targeting validation that the drug could work on the disease
  Developing tests to measure the target impact
  Identifying promising compounds
  Optimizing the potential drugs and select a drug candidate
  Studying metabolism, toxicity, etc.
  Testing humans for efficacy, safety, toxicity and dosage level, and
  Submitting for approval.

Current drug testing is complicated, time consuming, expensive and has a high failure rate. An incomplete matter and energy model lead to gross approximations of how molecules, composition of matter, and/or drugs exist, interact and affect each other in a human body or organism. This leads to great difficulty in identifying the disease drivers, validating the target, determining the impact, tradeoffs among effectiveness, dosage, toxicity, and efficacy.

The lack of understanding of molecular structures and interactions can cause difficulties for recognitions, predictions and manipulations.

Current theory does not adequately describe quantum behaviors and energy transfers of the valence clouds. This lack of knowledge bewilders the drug investigators as they build on the incomplete body of knowledge to describe ever increasing complex relationships.

Adding greater variables of time and expense without a model for the drug's theoretical effects versus field-trial effectiveness allow room for very significant improvements. Understanding the chemical reactions and the additional improvements of using better quantum computers (enhanced understanding, components, chips, and hardware) enabled by QMIP can speed up calculations. The QMIP improved Quantum Computer can use quantum algorithms to model the effect of a single drug on a virus, the effects on cells, organs, body, functional conditions and environment. The AI Module 208 adds the insights and calculations to the QMIP system body of knowledge that enables future investigations to be completed at reduced time and expense.

The Quantum Mechanics Instruction Production (QMIP) system determines a drug's profile's effect on targeted diseases and the drug's effects on non-targeted organisms.

The QMIP system database library 116 in conjunction with previous work, allows for a conceptional advancement of quantum particle, chemical bond, matter, energy, element, structurally formulated molecule, and drug performance. QMIP constructs drugs, enzymes, proteins, and carbon-based systems.

The QMIP system can provide a better plot of drug interactions within an organism's system. A drug may be targeted against Disease A. QMIP is able to demonstrate the drug's usefulness against Disease A as well as warn how the drug will affect the rest of the cells, biological systems, subject and environment. As an example, suppose Drug A is identified as a great way to fight Disease A, but may have an adverse effect on nerves or the digestive system. QMIP builds and learns about the drug performance on Disease A, inclusive of toxicity tradeoffs or side effects outside targeted parts of the body. QMIP attains the proper dosage and distribution of Drug A to maximize the effect on Disease A, while minimizing adverse side effects. The QMIP AI Module 208 recognizes the chemical signaling done by the cell functions of other cells.

As an example, cell signaling culminates in the electrochemical process of the cardiovascular system directing the heart how to pump blood through chambers opening and closing valves. Such a systems can be susceptible to conditions not unlike heart arrhythmia.

The QMIP system utilizes the database library 116 to build system profiles. A profile is a description of the matter, energy, potential energy transfers, bonds, interactions, catalysts, inhibitors, behaviors, characteristics, tendencies, effectiveness, predictions, dosage, side effectiveness, cell signaling, Efficacy-Safety Balance and the Therapeutic Index score.

Profiles can include: quantum particles; elements; molecules; types of bonds (e.g., ionic bonds, covalent bonds, polar bonds and hydrogen bonds); composition of matter; drugs; enzymes; proteins; DNA and RNA; cell components (e.g., tissue, nuclei, etc.); cells (e.g., muscle, nerve, red blood cell, etc.); multi-cell collections that perform a specific function (e.g., attach to bone or restricts blood flow, etc.); organs and their tissues (can be broadly categorized as parenchyma, the tissue peculiar to (or at least archetypal of) the functional purpose of the organ and stroma, the tissues with supportive, structural, connective, or ancillary functions; system of organs such as the circulatory system or digestive systems; entity (human, plant, animal, insect, synthetic entity, etc.); collection of entities (e.g., how treating a person in a community impacts the health of the community); and environments individuals live in.

Tradeoffs can be done per an efficacy scale, intensity of response/individual target and non-target, dosage requirements/individual target and nontarget, toxicity/individual target and non-target. Target is the specific disease, cell, living matter, organ, organism, human, animal, plant, synthetic organism, environment, etc. The target is what a technique seeks to influence. Non-target is non-specific disease, cell, living matter, organ, organism, human, animal, plant, synthesized organism, environment, etc. The non-targets correlate to the side effects that could involve organisms that were not being targeted.

Quantum Medical Research Example

Figure 15:
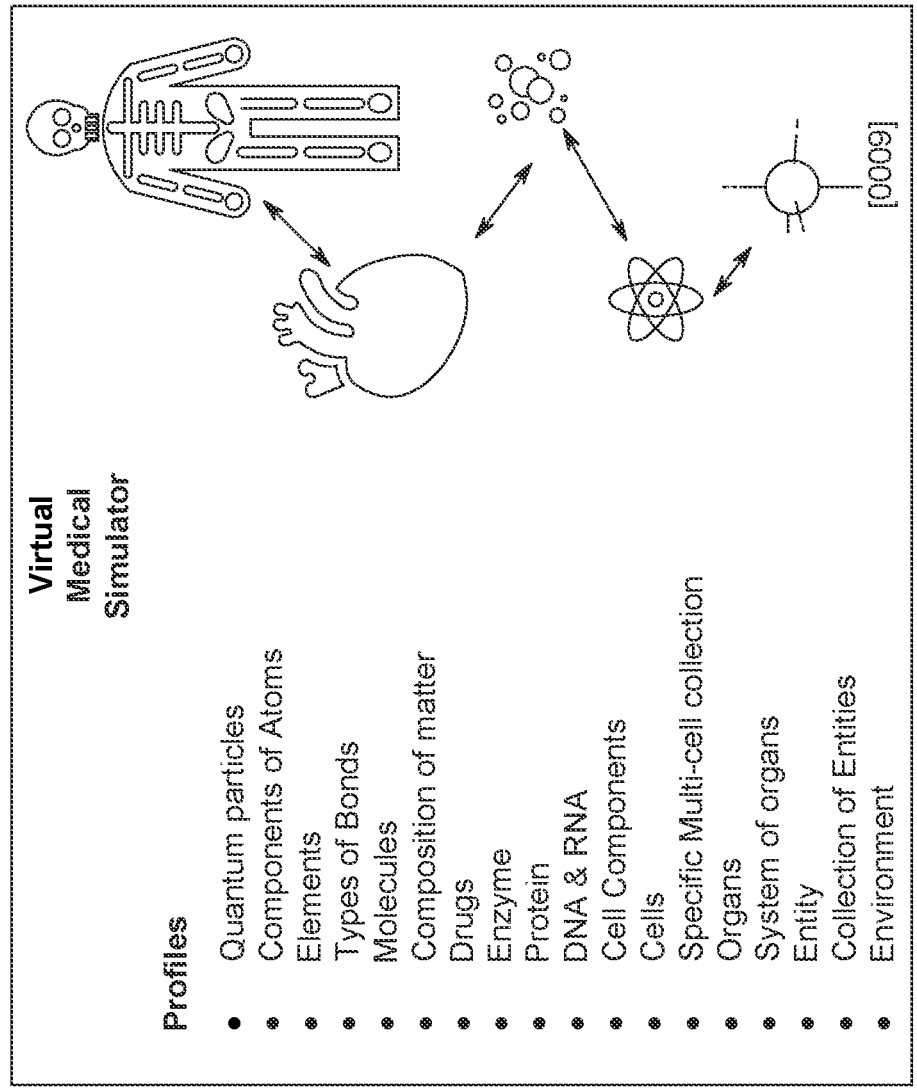
FIG. 15 is a diagram showing an example virtual medical simulator in accordance with some implementations.

A medical researcher will use the QMIP system to develop new treatments for disorders. In this scenario, a disease has caused a weak signal to manifest itself and cause chemical imbalances to make the heart misfire. The medical researcher has identified the disease driver with the weak signaling and chemical imbalance and begins to do target validation using the Virtual Medical Simulator (VMS) 1500. Working with the VMS 1500 and database library 116 the medical researcher can find the heart's constituent profiles and look for the interaction of the weak signal and chemical imbalance. The medical researcher can trace the effects of the disease from the quantum level to the cells to the heart, circulatory system to the person and on to the environment. She can compare the investigated results to the baseline models for normal healthy profiles. She studies the normal functions of the profiles and builds a Profile of the disease and the necessary Requirements needed for a proficient outcome displayed by the input/output modules (110, 112). The various aspects of a profile in a medical simulator are illustrated in FIG. 15.

With the Virtual Medical Simulator 1500, the database library 116, and the requirements module (110), the medical researcher establishes variances between normal baseline profiles and the diseased profiles. She determines how the negatives might be rectified and decides on possible candidates. The medical researcher then sets up her assay testing utilizing the Chemical bench module 210. Assay is the presence of substance and amount of the substance that determine the biological or pharmacological potency of say a drug, chemical, molecule, etc.

A potential solution (cure) for the abnormality is theoretically worked out by the medical researcher using the VMS 1500, the database library 116 and the requirements (or input) module 110. The corrective compositions of matter candidates are calculated using the QMIP system modules shown in FIGS. 1 and 2 that determine the compound properties considered necessary. The QMIP system defines both the micro and macro properties desired in the compositions or compounds to be produced which is reported to the input/output modules (110, 112).

Next, the output candidate data is sent to the tradeoff module 118 for rank ordering. The artificial intelligence module 208 advances the system procedures as it learns from the successes and failures of previous runs. The virtual medical simulator of FIG. 15 can be included in the QMIP system of FIG. 1 (for example, being coupled to the database) and programmed and configured for medical research.

Tradeoffs can be done per an efficacy scale that uses the virtual medical simulator 1500 and the database library 116 to evaluate the candidates including: intensity of response/individual target and non-target; dosage requirements/individual target and nontarget; toxicity/individual target and non-target; and target is the specific disease, cell, living matter, organ, organism, human, animal, plant, synthetic organism, environment, etc. The target is what the system is programmed to influence.

Non-target is unspecific disease, cell, living matter, organ, organism, human, animal, plant, synthetic organism, environment, etc. The non-targets correlate to the side effects that could involve organisms that were not being targeted.

QMIP can also be used to enhance performance and condition, such as for the body to heal or organs to re-grow and or be able to withstand new stresses. We age because we wear out. The physics of entropy determines the breakdown of cellular processes in a cell by the accumulated effects of repetitive stress. Leonard Hayflick, the original discoverer of cellular aging, believes the ultimate cause of aging is the increasing molecular disorder, as described in the article "Why Do We Age?," authored by Brooke Borei in Popular Science (Mar. 30, 2016).

By using the Nosanow Fermion Wave Module 202 and other QMIP Modules, heath quantum researchers can improve our understanding of the aging process. Knowing the "why" (perhaps DNA replication), the quantum health researchers can find how to prevent and reverse the molecular decomposition.

Consider the exemplary case where a medical researcher is given a sample to analyze. The QMIP system can be used to take the sample and give a complete analysis of the compound/substance anomalies.

In the beginning, the QMIP system and platform will map the drug to the targeted cell signaling; Drug 1 versus Disease A. The QMIP AI 208 determines or predicts and maps Drug 1's effectiveness. The QMIP system continues to evaluate how well Drug 1 performs and records the results in the database library 116. The Library grows as Drug 2 is interactively measured against Disease B and then against Disease A and if there are predicted interactions with Drug 1. Again, QMIP records the results and builds on the database library module 116. The QMIP system can then be programmed and configured to evaluate a drug and calculate the effectiveness against previous targets and will start refining how the drug reacts with non-targeted cells, drugs and profiles identified above. The QMIP system prioritizes future designs and develop insights as the searches and capabilities become wider and deeper into non-targeted effects.

Better understanding on unintended side effects and predicted reactions provide feedback for confirmation/validation testing. It might not be unusual that earlier Drug 1 vs Disease A may find additional side effects or find that Drug 369 works a little less effectively against Disease A but with less side effects. The use of an efficacy scale or therapeutic index becomes multi-dimensional as specific conditions and genetics require custom made drug mixtures, delivery systems and dosages per host. The database library 116 continues to grow and delivers better insights. The calculations may grow and special quantum computers (enabled by the QMIP system) may be required to compute with an exponential increase of power.

The QMIP system with the database library 116 evaluates treatments versus targeted disease and non-targeted host biological functions to produce an acceptable health model that speeds time and expense to finding novel cures that regulatory agencies will approve.

The QMIP system develops a host biological model that can be used to simulate a disease's effect and drug/treatment response.

The QMIP can monitor the drug's effect during testing/trials to provide information on effectiveness, dosage, safety, toxicity, and known and unknown side effects. The Simulation module 206 and VMS 1500 Modules are used to replicate the testing done in a test animal, human trials, and individual actual usage. The profiles stored in/by the Virtual Medical Simulator are illustrated in FIG. 15 according to one embodiment.

Quantum Financial Services Example

Table 5 below depicts a process for active portfolio optimization developed using the QMIP system. Open Banking (where banks give access to the use of their APIs to others) is causing a transformation in the financial services industry. The requirement for dramatic increases of big data analysis, management and productization down to the individual main street customer to maximize opportunities can be more readily met in its entirety by quantum computing and quantum applications and, in particular, by using the QMIP system. Central to the financial industries business is the ability to optimize risk and return. Therefore, the process flow diagram of Table 5 focuses on portfolio optimization. There are indeed many ancillary products (loan offerings), services (budget management) and functions (credit/asset scoring) that can be associated with financial services, which quantum computing could enable or better support. Consequently, the financial services industry will undoubtedly achieve this transformation by using the QMIP system as partially represented by the above diagram and described in the following notes.

In this example, at stage 1 in Table 5, the QMIP system can be programmed and configured to manage large amounts of data about more subtle and complex market information, provide greater and faster computing power that is able to run tailored and moderately complex algorithms efficiently, and create Noisy Intermediate Scale Quantum (NISQ) libraries of algorithms specifically programmed and configured for optimization of NISQ era computers.

Further, in this example at 3 in Table 5, the QMIP system can be programmed and configured to manage large amounts of data and information about subtle and complex market drivers of securities, provide greater and faster computing power that run complex optimization algorithms efficiently, and create more efficient complex algorithms that reflect the market system more completely. In stages 3 and 4 of Table 5, the QMIP system can be programmed and configured to manage large amounts of data from growing virtual data sets, provide greater and faster computing power that runs complex evolving algorithms, and create more efficient complex pattern recognition algorithms that predict behaviors rapidly.

At stages 5 and 6 of Table 5, the QMIP system can be programmed and configured to manage large amounts of data, provide greater and faster computing power that run complex timely accurate simulation algorithms that capture short to long market period descriptions, and create in-depth complex algorithms that determine the best optimized portfolio with the least uncertainty.

Quantum and Classical Computing Devices

Various implementations of features described herein can use any type of system and/or service. Any type of electronic device can make use of features described herein. Some implementations can provide one or more features described herein on client or server devices disconnected from or intermittently connected to computer networks.

Figure 13:
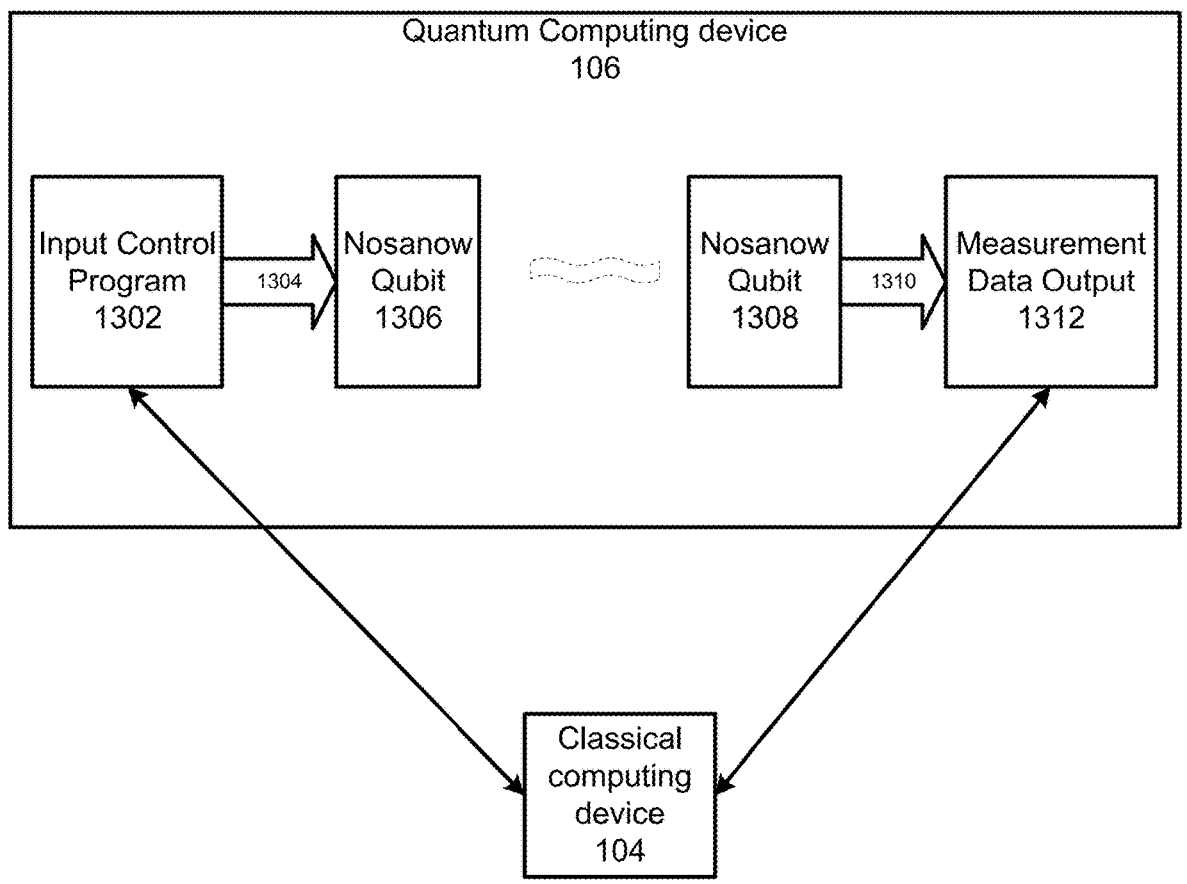
FIG. 13 is a block diagram of an example quantum computing device having one or more Nosanow qubits in accordance with some implementations.

FIG. 13 is a block diagram of an example quantum computing device 106 having one or more Nosanow qubits (1306, 1308) in accordance with some implementations. In particular, the quantum computing device 106 includes an input control program 1032, input control signals 1304, a first Nosanow qubit 1306 shown interacting (wavy line) with a second Nosanow qubit 1308 with an output signal 1310 sensed and received by a measurement data output module 1312.

In operation, the classical computing device 104 of the QMIP system can set up the quantum computing device 106 according to set-up parameters determined by the QMIP system and control the quantum computing device 106 via control signals based on control parameters or information supplied by the QMIP system to maximize the time that the Nosanow qubits are in a coherent state.

Figure 14:
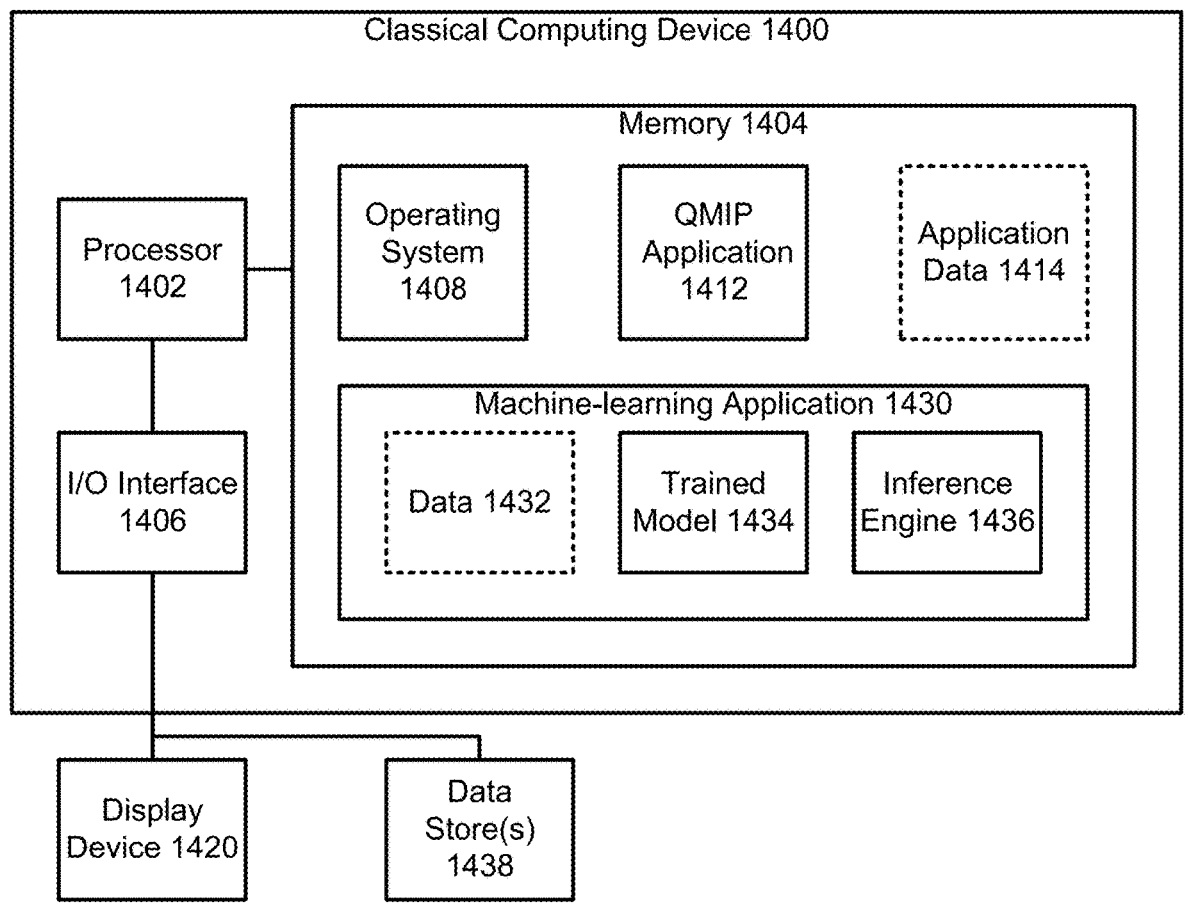
FIG. 14 is a block diagram of an example classical computing device which may be used for one or more implementations described herein.

FIG. 14 is a block diagram of an example classical (i.e., non-quantum) computing device 1400 which may be used to implement one or more features described herein. In one example, device 1400 may be used to implement some or all of the QMIP core processing module 102 shown in FIG. 1. Device 1400 can be any suitable computer system, server, or other electronic or hardware device as described herein.

One or more methods described herein (e.g., 300 and/or 1000) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, computations can be performed within the mobile app (and/or other apps) on the mobile computing device. In another example, computations can be split between the mobile computing device and one or more server devices.

In some implementations, device 1400 includes a processor 1402, a memory 1404, and I/O interface 1406. Processor 1402 can be one or more processors and/or processing circuits to execute program code and control basic operations of the device 1400. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 1402 may include one or more co-processors that implement neural-network processing. In some implementations, processor 1402 may be a processor that processes data to produce probabilistic output, e.g., the output produced by processor 1402 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1404 is typically provided in device 1400 for access by the processor 1402 and may be any suitable processor-readable storage medium, such as random-access memory (RAM), read-only memory (ROM), Electrically Erasable Read-only Memory (EEPROM), Flash memory, etc., suitable for storing instructions for execution by the processor, and located separate from processor 1402 and/or integrated therewith. Memory 1404 can store software operating on the server device 1400 by the processor 1402, including an operating system 408, machine-learning application 1430, QMIP application 1412, and application data 1414. Other applications may include applications such as a data display engine, web hosting engine, image display engine, notification engine, social networking engine, etc. In some implementations, the machine-learning application 1430 and QMIP application 1412 can each include instructions that enable processor 1402 to perform functions described herein, e.g., some or all of the methods of FIG. 3-6 or 10.

The machine-learning application 1430 can include one or more NER implementations for which supervised and/or unsupervised learning can be used. The machine learning models can include multi-task learning based models, residual task bidirectional LSTM (long short-term memory) with conditional random fields, statistical NER, etc. The Device can also include a QMIP system application 1412 (including core processing modules) as described herein and other applications. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 1430 may utilize Bayesian classifiers, support vector machines, neural networks, or other learning techniques. In some implementations, machine-learning application 1430 may include a trained model 1434, an inference engine 1436, and data 1432. In some implementations, data 432 may include training data, e.g., data used to generate trained model 1434. For example, training data may include any type of data suitable for training a model for QMIP tasks, such as material properties, desired operational characteristics, etc. associated with quantum mechanics as described herein. Training data may be obtained from any source, e.g., a data repository specifically marked for training, data for which permission is provided for use as training data for machine-learning, etc. In implementations where one or more users permit use of their respective user data to train a machine-learning model, e.g., trained model 1434, training data may include such user data. In implementations where users permit use of their respective user data, data 1432 may include permitted data.

In some implementations, data 1432 may include collected data such as candidate new materials identified along with the input parameters for those materials. In some implementations, training data may include synthetic data generated for the purpose of training, such as data that is not based on user input or activity in the context that is being trained, e.g., data generated from simulated conversations, computer-generated images, etc. In some implementations, machine-learning application 1430 excludes data 1432. For example, in these implementations, the trained model 1434 may be generated, e.g., on a different device, and be provided as part of machine-learning application 1430. In various implementations, the trained model 1434 may be provided as a data file that includes a model structure or form, and associated weights. Inference engine 1436 may read the data file for trained model 1434 and implement a neural network with node connectivity, layers, and weights based on the model structure or form specified in trained model 1434.

Machine-learning application 1430 also includes a trained model 1434. In some implementations, the trained model 1434 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data and produces as output a result sequence), etc.

The model form or structure may specify connectivity between various nodes and organization of nodes into layers. For example, nodes of a first layer (e.g., input layer) may receive data as input data 1432 or application data 1414. Such data can include, for example, images, e.g., when the trained model is used for one or more QMIP functions described herein. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of candidate materials, an indication that a candidate material meets the input criteria, etc. depending on the specific trained model. In some implementations, model form or structure also specifies a number and/or type of nodes in each layer.

In different implementations, the trained model 1434 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 1434 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1432, to produce a result.

For example, training may include applying supervised learning techniques. In supervised learning, the training data can include a plurality of inputs (e.g., a set of material properties or requirements) and a corresponding expected output for each input (e.g., one or more candidate materials). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to identify quantum material properties that are associated with input properties or criteria for material design.

In another example, a model trained using unsupervised learning may cluster words based on the use of the words in data sources. In some implementations, unsupervised learning may be used to produce knowledge representations, e.g., that may be used by machine-learning application 1430. In various implementations, a trained model includes a set of weights, or embeddings, corresponding to the model structure. In implementations where data 1432 is omitted, machine-learning application 1430 may include trained model 1434 that is based on prior training, e.g., by a developer of the machine-learning application 1430, by a third-party, etc. In some implementations, trained model 1434 may include a set of weights that are fixed, e.g., downloaded from a server that provides the weights.

Machine-learning application 1430 also includes an inference engine 1436. Inference engine 1436 is configured to apply the trained model 1434 to data, such as application data 1414, to provide an inference. In some implementations, inference engine 1436 may include software code to be executed by processor 1402. In some implementations, inference engine 1436 may specify circuit configuration (e.g., for a programmable processor, for a field programmable gate array (FPGA), etc.) enabling processor 1402 to apply the trained model. In some implementations, inference engine 1436 may include software instructions, hardware instructions, or a combination. In some implementations, inference engine 1436 may offer an application programming interface (API) that can be used by operating system 1408 and/or QMIP application 1412 to invoke inference engine 1436, e.g., to apply trained model 1434 to application data 1414 to generate an inference.

Machine-learning application 1430 may provide several technical advantages. For example, when trained model 1434 is generated based on unsupervised learning, trained model 1434 can be applied by inference engine 1436 to produce knowledge representations (e.g., numeric representations) from input data, e.g., application data 1414. For example, a model trained for quantum mechanics tasks may produce predictions and confidences for given input information about a quantum material or other quantum computing output. A model trained for suggesting quantum materials may produce a suggestion for one or more new materials meeting one or more input criteria. In some implementations, such representations may be helpful to reduce processing cost (e.g., computational cost, memory usage, etc.) to generate an output (e.g., a suggestion, a prediction, a classification, etc.). In some implementations, such representations may be provided as input to a different machine-learning application that produces output from the output of inference engine 1436.

In some implementations, knowledge representations generated by machine-learning application 1430 may be provided to a different device that conducts further processing, e.g., over a network. In such implementations, providing the knowledge representations rather than the images may provide a technical benefit, e.g., enable faster data transmission with reduced cost.

In some implementations, machine-learning application 1430 may be implemented in an offline manner. In these implementations, trained model 1434 may be generated in a first stage and provided as part of machine-learning application 1430. In some implementations, machine-learning application 1430 may be implemented in an online manner. For example, in such implementations, an application that invokes machine-learning application 1430 (e.g., operating system 1408, one or more of QMIP application 1412 or other applications) may utilize an inference produced by machine-learning application 1430, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 1434, e.g., to update embeddings for trained model 1434.

In some implementations, machine-learning application 1430 may be implemented in a manner that can adapt to particular configuration of device 1400 on which the machine-learning application 1430 is executed. For example, machine-learning application 430 may determine a computational graph that utilizes available computational resources, e.g., processor 1402. For example, if machine-learning application 1430 is implemented as a distributed application on multiple devices, machine-learning application 1430 may determine computations to be carried out on individual devices in a manner that optimizes computation. In another example, machine-learning application 1430 may determine that processor 1402 includes a GPU with a particular number of GPU cores (e.g., 1000) and implement the inference engine accordingly (e.g., as 1000 individual processes or threads).

In some implementations, machine-learning application 1430 may implement an ensemble of trained models. For example, trained model 1434 may include a plurality of trained models that are each applicable to same input data. In these implementations, machine-learning application 1430 may choose a particular trained model, e.g., based on available computational resources, success rate with prior inferences, etc. In some implementations, machine-learning application 1430 may execute inference engine 1436 such that a plurality of trained models is applied. In these implementations, machine-learning application 1430 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1408 or one or more other applications, e.g., QMIP application 1412.

In different implementations, machine-learning application 1430 can produce different types of outputs. For example, machine-learning application 1430 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 1430 may produce an output video with a particular effect applied, e.g., rendered in a comic-book or particular artist's style, when trained model 1434 is trained using training data from the comic book or particular artist, etc. In some implementations, machine-learning application 1430 may produce an output based on a format specified by an invoking application, e.g., operating system 1408 or one or more applications, e.g., QMIP application 1412. In some implementations, an invoking application may be another machine-learning application. For example, such configurations may be used in generative adversarial networks, where an invoking machine-learning application is trained using output from machine-learning application 1430 and vice-versa.

Any of software in memory 1404 can alternatively be stored on any other suitable storage location or computer-readable medium. In addition, memory 1404 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 1404 and any other type of storage (magnetic disk, optical disk, magnetic tape, or other tangible media) can be considered "storage" or "storage devices."

I/O interface 1406 can provide functions to enable interfacing the server device 1400 with other systems and devices. Interfaced devices can be included as part of the device 400 or can be separate and communicate with the device 1400. For example, network communication devices, storage devices (e.g., memory and/or database 106), and input/output devices can communicate via I/O interface 1406. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 1406 can include one or more display devices 1420 and one or more data stores 1438 (as discussed above). The display devices 1420 that can be used to display content, e.g., a user interface of an output application as described herein. Display device 1420 can be connected to device 400 via local connections (e.g., display bus) and/or via networked connections and can be any suitable display device. Display device 1420 can include any suitable display device such as an LCD, LED, or plasma display screen, CRT, television, monitor, touchscreen, 3-D display screen, or other visual display device. For example, display device 1420 can be a flat display screen provided on a mobile device, multiple display screens provided in a goggles or headset device, or a monitor screen for a computer device.

The I/O interface 1406 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 14 shows one block for each of processor 1402, memory 1404, I/O interface 1406, and software blocks 1408, 1412, and 1430. These blocks may represent one or more processors or processing circuitries, operating systems, memories, I/O interfaces, applications, and/or software modules. In other implementations, device 1400 may not have all of the components shown and/or may have other elements including other types of elements instead of, or in addition to, those shown herein. While some components are described as performing blocks and operations as described in some implementations herein, any suitable component or combination of components of environment 100, device 1400, similar systems, or any suitable processor or processors associated with such a system, may perform the blocks and operations described.

In some implementations, the QMIP system could include a machine-learning model (as described herein) for tuning the system (e.g., selecting candidate materials and corresponding thresholds) to potentially provide improved accuracy. Inputs to the machine learning model can include material properties and/or a descriptor vector that describes materials and includes information about material properties. Example machine-learning model input can include target material properties or characteristics for a simple implementation and can be augmented with descriptor vector features for a more advanced implementation. Output of the machine-learning module can include a prediction of one or more candidate materials.

One or more methods described herein (e.g., method 300 or 1000) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

Nosanow Equation Theory

The Nosanow Equation Theory can include a method that can be used to calculate and predict the properties of a Fermion and Fermion System as well as a Boson and Boson System, an application being a new superconductor(s) (accounts for the Macroscopic Phase Discontinuity). Some implementations can include application that demonstrates that spin-orbit coupling does not exist, but rather another nuclear force.

The Nosanow Equation Theory can explain new particles such as:

A new Quasi Particle defined as a QUASON1 (which are the Elementary Excitations of a Grand Fermi Quason Field), and which appears as the QUANTA of the Grand Free Quason Fermi Field.

A new Quasi Particle defined as a QUASON2 (which are the Elementary Excitations of a Grand Boson Quason Field), and which appears as the QUANTA of the Grand Free Quason Boson Field.

A new Non-Relativistic Positron particle, as described above.

A new Non-Relativistic Boson particle, as described above.

The Nosanow Equation Theory can also provide:

Recognition that one can essentially add the potential energy to the kinetic energy $$\hat{H}_{CF} = [\hat{H}_F + \hat{H}_{GP}] + [\hat{H}_\alpha - \hat{H}_{GP}].$$

Recognition that $\hat{H}_{GP}$ is an order of magnitude smaller than $\hat{H}_\alpha$ but has the same order of magnitude as $\hat{H}_F$. Consequently, $[\hat{H}_\alpha - \hat{H}_{GP}] \cong$ but $\hat{H}_{GP}$ has a significant effect on $\hat{H}_F$.

Recognition that $[\hat{H}_F + \hat{H}_{GP}]$ has the same form as the BCS (Bardeen, Cooper and Schrieffer) Model Hamiltonian. This insight is fundamental to a new superconductor theory which can be applied to create new, improved superconductors.

The analytical determination of helium-3's ground state, critical temperature and of its thermodynamic properties.

The ability to predict new superconductors and super fluids using an innovative scheme that simplifies the computations and reduces substantially the numerical process time. This also applies to particles, atoms, molecules, compounds, alloys and composites alike.

A spin orbit coupling force does not exist, which can now be verified by the Nosanow Fermion Wave Equation.

A different nuclear force actually exists, as predicted by the Nosanow Fermion Wave Equation, which now replaces the current spin orbit coupling force that was an extrapolation.

A new Nosanow application of the BCS Unitary Transformation and the comprehension of the implications.

$\hat{H}_{\bar{\alpha}}$ is an educated guess that may be written to introduce a more complex spin as represented by the terms of η. The Nosanow Fermion Wave Equation is written with spin as an integral part, unlike the Schrodinger Wave Equation where spin must be added separately.

A relativistic method can be used as a guide to write a nonrelativistic expression for $[\hat{H}_F + \hat{H}_{GP}]$.

$\hat{H}_{GP} = \frac{1}{V} \Sigma_{k_1} \Sigma_{k_2} \langle \vec{k}_1 | v(r_{1,2}) | \vec{k}_2 \rangle$ is a totally new and solvable equation.

This $[\hat{H}_F + \hat{H}_{GP}]$ Hamiltonian yields a new and solvable wave equation:

$$i\hbar \frac{\partial}{\partial t} \psi(\{\vec{r}, \vec{S}\}; t) I_4 = \pm \hat{H}_Q(\{\vec{p}\}_N; \mu; \Delta_F)[\psi(\{\vec{r}, \vec{S}\}; t) I_4]$$

This $\hat{H}_\alpha \cong \hat{H}_{\bar{\alpha}}$ Hamiltonian yields a new interaction expression $\hat{H}_{\bar{\alpha}}(\mu; \Delta \equiv$ $$\frac{1}{2V} \Sigma_{\eta_1} \cdots \Sigma_{\eta_4} \int_V d\vec{r}_1 \int_V d\vec{r}_2 \psi^\dagger(\vec{r}_1, \eta_1) \psi^\dagger(\vec{r}_2, \eta_2) < \eta_1,$$

$$\eta_2 | V_{\bar{\alpha}}(\vec{r}_1, \vec{r}_2) | \eta_4, \eta_3 > \hat{\psi}(\vec{r}_2, \eta_4) \hat{\psi}(\vec{r}_1, \eta_3)$$

A new quantum mechanics identity, known as the Nosanow Identity, has been constructed using the Energy of a Free Quason: $E_p^2(\mu; \Delta) I_4 = [\epsilon_p^2 - 2\mu \epsilon_p + \mu^2 + \Delta^2] I_4$; $I_4$ is a unit matrix of rank 4.

A new and solvable Nosanow Wave Equation for a Fermion System has been created now known as the Nosanow Fermion Wave Equation. This wave equation is more comprehensive, accurate, and solvable than anything in existence today.

$$\left\{ \pm D(\vec{r}, \vec{S}) + \frac{1}{V} \Sigma_{\eta_1} \Sigma_{\eta_2} \Sigma_{\eta_4} \right.$$

$$\left. \int_V d\vec{r}_2 \langle \eta_1, \eta_2 | V_{\bar{\alpha}}(\vec{r}_1, \vec{r}_2) | \eta_4, \eta_3 \rangle \times \psi^\dagger(\vec{r}_2, \eta_2) \psi(\vec{r}_2, \eta_4) \right\} \psi(\vec{r}, \vec{s}) = 0$$

A new solvable Nosanow Wave Equation for a Boson System has been created now known as the Nosanow Boson Wave Equation. This wave equation is more comprehensive, accurate, and solvable than anything in existence today.

The Nosanow Fermion and Nosanow Boson Wave Equations calculate Quantum Mechanical properties that are then transformed into thermodynamic permutations at the macroscopic level.

The Nosanow Fermion Wave Equation generalized in the Electromagnetic Field.

The Nosanow Boson Wave Equation generalized in the Electromagnetic Field.

The physics of the Nuclear Shell Model can now be explained and accurately represented mathematically.

The Nuclear Shell Model in turn now validates the Nosanow Fermion and Nosanow Boson Wave Equations.

The analytical determination of helium-3's ground state, critical temperature and of its thermodynamic properties validates the Nosanow Fermion and Nosanow Boson Wave Equations.

A revised and more comprehensive periodic table can now be developed based upon nucleon interactions.

The use of 4×4 matrices in the development of the Nosanow Fermion Wave Equation can be expanded to explore and express new insights into quantum mechanics. In addition to the 4×4 matrices, a 16×16 matrix is also developed and used in the Nosanow Fermion Wave Equation and Hamiltonian.

The actual AI module, due to the expansion of new knowledge that can now be provided by the Nosanow Fermion and Nosanow Boson Wave Equations, is able to provide more subtle and discerning procedures for establishing, maintaining and manipulating quantum bits.

Example applications can include a new periodic table built on nucleon interactions, a new branch of Computational Chemistry based on nucleon interactions, an expansion of the current superconductor theory and practice, a valid and predictive method that can express how quantum mechanics can explain classical mechanics, an expansion of the current understandings of Quantum Mechanics and the ability to apply its use, an ability to solve problems that the Schrodinger Equation can solve and, most notably, cannot solve, an ability to explain electron tunneling more completely, the prediction that a new Non-Relativistic Positron particle exists, the prediction that a new Non-Relativistic Boson particle exists, and an ability to correct and explain a more accurate Nuclear Shell Model Theory.

Nosanow Fermion Wave Equation Primer

This section describes the development and construction of new Nosanow Fermion Wave Equations. There are many different Fermion Systems whose Hamiltonians have the form:

$$\hat{H}_{CF} = \hat{H}_F + \hat{H}_\alpha,$$

where $\hat{H}_F$ designates the Hamiltonian of N Free Fermions and $\hat{H}_\alpha$ denotes one of many possible interaction Hamiltonians which can be obtained from these Fermion Systems.

BCS Theory Yields:
- a superfluid Fermi gas for $T \leq T_c$ and
- an ideal Fermi gas for $T > T_c$, where T designates the temperature in energy units and $T_c$ denotes the critical temperature. This result suggests there is something unusual going on in Fermion systems with a sufficient attraction such that Cooper Pairs may exist in the system. This observation is the starting point for the present study.

It is manifest that $\hat{H}_{CF}$ contains a Sub-Hamiltonian which has essentially the same form as the BCS phenomenological Hamiltonian. This Sub-Hamiltonian may be written:

$$\hat{H}_{SH} \equiv \hat{H}_F + \hat{H}_{GP},$$

where, in essence, $\hat{H}_{GP}$ has the same form as the BCS Grand Pairing Interaction term. The Hamiltonian $\hat{H}_{CF}$ may therefore be written:

$$\hat{H}_{CG} = [\hat{H}_F + \hat{H}_{GP}] + [\hat{H}_\alpha - \hat{H}_{GP}]$$

In this expression, $\hat{H}_{GP}$ may be neglected relative $\hat{H}_\alpha$ to because it is a factor of N smaller than $\hat{H}_\alpha$.

It follows that the Hamiltonian, $\hat{H}_{Free} \equiv \hat{H}_F + \hat{H}_{GP}$, may be diagonalized using the BCS unitary transformation. This Hamiltonian yields the first part of a new Nosanow Fermion Wave Equation. This Hamiltonian may be written as the equation:

$$i\hbar \frac{\partial}{\partial t} \hat{\psi}(\{\vec{r}, \vec{S}\}; t) I_4 = \pm \hat{H}_{Free}(\{\hat{p}\}_N; \mu; \Delta) \hat{\psi}(\{\vec{r}, \vec{S}\}; t) I_4, \text{ where}$$

$$\hat{H}_{Free}(\{\hat{p}\}_N; \mu; \Delta_F) \equiv \beta[\in(\hat{p}) - \varepsilon(u; \Delta_F)] + (\alpha \cdot \hat{p}) K(\mu; \Delta)$$

and $\Delta$ denotes the order parameter for $\hat{p} = p_F$.

It is straightforward to show that the solution of $\hat{H}_F + \hat{H}_{GP}$ may be written:

$$E_{FG}(p) \equiv [\varepsilon^2(p) - 2\mu\varepsilon(p) + \mu^2 + \Delta^2(p)]^{1/2}.$$

The quantity $\Delta(p)$ is given by an equation which is analogous to the BCS gap equation. In contradistinction to BCS theory, this equation cannot be used to calculate $\Delta(p)$.

However, it can be shown that $\Delta(p) \cong \Delta(p_F)$, where $p_F^2/m$ denotes the Fermi energy. The quantity $\Delta(p_F)$ may simply be written $\Delta$.

Furthermore, it is also straightforward to show that the DIRAC approach may be utilized to construct the Nosanow Wave Equation of this Fermion system. In the expression for $$E_{FG}(p); \epsilon(\hat{p}) \equiv p^2/2m,$$

$$\varepsilon(\mu; \Delta_F) \equiv (\mu^2 + \Delta_F^2)^{1/2} \text{ and } K^2(\mu; \Delta_F) \equiv \varepsilon(\mu; \Delta_F) - \mu.$$

It remains to complete the new platform system by adding $\hat{H}_\alpha$. The explicit expression for $\hat{H}_{Free}$ may be constructed using Dirac Matrices $\beta$ and $\vec{\alpha}$. The definitions of these Rank 4 matrices are:

$$\beta \equiv \begin{bmatrix} I & 0 \\ 0 & -I \end{bmatrix} \text{ and } \vec{\alpha} \equiv \begin{bmatrix} 0 & \vec{\sigma} \\ \vec{\sigma} & 0 \end{bmatrix},$$

where I, $\vec{\sigma}$, and 0 denote matrices of Rank 2. These matrices may be used as a guide to construct the relativistic identity:

$$E^2(p) I_4 = (c^2 p^2 + m^2 c^4) I_4 \equiv [c(\vec{\alpha} \cdot \vec{p}) + \beta m c^2]^2.$$

(Note: this identity is relativistic invariant.) This identity may be generalized to construct the nonrelativistic identity:

$$E_{FG}(p) I_4 \equiv [\in^2(\vec{p}) - 2\mu \in (\vec{p}) + \mu^2 + \Delta^2] I_4 \equiv$$

$$\left\{ \beta\left[\left(\frac{p^2}{2m}\right) - \varepsilon(\mu; \Delta(p_F))\right] + (\vec{\alpha} \cdot \vec{p}) K(\mu; \Delta(p))\right\}^2.$$

The proof of this identity follows from the three properties:
1) the cross terms vanish because $\beta$ and $(\vec{\alpha} \cdot \vec{p})$ anticommute,
2) $\beta^2 = I_4$, and
3) $(\vec{\alpha} \cdot \vec{p}) = p^2 I_4$.

Therefore, the square root of Quadratic Function of $p^2$ may be written as a Matrix of Rank 4 whose elements are Quadratic Functions of $\vec{p}$. It follows that $$E_{FG}(p) I_4 \equiv \pm \{\beta[\in (\vec{p}) - \varepsilon(\mu; \Delta(p_F))] + (\vec{\alpha} \cdot \vec{p}) K(\mu; \Delta(p))\}$$

where $$\epsilon(\vec{p}) \equiv \frac{p^2}{2m}$$

designates the Kinetic Energy of One Free Particle.

To process further, the following substitution for $E_{FG}(p)$ and $\vec{p}$ may be introduced:

$$E_{FG}(p) \to i\hbar \frac{\partial}{\partial t} \text{ and } \vec{p} \to \hat{p}.$$

Using these substitutions in the expression for $E_{FG}(p)$ yields the FIELD OPERATOR:

$$i\hbar \frac{\partial}{\partial t} \hat{\psi}(\vec{r}, \vec{S}; t) \doteq \pm \hat{H}_{Free}(\hat{p}; \mu; \Delta(p_F)) \hat{\psi}(\vec{r}, \vec{S}; t), \text{ where}$$

$$\hat{H}_{Free}\{\hat{p}; \mu, \Delta(p_F)\} \equiv \beta[ \in (\hat{p}) - \varepsilon(u; \Delta(p_F))] + (\vec{\alpha} \cdot \vec{p}) k(\mu; \Delta(p)).$$

The quantity $\vec{S}$ denotes the Spin Matrix $\vec{S} \equiv \frac{1}{2} \hbar \vec{\sigma}$ where $\vec{\sigma}$ denotes the Pauli Spin Vector whose components are the Pauli Spin Matrices. The Equation for $\psi(\vec{r}, \vec{S}; t)$ will be called the one particle wave equation.

It is important to observe that $\hat{H}_{Free}(\hat{p}; \mu; \Delta)$ contains both the Dirac and Schrodinger One-Particle Kinetic Energies, $(\vec{\alpha} \cdot \vec{p})$ and $\in(\hat{p})$. This result can occur in a nonrelativistic system. Therefore, the wave equation of one quasi particle is strictly a non-relativistic equation. it is straightforward to generalize the one-fermion wave equation to a wave equation for a system of N Fermions. The result is:

$$i\hbar \frac{\partial}{\partial t} \hat{\psi}(\{\vec{r}, \vec{S}\}_N; t) I_4 \doteq \pm \hat{H}_{Free}(\{\hat{p}\}_N; \mu; \Delta) \hat{\psi}(\{\vec{r}, \vec{S}\}_N; t) I_4, \text{ where}$$

$$\{\hat{p}\}_N \equiv \{\hat{p}_1; \hat{p}_2; \ldots ; \hat{p}_N\} \text{ and}$$

$$\{\vec{r}, \vec{S}\}_N \equiv \{\vec{r}_1, \vec{S}_1; \vec{r}_2, \vec{S}_2; \ldots ; \vec{r}_N, \vec{S}_N\}.$$

This result completes the analysis of $\hat{H}_{Free}$.

Using the notation of Greiner and Reinhardt*, the expression for the Hamiltonian of One Free Fermion may be written:

$$\hat{H}_{Free}(\vec{p}, \vec{S}) \equiv \sum_\sigma \int_V d\vec{r} \hat{\psi}^\dagger(\vec{r}, \sigma)[\hat{D}(\vec{r}, \sigma) \hat{\psi}(\vec{r}, \sigma)],$$

where $\vec{S}$ contains the spin $\sigma$, $$\hat{D}(\vec{r}, \sigma) \equiv \left[-\frac{\hbar^2}{2m} \vec{\nabla}^2 - \mu\right] I_4 \pm \hat{\phi}(\vec{r}, \sigma),$$

$$\hat{\phi}(\vec{r}, \sigma) \equiv \beta[\in(\hat{p}) - \varepsilon(\mu; \Delta)] + (\vec{\alpha} \cdot \vec{p}) K(\mu; \Delta),$$

and $\Delta$ denotes the ORDER PARAMETER for $\hat{p} = p_F$.

*W. Greiner and J. Reinhardt; Field Quantization; Springer Verlag; Berlin, Heidelberg, New York (1993).

It follows that the Hamiltonian for N Free Fermions may be written:

$$\hat{H}_{Free,N}(\{\hat{p}, \vec{S}\}_N) \equiv$$

$$\Sigma_{\sigma_1} \cdots \Sigma_{\sigma_N} \int_V d\vec{r}_1 \cdots \int_V d\vec{r}_N \left[\prod_{i=1}^N \{\hat{\psi}^\dagger(\vec{r}_i, \sigma_i) \hat{D}(\vec{r}_i, \sigma_i) \hat{\psi}(\vec{r}_i, \sigma_i)\}\right].$$

The time dependence of the Field Operators is not written explicitly. This completes the construction of the Hamiltonian for N Free Fermions.

The next step is the analysis of the interaction Hamiltonian, the definition of this Hamiltonian is:

$$\hat{H}_\alpha \equiv$$

$$\frac{1}{2V} \Sigma_{\sigma_1} \Sigma_{\sigma_2} \int_V d\vec{r}_1 \int_V d\vec{r}_2 \hat{\psi}^\dagger(\vec{r}_1, \sigma_1) \hat{\psi}^\dagger(\vec{r}_2, \sigma_2) \times v_\alpha(\vec{r}_1, \vec{r}_2) \hat{\psi}(\vec{r}_2, \sigma_2) \hat{\psi}(\vec{r}_1, \sigma_1),$$

the time dependence of the field operators $\hat{\psi}(\vec{r}, \sigma)$ is not written explicitly. It remains to construct the educated guess for this interaction Hamiltonian.

To carry out this construction, it is necessary to replace the following quantities, $$\sigma, \hat{\psi}(\vec{r}, \sigma) \text{ and } v_\alpha(\vec{r}_a, \vec{r}_b),$$

by new quantities; these quantities will be chosen for intuitive reasons which express the fundamental properties of the physical system.

The replacements which will be chosen are:
1. $\sigma \Rightarrow \eta$, where $\eta$ takes on 4 values,
2. $\hat{\psi}(\vec{r}, \sigma) \Rightarrow \hat{\psi}(\vec{r}, \eta)$, and
3. $v_\alpha(\vec{r}_a, \vec{r}_b) \Rightarrow \langle \eta_1, \eta_2 | V_{\overline{\alpha}}(\vec{r}_a, \vec{r}_b) | \eta_4, \eta_3 \rangle$ In the replacement for $v_\alpha(\vec{r}_a, \vec{r}_b)$, the quantity $V_{\overline{\alpha}}(\vec{r}_a, \vec{r}_b)$ becomes: $V_{\overline{\alpha}}(\vec{r}_a, \vec{r}_b) \equiv (\beta \otimes \beta) v_{\overline{\alpha}}(\vec{r}_a, \vec{r}_b)(\beta \otimes \beta)$, where $(\beta \otimes \beta)$ designates the outer product of two $\beta$-matrices. The quantity $(\beta \otimes \beta)$ may be written as a matrix of rank 16. Using these replacements, the educated guess for the interaction Hamiltonian $\hat{H}_{\overline{\alpha}}$ may be written:

$$\hat{H}_{\overline{\alpha}}(\mu; \Delta) \equiv \frac{1}{2V} \Sigma_{\eta_1} \cdots \Sigma_{\eta_4} \int_V d\vec{r}_1 \int_V d\vec{r}_2 \psi^\dagger(\vec{r}_1, \eta_1) \psi^\dagger(\vec{r}_2, \eta_2) < \eta_1,$$

$$\eta_2 | V_{\overline{\alpha}}(\vec{r}_1, \vec{r}_2) | \eta_4, \eta_3 > \hat{\psi}(\vec{r}_2, \eta_4) \hat{\psi}(\vec{r}_1, \eta_3).$$

This completes the construction of the Hamiltonian for a System of N Interacting Fermions:

$$i\hbar \frac{\partial}{\partial t} \hat{\psi}(\vec{r}, \vec{S}) = [\pm \hat{H}_{Free}(\hat{p}; \mu; \Delta) + \hat{H}_{\overline{\alpha}}(\mu; \Delta)] \hat{\psi}(\vec{r}, \vec{S}).$$

It remains to construct the Heisenberg equation of motion for the field operator. The explicit expression for this equation may be written:

$$i\hbar \frac{\partial}{\partial t} \hat{\psi}(\vec{r}, \vec{S}) = [\hat{\psi}(\vec{r}, \vec{S}), \hat{H}_{CF}] \equiv [\hat{\psi}(\vec{r}, \vec{S}), \pm \hat{H}_{Free} + \hat{H}_{\overline{\alpha}}].$$

This equation yields the time evolution of the field operator in terms of the commutator of the field operator and the Hamiltonian. It is straight forward to show that:

$$[\hat{\psi}(\vec{r}, \vec{s}), \pm \hat{H}_{Free}] = \pm \hat{D}(\vec{r}, \vec{s}) \hat{\psi}(\vec{r}, \vec{s}).$$

Further $$[\hat{\psi}(\vec{r},\vec{s}), \hat{H}_\alpha] =$$

$$\frac{1}{V}\sum_{\eta_1}\sum_{\eta_2}\sum_{\eta_4}\int_V d\vec{r}_2 \langle \eta_1, \eta_2 | V_\pi(\vec{r}_1, \vec{r}_2) | \eta_4, \eta_3 \rangle \times \hat{\psi}^\dagger(\vec{r}_2, \eta_2)\hat{\psi}(\vec{r}_2, \eta_4)\hat{\psi}(\vec{r}, \vec{s})$$

It follows that the Heisenberg equation of motion for $\hat{\psi}(\vec{r}, \vec{s})$ becomes:

$$i\hbar\frac{\partial}{\partial t}\hat{\psi}(\vec{r},\vec{S}) = \left\{\pm D(\vec{r},\vec{s}) + \right.$$

$$\frac{1}{V}\sum_{\eta_1}\sum_{\eta_2}\sum_{\eta_4}\int_V d\vec{r}_2 \langle \eta_1, \eta_2 | V_\pi(\vec{r}_1, \vec{r}_2) | \eta_4, \eta_3 \rangle \times \hat{\psi}^\dagger(\vec{r}_2, \eta_2)\hat{\psi}(\vec{r}_2, \eta_4)\hat{\psi}(\vec{r}, \vec{s})$$

This equation may also be written in a time-independent form:

$$\left\{\pm D(\vec{r}, \vec{s}) + \right.$$

$$\frac{1}{V}\Sigma_{\eta_1}\Sigma_{\eta_2}\Sigma_{\eta_4}\int_V d\vec{r}_2 \langle \eta_1, \eta_2 | V_\pi(\vec{r}_1, \vec{r}_2) | \eta_4, \eta_3 \rangle \times \hat{\psi}^\dagger(\vec{r}_2, \eta_2)\hat{\psi}(\vec{r}_2, \eta_4)\hat{\psi}(\vec{r}, \vec{s}) = 0.$$

This time-independent equation is called the Nosanow Fermion Wave Equation. This can also be written using the functions $D(\vec{r}, \vec{s})$ and $\psi(\vec{r}, \vec{s})$:

$$\left\{\pm D(\vec{r}, \vec{s}) + \right.$$

$$\frac{1}{V}\Sigma_{\eta_1}\Sigma_{\eta_2}\Sigma_{\eta_4}\int_V d\vec{r}_2 \langle \eta_1, \eta_2 | V_\pi(\vec{r}_1, \vec{r}_2) | \eta_4, \eta_3 \rangle \times \hat{\psi}^\dagger(\vec{r}_2, \eta_2)\hat{\psi}(\vec{r}_2, \eta_4)\hat{\psi}(\vec{r}, \vec{s}) = 0.$$

An equation for Boson and Boson Systems is obtained using similar techniques as outlined above with modifications as required by the supporting particle physics.

The systems, methods and techniques as illustrated in the figures include one or more computer processors capable of accessing stored data and instructions to perform various steps and may operate in conjunction with software modules described herein in order to perform various functions. Many processors may be suitable and will be further described below. The described engines, generators, modules and other components may be or include software modules that are executed by the processor to perform their stated functions. Although the software modules are shown as discrete components, they may be integrated in various ways in accordance with embodiments of the disclosed subject matter.

The components shown in the figures above may be, include, or be implemented by a computer or multiple computers. The system of the disclosed subject matter or portions of the system of the disclosed subject matter may be in the form of a "processing machine," i.e., a tangibly embodied machine, such as a general-purpose computer or a special purpose computer or processor or microprocessor, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the disclosed subject matter may be a general-purpose computer or as described above in many embodiments, may be implemented as a quantum computer. However, the processing machine described above may also utilize (or be in the form of) any of a wide variety of other technologies including a special purpose computer, a computer system including a microcomputer, mini-computer or mainframe, for example, a programmed microprocessor, a micro-controller, a peripheral integrated circuit element, a CISC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the disclosed subject matter, including a quantum computer.

The processing machine used to implement the disclosed subject matter may utilize a suitable operating system. Thus, embodiments of the disclosed subject matter may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the disclosed subject matter as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, Java, JavaScript, Pert, Python, Common List and/or Scheme, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data, including authentication and digital signatures in order to protect the integrity of data and/or users. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the disclosed subject matter and is made to provide an enabling disclosure of the subject matter. Accordingly, the foregoing disclosure is not intended to be construed or to limit the disclosed subject matter or otherwise to exclude any other such embodiments, adaptations, variations, modifications and equivalent arrangements.

While particular embodiments of the disclosed subject matter have been illustrated and described in detail herein, it should be understood that various changes and modifications might be made to the disclosed subject matter without departing from the scope and intent of the disclosed subject matter.

From the foregoing it will be seen that the disclosed subject matter is well adapted to attain the ends and objects set forth above, together with other advantages. It will be understood that certain features and sub-combinations are of utility and may be employed without reference to other features and sub-combinations. This is contemplated and within the scope of the disclosed subject matter.

TABLE 1

| Phases | Materials Property Research 1 | Candidate Material Selection 2 | Material Synthesis 3 | Performance Testing 4 | Industrial Synthesis 5 | Commercialization Sources of value |
|---|---|---|---|---|---|---|
| Challenges | Curate digital database of material properties (i.e. physical, spectral, and transport properties, energy levels etc.) | Predict candidate material compositions and structures based on select properties | Fabricate desired candidate materials in lab** | Characterize synthesized material properties (in-situ and in application) and compare vs desired properties | Devise industrial process to repeat: synthesis on large manufacturing scales | |
| | Limited number of materials established by experimentation or computation | Candidate material selection uncertain and based on trial and error, databases limited in nu, of materials and properties | Slow and uncertain, difficult to synthesize large number of compositionally varying samples | Instrumental testing in simplified conditions not reflective of industry applications | Synthesis steps exhibit failures during scale up and must be optimized for industrial scale with cost and efficiency | |
| Value Unlock | Generate a large repository of computationally calculated materials, properties and energy levels | Select more accurate candidate materials from database of simulated properties | Computer simulation eliminates uncertainty and inefficiencies | More predictive simulation based on testing both in in-situ and in-operando | Devise optimal synthetic routes that work for industrial reactors | Efficiency in Design, faster revenue realization, new materials, lean manufacturing |

TABLE 2

| Phase | Early NISQ (2-5 yrs) 1 | Late NISQ (5-10 yrs) 2 | Broad Quantum Advantage (10+ yrs) 3 | Full-scale Fault Tolerance (20+ yrs) 4 | Commercial Sources of value |
|---|---|---|---|---|---|
| Technical challenges | Error Mitigation: | | Recursive Error Correction (large numbers of qubits entangled) | Modular Architecture (code independent circuitry) | |
| | # of physical qubits, ft of logical qubits, qubit lifetime, gate fidelity, gate operation time, connectivity, scalability, maturity | | | | |
| | Limited coherence time, heuristic error correction techniques, limited simulation enhancements | Limited use of Quantum auto-encoder, as well as library content & access, | Error correction, quantum simulations, distributed architecture | Dynamic simulations, quantum phase estimation, Quantum Machine Learning | Efficiency in Design, accelerated develop., faster revenue |

TABLE 2-continued

| Phase | Early NISQ (2-5 yrs) 1 | Late NISQ (5-10 yrs) 2 | Broad Quantum Advantage (10+ yrs) 3 | | Full-scale Fault Tolerance (20+ yrs) 4 | | | Commercial Sources of value |
|---|---|---|---|---|---|---|---|---|
| Value Unlock | More efficient classical simulations based on the merits of enhanced DFT; enhanced VQE | Improved system designs | Ability to run Functional Quantum Simulations, Error mitigation | Recursive error correction, Photon based distributed architecture | Portable and distributed quantum computing processors | Enhanced in-silico product testing that accounts for use environment | Algorithms that provide non-intuitive correlations to improving processes that increase yields | realization, lower cost, and new higher quality products |

TABLE 3

| Phase | Single functionality chemical ingredient | | Formulation or Compound | | Application Development Manufacturing | | | Commercial Sources of value |
|---|---|---|---|---|---|---|---|---|
| | 1 | 2 | 3 | 4 | 5 | 6 | 7 | |
| Challenges | Synthesis<br><br>Variability, lots of approximations, time consuming, not very targeted, limited tools, highly empirical | Lab tests to check desired properties | Mixing, Blending, Compounding<br>Time consuming, overarchingly empirical, lack of simulation-optimization-artificial intelligence tools for formulation development of mixtures or complex assemblies | Lab test to check desired properties | Process Engineering<br><br>Lack of integrated simulation-optimization-artificial intelligence tools to optimize reactor set-up and tune chemical process conditions | Lab test to check desired products | Manufacturing | |
| | Choosing the best small molecule, polymers & composites candidates | Physical attempts to measure properties ex. Tribology, Quantum efficiency | Procedures & Permutations ex. Compounding, formulas, OLED stacks | Numerous trials, physical measurement of properties, lack of automation ex. toxicity, stack Life-time | Synthesis at scale involves pitfalls of tremendous inefficiencies | Product test limitations, numerous trials, constrained in-silico/in-situ & quality testing, ex. pixel reliability | Lack of ideal Mixing & Blending, Formulation at scale, ex. OLED TV mass production | Efficiency in Design, accelerated develop., faster revenue realization, lower cost, and new higher quality products |
| Value Unlock | More efficient in-silico experimentation based on the merits of enhanced DFT | Designs of new functional molecules that rely on the accurate predictions of micro & macro properties | Design of improved products based on improved complex techniques & processes | Automated Simulations that reflect in-situ activity conditions | Application of break through catalysts that reduce byproducts and energy consumption | Enhanced in-silico product testing that accounts for use environment | Algorithms that provide non-intuitive correlations to improving processes that increase yields | |

TABLE 4

| Phases | Target ID 1 | Target Validation 2 | Assay Development 3 | Screening 4 | Optimization 5 | Preclinical 6 | Clinical Trials 7 | Regulatory Submission & Review 8 | Commercial Sources of value |
|---|---|---|---|---|---|---|---|---|---|
| | ID disease drivers | Target Validation | Develop tests to measure target impact | ID hit compounds | Optimize hits, select drug candidate | Study metabolism, toxicology, etc. | Test drug in humans for efficacy, safety and dosing | Submit for approval | |
| Challenges | (Variable) | Time | And | Cost | ~4.5 yrs at ~$700M) | (~1 yr ~$200M) | (~6 yrs. @ ~$1.2B-$1.7B) | | |
| | Weak signal in large data sets | Experimental limitations | Unreliability of testing | Lack of exhaustive search | Inability to optimize some hits | Low predictive value | >90% failure rate, high cost | Uncertainty and launch delays | |

TABLE 4-continued

| Phases | Target ID 1 | Target Validation 2 | Assay Development 3 | Screening 4 | Optimization 5 | Preclinical 6 | Clinical Trials 7 | Regulatory Submission & Review 8 | Commercial Sources of value |
|---|---|---|---|---|---|---|---|---|---|
| Value Unlock | Better algorithms higher computing power | Algorithms that reflect human system | Virtual screening of large virtual libraries | Virtual screening of large virtual libraries | Significantly improved drug design | Algorithms that better predict the human system | Algorithms that simulate drug patient interactions | Rapid analysis of clinical trials and other data sources | Efficiency in Design, faster revenue realization, lower cost, new and more effective drugs approved |

TABLE 5

| Phases | Target Assets 1 | Asset Adj. Due to Mrkt 2 | Detection of Opportunity 3 | Profit Extraction 4 | Risk Assessment 5 | Portfolio Return 6 | Commercial Sources of value |
|---|---|---|---|---|---|---|---|
|  | ID Assets to be included in portfolio | How should composition change with the market | What are the opportunities with the different assets in the market | How to take profit by trading with them | How to estimate risk | Return of a portfolio |  |
| Challenges | Requires colossal computation power to accurately describe the market system, becomes worse as data gathered related to market increases! | | | | | | |
|  | Dynamic Portfolio Selection (More complex problems calls for more elaborate methods other than linear programs) | | Machine Learning (Neural networks, deep learning) Network training time too long, running new models with large amounts of data becomes cost prohibitive | | Monte Carlo Simulation requires many runs to provide an accurate estimation of the expected return and distribution. Moreover, shows less prediction accuracy for short periods | | |
| Value Unlock | Develop NiSQ Algorithm Libraries | Computer simulations (annealing simulations) | Model trained to identify patterns in the data & predict the behavior of new data points quickly and cost effectively Big Big data Random Access Memory | | Reduce the number of samples while increasing the accuracy in a shorter amount of time | | Better products, more products to a wiser consumer base, revenue growth, greater profits, better managed operations |

What is claimed is:

1. A Quantum Mechanics Instruction Production (QMIP) system comprising:

a QMIP processing core including one or more processors and one or more QMIP core process modules;
an input module coupled to the QMIP processing core;
an output module coupled to the QMIP processing core;
a database library module coupled to the QMIP processing core;
a material printer coupled to the QMIP processing core;
a sample analyzer coupled to the QMIP processing core; and
a test bench coupled to the QMIP processing core,
wherein the one or more processors are coupled to a computer-readable medium having stored thereon software instructions that, when executed by the one or more processors, cause the one or more processors to perform operations including:
obtaining input requirements via the input module;
searching the database library module for an existing material matching the input requirements;
when an existing material meets the input requirements, outputting existing material information via the output module;
when an existing material does not meet the input requirements, determining one or more new candidate materials using the one or more QMIP core process modules by:
performing first Grand Free Energy computations;
computing Nosanow Fermion Wave Equation results;
performing second Grand Free Energy computations;
simulating the one or more new candidate materials based on the Nosanow Fermion Wave Equation;
confirming that the one or more new candidate materials based on the Nosanow Fermion Wave Equation meet the input requirements; and
outputting information on confirmed ones of the one or more new candidate materials determined by the QMIP processing core via the output module.

2. The QMIP system of claim 1, wherein the one or more QMIP core process modules include:
a Grand Free Energy module; and
a Nosanow Fermion Wave module,
wherein the first Grand Free Energy computation and the second Grand Free Energy computation are performed by the Grand Free Energy module, and wherein the Nosanow Fermion Wave Equation computations are performed by the Nosanow Fermion Wave module.

3. The QMIP system of claim 2, wherein the one or more QMIP core process modules further include:
a simulation module;
an artificial intelligence module;
a chemical bench module; and
a metrology and interferometry module,
wherein the simulating of the one or more new candidate materials is performed by one or more of the simulation module and the chemical bench module, and
wherein the confirming of the one or more new candidate materials is performed by one or more of the chemical bench module, the metrology and interferometry module, a test bench module, and a sample analyzer module.

4. The QMIP system of claim 3, further comprising:
a license and authorization security module; and
a tradeoff module.

5. The QMIP system of claim 4, wherein the input requirements include one or more of chemical, electrical, thermal, and electromagnetic properties.

6. The QMIP system of claim 5, wherein when the one or more new candidate materials includes two or more candidate materials, performing a tradeoff analysis using the tradeoff module and the artificial intelligence module.

7. The QMIP system of claim 6, wherein the input requirements include specification of a transmon or Josephson junction.

8. The QMIP system of claim 7, wherein performing the first Grand Free Energy computations includes:
calculating Grand Free Energy for a candidate new material;
determining a Grand Partition Function Trace based on the Grand free Energy calculation;
computing Hamiltonians; and
applying a variational theorem to determine an energy upper bound for the candidate new material.

9. The QMIP system of claim 8, wherein computing the Nosanow Fermion Wave Equation results includes:
defining a Nosanow wave system;
determining a commutator for free particles;
determining a commutator for interaction particles;
computing a time independent equation for the Nosanow Fermion Wave Equation; and
applying electromagnetic field to the time independent equation for the Nosanow Fermion Wave Equation.

10. The QMIP system of claim 9, wherein performing the second Grand Free Energy computations includes:
determining an Eigenvalue spectrum solution and substituting into the Grand Partition Function Trace;
applying the variational theorem to define solutions provided by the Nosanow Fermion Wave Equation; and
defining phase transitions from solutions of Nosanow Fermion Wave functions to determine Tc.

11. The QMIP system of claim 1, wherein the software instructions further include instructions that, when executed by the one or more processors, cause the one or more processors to perform further operations including:
determining set-up parameters for configuring a quantum computer having one or more qubits based on a selected one of the candidate new materials;
providing the set-up parameters to a quantum computer controller;
determining one or more operational control parameters for the quantum computer based on the selected one of the candidate new materials; and
providing the operational control parameters to the quantum computer controller.

12. The QMIP system of claim 11, wherein the quantum computer controller is a classical computing device having one or more processors and wherein the quantum computer controller is integrated with the QMIP system.

13. The QMIP system of claim 12, wherein the software instructions further include instructions that, when executed by the one or more processors, cause the one or more processors to perform further operations including:
sensing one or more of temperature, pressure, and energy applied to the one or more qubits; and
adjusting one or more of the temperature, pressure, and energy applied to the one or more qubits to maintain coherency of the one or more qubits below Tc.

14. The QMIP system of claim 13, wherein the one or more qubits includes a transmon.

15. The QMIP system of claim 13, wherein the one or more qubits includes a Josephson junction.

16. The QMIP system of claim 13, wherein the energy includes one of microwave energy or laser energy.

17. The QMIP system of claim 13, wherein the one or more qubits includes two or more qubits, and wherein the software instructions further include instructions that, when executed by the one or more processors, cause the one or more processors to perform further operations including:
generating Nosanow Fermion Wave Equation functions to couple the two or more qubits; and
generating control signals for the quantum computer controller to maintain coherency of the coupled two or more qubits.

18. The QMIP system of claim 17, wherein the one or more qubits include multi-dimensional Nosanow qubits, wherein dimensions of the multi-dimensional Nosanow qubits includes a spin dimension, and wherein determining the one or more operational control parameters for the quantum computer is based on Nosanow Fermion Wave Equation functions and includes utilizing the spin dimension of the multi-dimensional Nosanow qubits to generate control parameters and control signals from the quantum computer controller to maintain coherency of the multi-dimensional Nosanow qubits.

19. The QMIP system of claim 18, wherein the spin dimension of the multi-dimensional Nosanow qubits is used to generate control signals to keep the selected one of the candidate new materials in a superconductor zone and to extend coherency of the multi-dimensional Nosanow qubits.

20. A Quantum Mechanics Instruction Production (QMIP) system comprising:
a QMIP processing core including one or more processors and one or more QMIP core process modules;
an input module coupled to the QMIP processing core;
an output module coupled to the QMIP processing core;
a database library module coupled to the QMIP processing core;
a material printer coupled to the QMIP processing core;
a sample analyzer coupled to the QMIP processing core; and
a test bench coupled to the QMIP processing core,
wherein the one or more processors are coupled to a computer-readable medium having stored thereon software instructions that, when executed by the one or more processors, cause the one or more processors to perform operations including:

obtaining input requirements via the input module;
searching the database library module for an existing material matching the input requirements;
when an existing material meets the input requirements, outputting existing material information via the output module;
when an existing material does not meet the input requirements, determining one or more new candidate materials using the one or more QMIP core process modules by:
  performing first Grand Free Energy computations;
  computing Nosanow Fermion Wave Equation results;
  performing second Grand Free Energy computations;
  simulating the one or more new candidate materials based on the Nosanow Fermion Wave Equation;
  confirming that the one or more new candidate materials based on the Nosanow Fermion Wave Equation meet the input requirements; and
  outputting information on confirmed ones of the one or more new candidate materials determined by the QMIP processing core via the output module,
wherein the one or more QMIP core process modules include:
  a Grand Free Energy module; and
  a Nosanow Fermion Wave module,
  wherein the first Grand Free Energy computation and the second Grand Free Energy computation are performed by the Grand Free Energy module, and
  wherein the Nosanow Fermion Wave Equation computations are performed by the Nosanow Fermion Wave module,
wherein the one or more QMIP core process modules further include:
  a simulation module;
  an artificial intelligence module;
  a chemical bench module; and
  a metrology and interferometry module,
wherein the simulating of the one or more new candidate materials is performed by one or more of the simulation module and the chemical bench module,
wherein the confirming of the one or more new candidate materials is performed by one or more of the chemical bench module, the metrology and interferometry module, a test bench module, and a sample analyzer module, and
wherein the software instructions further include instructions that, when executed by the one or more processors, cause the one or more processors to perform further operations including:
determining set-up parameters for configuring a quantum computer having one or more qubits based on a selected one of the candidate new materials;
providing the set-up parameters to a quantum computer controller;
determining one or more operational control parameters for the quantum computer based on the selected one of the candidate new materials; and
providing the operational control parameters to the quantum computer controller.

* * * * *